United States Patent
Sasada

(10) Patent No.: US 7,740,769 B2
(45) Date of Patent: Jun. 22, 2010

(54) LIQUID CRYSTAL COMPOUND, LIQUID CRYSTAL COMPOSITION, AND LIQUID CRYSTAL DISPLAY DEVICE

(75) Inventor: Yasuyuki Sasada, Chiba (JP)

(73) Assignees: Chisso Corporation, Osaka (JP); Chisso Petrochemical Corporation, Tokyo (JP)

(*) Notice: Subject to any disclaimer, the term of this patent is extended or adjusted under 35 U.S.C. 154(b) by 436 days.

(21) Appl. No.: 11/705,788

(22) Filed: Feb. 14, 2007

(65) Prior Publication Data

US 2007/0187644 A1 Aug. 16, 2007

(30) Foreign Application Priority Data

Feb. 14, 2006 (JP) .............................. 2006-036088

(51) Int. Cl.
C09K 19/00 (2006.01)
C09K 19/06 (2006.01)
C09K 19/52 (2006.01)

(52) U.S. Cl. .................. 252/299.01; 252/299.6; 252/299.63; 252/299.64; 252/299.65; 252/299.66; 430/20; 428/1.1; 349/1

(58) Field of Classification Search ............ 252/299.01, 252/299.6, 299.63, 299.64, 299.65, 299.66; 430/20; 428/1.1; 349/1
See application file for complete search history.

(56) References Cited

U.S. PATENT DOCUMENTS

| 5,059,345 | A | 10/1991 | Kobayashi et al. |
| 5,128,062 | A | 7/1992 | Kobayashi et al. |
| 5,180,521 | A * | 1/1993 | Eidenschink et al. ... 252/299.61 |
| 6,197,217 | B1 | 3/2001 | Kondo et al. |

FOREIGN PATENT DOCUMENTS

| EP | 0 423 520 | 4/1991 |
| JP | 2-228 | 1/1990 |
| JP | 3-24036 | 2/1991 |
| JP | 3-204835 | 9/1991 |
| JP | 4-330040 | 11/1992 |
| JP | 5-294898 | 11/1993 |

OTHER PUBLICATIONS

S. Kobayashi et al., "Optically Active Ketones with Intramolecular Hydrogen Bond", Mol. Cryst. Liq. Cryst., vol. 202, pp. 103-109, XP000236748, 1991.
Russell A. Lewthwaite et al., "The effect of a lateral hydroxy substituent on the thermal stability of the chiral smectic C phase", Liquid Crystals, vol. 16, No. 2, pp. 299-313, XP0000420702, ISSN 0267-8292, 1994.

* cited by examiner

*Primary Examiner*—Geraldina Visconti
(74) *Attorney, Agent, or Firm*—Wenderoth, Lind & Ponack, L.L.P.

(57) ABSTRACT

The invention is to provide such a liquid crystal compound that has general properties required for a liquid crystal compound, stability to heat, light and the like, a small viscosity, a suitable optical anisotropy, a negatively large dielectric anisotropy, a wide temperature range of a nematic phase, and favorable compatibility with other liquid crystal compounds, and a liquid crystal composition containing the compound. The invention provides a compound represented by Formula (1), wherein Ra and Rb are hydrogen or an alkyl having 1 to 20 carbon atoms; ring $A^1$ is 1,4-cyclohexylene, 1,4-phenylene, pyridine-2,5-diyl, pyridazine-3,6-diyl, decahydronaphthalene-2,6-diyl, 1,2,3,4-tetrahydronaphthalene-2,6-diyl, 5,6,7,8-tetrahydronaphthalene-2,6-diyl, or naphthalene-2,6-diyl; $Z^1$ is a single bond or an alkylene having 1 to 4 carbon atoms; $Y^1$ is hydrogen, halogen, —CN, —$CF_3$, —$CHF_2$, —$CH_2F$, —$OCF_3$, —$OCHF_2$, or —$OCH_2F$; and m is 1, 2, or 3.

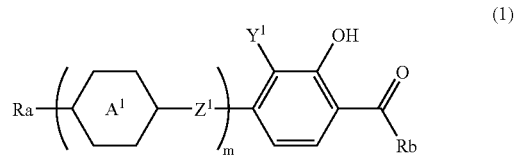

(1)

23 Claims, No Drawings

LIQUID CRYSTAL COMPOUND, LIQUID CRYSTAL COMPOSITION, AND LIQUID CRYSTAL DISPLAY DEVICE

FIELD OF THE INVENTION

The present invention relates to a liquid crystal compound, a liquid crystal composition, and a liquid crystal display device. More specifically, the invention relates to a phenol derivative, a liquid crystal composition containing the phenol compound and having a nematic phase, and a liquid crystal display device containing the composition.

BACKGROUND OF THE INVENTION

The liquid crystal display device is classified based on the operation mode of liquid crystals, for example, into PC (phase change), TN (twisted nematic), STN (super twisted nematic), BTN (bistable twisted nematic), ECB (electrically controlled birefringence), OCB (optically compensated bend), IPS (in-plane switching), and VA (vertical alignment). The device is classified based on the driving system as PM (passive matrix) and AM (active matrix). PM (passive matrix) is classified into static, multiplex, etc. and AM is classified into TFT (thin film transistor), MIM (metal insulator metal), etc.

The liquid crystal display devices contain a liquid crystal composition having appropriate physical properties. In order to improve the characteristics of the device, it is preferred that the composition has appropriate physical properties. General properties necessary for a compound as a component of the composition include: (1) chemical stability and physical stability; (2) high clearing point (the clearing point is a transition temperature from a liquid crystal phase to an isotropic phase); (3) low lower limit temperature of a liquid crystal phase (the liquid crystal phase means a nematic phase, a smectic phase and the like); (4) low viscosity; (5) appropriate optical anisotropy; (6) appropriate dielectric anisotropy (compounds having high dielectric anisotropy often have high viscosity); and (7) high specific resistivity.

The composition is prepared by mixing various compounds. Accordingly, it is preferred that the compounds are well mixed with other compounds. Since the device is sometimes used at a temperature below a freezing point, compounds having favorable compatibility at a low temperature are preferred. Compounds having a high clearing point or a low lower limit temperature of a liquid crystal phase contribute to a wide temperature range of the nematic phase in the composition. A preferred composition has an optical anisotropy suitable to the low viscosity and the mode of the device. A high dielectric anisotropy of the compound contributes to a low threshold voltage of the composition. Such a composition can provide a device having such characteristics as a wide usable temperature range, a short response time, a large contrast ratio, a low driving voltage, a small power consumption, and a large voltage holding ratio.

The related art is disclosed in JP-A No. 2-228 (EP-A No. 315193, U.S. Pat. No. 5,059,345), EP-A No. 423520, JP-A No. 3-24036, JP-A No. 3-204835 (U.S. Pat. No. 5,128,062), JP-A No. 4-330040, and JP-A No. 5-294898. Further preferred liquid crystal compounds, liquid crystal compositions, and liquid crystal display devices are demanded.

SUMMARY OF THE INVENTION

A first aspect of the invention is to provide such a liquid crystal compound that has general properties required for a liquid crystal compound, stability to heat, light and the like, a small viscosity, a suitable optical anisotropy, a negatively large dielectric anisotropy, a wide temperature range of a nematic phase, and favorable compatibility with other liquid crystal compounds, particularly to provide such a liquid crystal compound that has a negatively large dielectric anisotropy and a wide temperature range of a nematic phase. A second aspect of the invention is to provide such a liquid crystal composition that contains the compound and has such properties as a high upper limit temperature of a nematic phase, a low lower limit temperature of a nematic phase, a small viscosity, a suitable optical anisotropy, and a low threshold voltage, and particularly to provide such a liquid crystal composition that has a high upper limit temperature of a nematic phase and a low lower limit temperature of a nematic phase. A third aspect of the invention is to provide such a liquid crystal display device that contains the composition and has a wide usable temperature range, a short response time, a small power consumption, a large contrast, and a low driving voltage, and particularly to provide such a liquid crystal display device that has a wide usable temperature range.

The compound of the invention is described in the item [1] below.

[1] A compound represented by Formula (1):

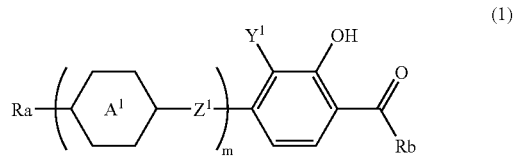

wherein Ra and Rb each independently is hydrogen or an alkyl having 1 to 20 carbon atoms; in the alkyl, arbitrary —$CH_2$— may be replaced by —O—, —S—, —CO—, —$SiH_2$—, —CH=CH—, or —C≡C—, and arbitrary hydrogen may be replaced by halogen;

ring $A^1$ is 1,4-cyclohexylene, 1,4-phenylene, pyridine-2,5-diyl, pyridazine-3,6-diyl, decahydronaphthalene-2,6-diyl, 1,2,3,4-tetrahydronaphthalene-2,6-diyl, 5,6,7,8-tetrahydronaphthalene-2,6-diyl, or naphthalene-2,6-diyl; arbitrary —$CH_2$— constituting the rings may be replaced by —O—, —S—, —CO—, or —$SiH_2$—, arbitrary —$(CH_2)_2$— constituting the rings may be replaced by —CH=CH—, and arbitrary hydrogen directly bonded to the rings may be replaced by halogen, —$CF_3$, —$CHF_2$, —$CH_2F$, —$OCF_3$, —$OCHF_2$, or —$OCH_2F$;

$Z^1$ is a single bond or an alkylene having 1 to 4 carbon atoms; in the alkylene, arbitrary —$CH_2$— may be replaced by —O—, —S—, —CO—, —$SiH_2$—, —CH=CH—, —CH=CF—, —CF=CH—, —CF=CF—, or —C≡C—, and arbitrary hydrogen may be replaced by halogen;

$Y^1$ is hydrogen, halogen, —CN, —$CF_3$, —$CHF_2$, —$CH_2F$, —$OCF_3$, —$OCHF_2$, or —$OCH_2F$; and m is 1, 2, or 3, and when m is 2 or 3, plural rings $A^1$ may be identical groups or different groups, and plural $Z^1$ may be identical groups or different groups.

DETAILED DESCRIPTION OF THE INVENTION

The terms in the invention will be described. The liquid crystal compound is a collective name of compounds having a liquid crystal phase, such as a nematic phase and a smectic phase, and compounds not having the liquid crystal phase but being useful as a component of a liquid crystal composition.

A liquid crystal compound, a liquid crystal composition and a liquid crystal display device may be abbreviated as a compound, a composition and a device, respectively, in some cases. The liquid crystal display device is a collective name of a liquid crystal display panel and a liquid crystal display module. The upper limit temperature of a nematic phase is a phase transition temperature from a nematic phase to an isotropic phase and is abbreviated as an upper limit temperature in some cases. The lower limit temperature of a nematic phase is abbreviated as a lower limit temperature in some cases. The compound represented by Formula (1) is simply referred to Compound (1) in some cases. This abbreviation may be applied to compounds represented by the other formulae. In Formulae (1) to (14), the symbols, such as $A^1$, B and E, mentioned in hexagons are symbols showing the rings. The ratios showed by % (percentage) of the compounds in the liquid crystal composition are percentages by weight (% by weight) based on the total weight of the composition. In the case where the same symbols are used in plural formulae enumerated, the symbols may be identical to or different from each other within the scope thereof.

The invention includes the aforementioned item [1] and items [2] to [23] below.

[2] The compound described in the item [1], wherein Ra and Rb each independently is an alkyl having 1 to 20 carbon atoms, an alkoxy having 1 to 19 carbon atoms, an alkoxyalkyl having 2 to 19 carbon atoms, an alkenyl having 2 to 21 carbon atoms, a fluorinated alkyl having 1 to 20 carbon atoms, or a fluorinated alkoxy having 1 to 19 carbon atoms;

ring $A^1$ is 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl, or pyridazine-3,6-diyl;

$Z^1$ is a single bond, —(CH$_2$)$_2$—, —COO—, —OCO—, —CH$_2$O—, —OCH$_2$—, —CF$_2$O—, —OCF$_2$—, —CH═CH—, —CF═CF—, —C≡C—, —CH$_2$CO—, —COCH$_2$—, —CH$_2$SiH$_2$—, —SiH$_2$CH$_2$—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O—, —O(CH$_2$)$_3$—, or —(CH$_2$)$_4$—; and $Y^1$ is hydrogen, fluorine, chlorine, —CF$_3$, —CHF$_2$, —CH$_2$F, —OCF$_3$, —OCHF$_2$, or —OCH$_2$F.

[3] The compound described in the item [1], wherein Ra and Rb each independently is an alkyl having 1 to 10 carbon atoms, an alkoxy having 1 to 10 carbon atoms, an alkoxyalkyl having 2 to 10 carbon atoms, an alkenyl having 2 to 10 carbon atoms, a fluorinated alkyl having 1 to 10 carbon atoms, or a fluorinated alkoxy having 1 to 10 carbon atoms;

ring $A^1$ independently is 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, or 2,6-difluoro-1,4-phenylene;

$Z^1$ independently is a single bond, —(CH$_2$)$_2$—, —COO—, —OCO—, —CH$_2$O—, —OCH$_2$—, —CF$_2$O—, —OCF$_2$—, —CH═CH—, —CF═CF—, —C≡C—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O—, —O(CH$_2$)$_3$—, or —(CH$_2$)$_4$—; and $Y^1$ is hydrogen, fluorine, chlorine, —CF$_3$, —CHF$_2$, or —CH$_2$F.

[4] The compound described in the item [1], wherein Ra and Rb each independently is an alkyl having 1 to 10 carbon atoms, an alkoxy having 1 to 10 carbon atoms, an alkoxyalkyl having 2 to 10 carbon atoms, an alkenyl having 2 to 10 carbon atoms, —CH$_2$F, or —OCH$_2$F;

ring $A^1$ is 1,4-cyclohexylene, 1,4-phenylene, 2-fluoro-1,4-phenylene, or 2,3-difluoro-1,4-phenylene;

$Z^1$ is a single bond, —(CH$_2$)$_2$—, —COO—, —OCO—, —CH$_2$O—, —OCH$_2$—, —CF$_2$O—, —OCF$_2$—, —CH═CH—, or —C≡C—; and $Y^1$ is hydrogen, fluorine, —CF$_2$H, or —CF$_3$.

[5] The compound described in the item [1], wherein Ra is an alkoxy having 1 to 6 carbon atoms, an alkoxyalkyl having 2 to 6 carbon atoms, or an alkenyl having 2 to 6 carbon atoms;

Rb is an alkyl having 1 to 6 carbon atoms or an alkoxy having 1 to 6 carbon atoms;

ring $A^1$ is 1,4-cyclohexylene, 1,4-phenylene, 2-fluoro-1,4-phenylene, or 2,3-difluoro-1,4-phenylene;

$Z^1$ is a single bond or —(CH$_2$)$_2$—; and $Y^1$ is hydrogen or fluorine.

[6] A compound represented by one of Formulae (I) to (V):

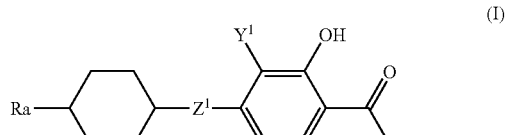

(I)

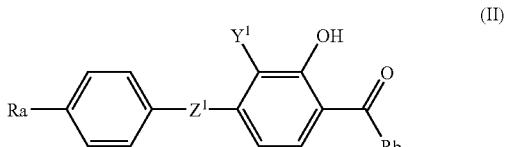

(II)

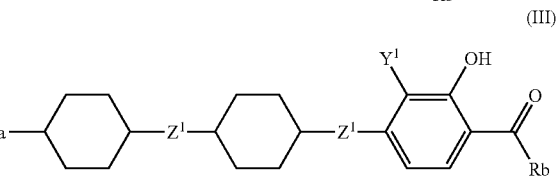

(III)

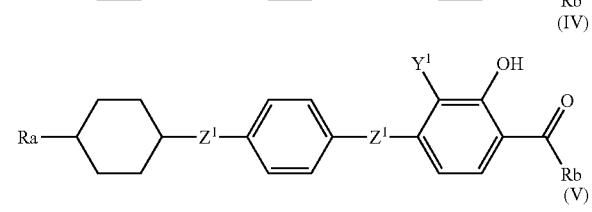

(IV)

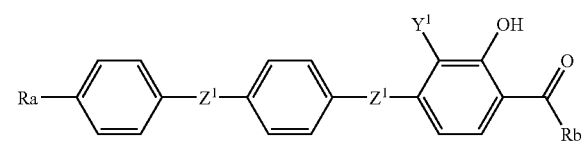

(V)

wherein Ra and Rb each independently is an alkyl having 1 to 10 carbon atoms, an alkoxy having 1 to 10 carbon atoms, an alkoxyalkyl having 2 to 10 carbon atoms, or an alkenyl having 2 to 10 carbon atoms;

$Z^1$ independently is a single bond, —(CH$_2$)$_2$—, —COO—, —OCO—, —CH$_2$O—, —OCH$_2$—, —CF$_2$O—, —OCF$_2$—, —CH═CH—, —CF═CF—, —C≡C—, —(CH$_2$)$_2$COO—, —OCO(CH$_2$)$_2$—, —(CH$_2$)$_2$CF$_2$O—, —(CH$_2$)$_3$O—, —O(CH$_2$)$_3$—, or —(CH$_2$)$_4$—; and $Y^1$ is hydrogen, fluorine, chlorine, —CF$_3$, or —CF$_2$H.

[7] The compound described in the item [6], wherein Ra and Rb each independently is an alkyl having 1 to 10 carbon atoms, an alkoxy having 1 to 10 carbon atoms, or an alkenyl having 2 to 10 carbon atoms;

$Z^1$ independently is a single bond, —(CH$_2$)$_2$—, —CH=CH—, or —(CH$_2$)$_4$—; and $Y^1$ is hydrogen, fluorine, chlorine, —CF$_3$, or —CF$_2$H.

[8] The compound described in the item [6], wherein Ra and Rb each independently is an alkyl having 1 to 10 carbon atoms, an alkoxy having 1 to 10 carbon atoms, or an alkenyl having 2 to 10 carbon atoms;

$Z^1$ independently is a single bond or —(CH$_2$)$_2$—; and $Y^1$ is hydrogen, fluorine, or —CF$_3$.

[9] The compound described in the item (6), wherein Ra and Rb each independently is an alkyl having 1 to 6 carbon atoms;

$Z^1$ is a single bond; and $Y^1$ is fluorine.

[10] A compound represented by formula below:

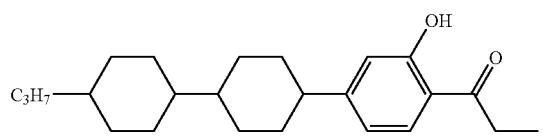

[11] A compound represented by formula below:

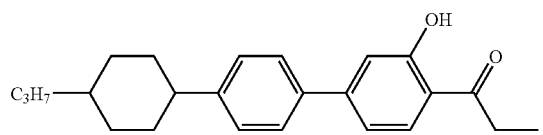

[12] A compound represented by formula below:

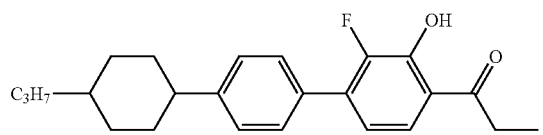

[13] A liquid crystal composition containing at least one compound selected from the group consisting of the compounds described in one of the items [1] to [12].

[14] The liquid crystal composition described in the item [13], wherein the composition further contains at least one compound selected from the group consisting of compounds represented by Formulae (2), (3) and (4):

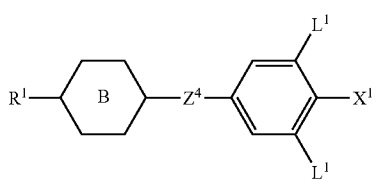
(2)

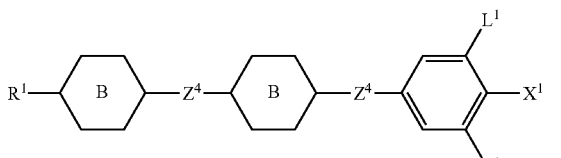
(3)

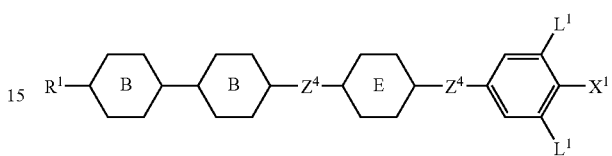
(4)

wherein $R^1$ is an alkyl having 1 to 10 carbon atoms; in the alkyl, arbitrary —CH$_2$— may be replaced by —O— or —CH=CH—, and arbitrary hydrogen may be replaced by fluorine;

$X^1$ is fluorine, chlorine, —OCF$_3$, —OCHF$_2$, —CF$_3$, —CHF$_2$, —CH$_2$F, —OCF$_2$CHF$_2$, or —OCF$_2$CHFCF$_3$;

ring B independently is 1,4-cyclohexylene, 1,3-dioxane-2,5-diyl, or 1,4-phenylene in which arbitrary hydrogen may be replaced by fluorine;

$Z^4$ independently —(CH$_2$)$_2$—, —(CH$_2$)$_4$—, —COO—, —CF$_2$O—, —OCF$_2$—, —CH$_2$=CH$_2$—, or a single bond; and $L^1$ independently is hydrogen or fluorine.

[15] The liquid crystal composition described in the item [13], wherein the composition further contains at least one compound selected from the group consisting of compounds represented by Formulae (5) and (6):

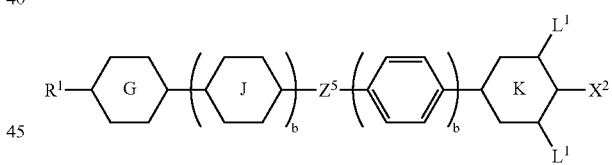
(5)

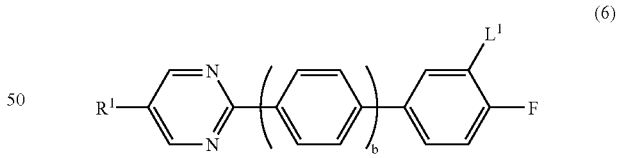
(6)

wherein $R^1$ is an alkyl having 1 to 10 carbon atoms; in the alkyl, arbitrary —CH$_2$— may be replaced by —O— or —CH=CH—, and arbitrary hydrogen may be replaced by fluorine;

$X^2$ is —CN or —C≡C—CN;

ring G is 1,4-cyclohexylene, 1,4-phenylene, 1,3-dioxane-2,5-diyl, or pyrimidine-2,5-diyl;

ring J is 1,4-cyclohexylene, pyrimidine-2,5-diyl, or 1,4-phenylene in which arbitrary hydrogen may be replaced by fluorine;

ring K is 1,4-cyclohexylene or 1,4-phenylene;

$Z^5$ is —(CH$_2$)$_2$—, —COO—, —CF$_2$O—, —OCF$_2$—, or a single bond;

[16] The liquid crystal composition described in the item [13], wherein the composition further contains at least one compound selected from the group consisting of compounds represented by Formulae (7), (8), (9), (10) and (11):

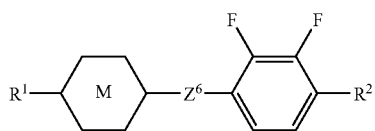
(7)

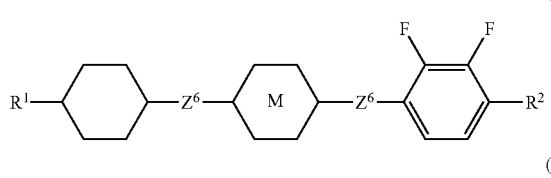
(8)

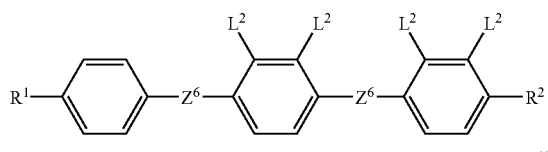
(9)

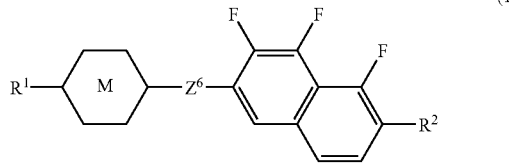
(10)

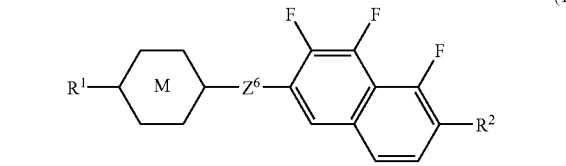
(11)

wherein $R^1$ is an alkyl having 1 to 10 carbon atoms; in the alkyl, arbitrary —$CH_2$— may be replaced by —O— or —CH=CH—, and arbitrary hydrogen may be replaced by fluorine;

$R^2$ is fluorine or an alkyl having 1 to 10 carbon atoms; in the alkyl, arbitrary —$CH_2$— may be replaced by —O— or —CH=CH—, and arbitrary hydrogen may be replaced by fluorine;

ring M is 1,4-cyclohexylene, 1,4-phenylene, or decahydro-2,6-naphthalene;

$Z^6$ independently is —$(CH_2)_2$—, —COO—, or a single bond; and $L^2$ independently is hydrogen or fluorine, and at least one of $L^2$ is fluorine.

[17] The liquid crystal composition described in the item [13], wherein the composition further contains at least one compound selected from the group consisting of compounds represented by Formulae (12), (13) and (14):

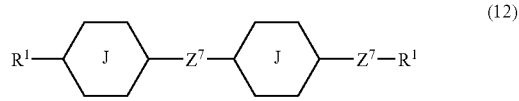
(12)

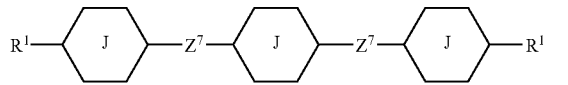
(13)

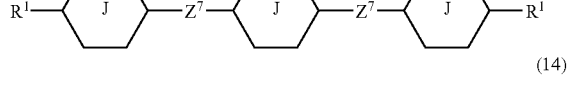
(14)

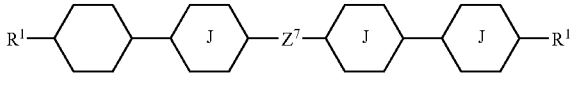

wherein $R^1$ independently is an alkyl having 1 to 10 carbon atoms; in the alkyl, arbitrary —$CH_2$— may be replaced by —O— or —CH=CH—, and arbitrary hydrogen may be replaced by fluorine;

ring J independently is 1,4-cyclohexylene, pyrimidine-2,5-diyl, or 1,4-phenylene in which arbitrary hydrogen may be replaced by fluorine; and $Z^7$ independently is —C≡C—, —COO—, —$(CH_2)_2$—, —CH=CH—, or a single bond.

[18] The liquid crystal composition described in the item [14], wherein the composition further contains at least one compound selected from the group consisting of compounds represented by Formulae (5) and (6) in the item [15].

[19] The liquid crystal composition described in the item [14], wherein the composition further contains at least one compound selected from the group consisting of compounds represented by Formulae (12), (13) and (14) in the item [17].

[20] The liquid crystal composition described in the item [15], wherein the composition further contains at least one compound selected from the group consisting of compounds represented by Formulae (12), (13) and (14) in the item [17].

[21] The liquid crystal composition described in the item [16], wherein the composition further contains at least one compound selected from the group consisting of compounds represented by Formulae (12), (13) and (14) in the item [17].

[22] The liquid crystal composition described in one of the items [13] to [21], wherein the composition further contains an optically active compound.

[23] A liquid crystal display device containing the liquid crystal composition described in one of the items [13] to [22].

The compound of the invention is represented by Formula (1).

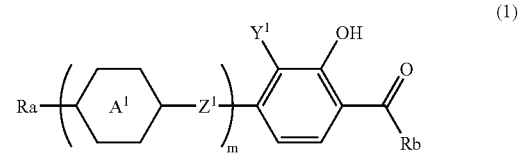
(1)

In Formula (1), Ra and Rb each independently is hydrogen or an alkyl having 1 to 20 carbon atoms. In the alkyl, arbitrary —$CH_2$— may be replaced by —O—, —S—, —CO—, —$SiH_2$—, —CH=CH—, or —C≡C—, and arbitrary hydrogen may be replaced by halogen.

Examples of Ra and Rb include hydrogen, an alkyl, alkoxy, an alkoxyalkyl, an alkoxyalkoxy, an alkylthio, an alkylthioalkoxy, an acyl, an acylalkyl, an acyloxy, an acyloxyalkyl, an alkoxycarbonyl, an alkoxycarbonylalkyl, an alkenyl, an alkenyloxy, an alkenyloxyalkyl, an alkoxyalkenyl, an alkynyl, an alkynyloxy, a silaalkyl and a disilaalkyl. These groups, in which at least one hydrogen is replaced by halogen, are also preferred. Preferred examples of the halogen include fluorine and chlorine. More preferred examples of the halogen include fluorine. These groups are preferably linear groups rather than branched groups. In the case where these groups are optically active groups, branched groups are also preferred. Preferred steric configuration of —CH=CH— in the alkenyl depends on the position of the double bond. A trans configuration is preferred in the alkenyl having a double bond at the odd number position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis configuration is preferred in the alkenyl having a double bond at the even number position such as —CH$_2$CH=CHCH$_3$, —CH$_2$CH=CHC$_2$H$_5$, and —CH$_2$CH=CHC$_3$H$_7$.

Preferred examples of Ra and Rb include an alkyl having 1 to 20 carbon atoms, an alkoxy having 1 to 19 carbon atoms, an alkoxyalkyl having 2 to 19 carbon atoms, an alkenyl having 2 to 21 carbon atoms, a fluorinated alkyl having 1 to 20 carbon atoms and a fluorinated alkoxy having 1 to 19 carbon atoms.

More preferred examples of Ra and Rb include an alkyl having 1 to 10 carbon atoms, an alkoxy having 1 to 10 carbon atoms, an alkoxyalkyl having 2 to 10 carbon atoms, an alkenyl having 2 to 10 carbon atoms, a fluorinated alkyl having 1 to 10 carbon atoms and a fluorinated alkoxy having 1 to 10 carbon atoms.

Further preferred examples of Ra and Rb include an alkyl having 1 to 10 carbon atoms, an alkoxy having 1 to 10 carbon atoms, an alkoxyalkyl having 2 to 10 carbon atoms, an alkenyl having 2 to 10 carbon atoms, —CH$_2$F and —OCH$_2$F.

Particularly preferred examples of Ra include an alkyl having 1 to 6 carbon atoms, an alkoxy having 1 to 6 carbon atoms, an alkoxyalkyl having 2 to 6 carbon atoms and an alkenyl having 2 to 6 carbon atoms, and particularly preferred examples of Rb include an alkyl having 1 to 6 carbon atoms and an alkoxy having 1 to 6 carbon atoms.

Specific examples of Ra and Rb are shown below. Examples of the alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$ and —C$_8$H$_{17}$. Examples of the alkoxy include —OCH$_3$, —OC$_2$H$_5$, —OC$_3$H$_7$, —OC$_4$H$_9$, —OC$_5$H$_{11}$, —OC$_6$H$_{13}$ and —OC$_7$H$_{15}$. Examples of the alkoxyalkyl include —CH$_2$OCH$_3$, —CH$_2$OC$_2$H$_5$, —CH$_2$OC$_3$H$_7$, —(CH$_2$)$_2$OCH$_3$, —(CH$_2$)$_2$OC$_2$H$_5$, —(CH$_2$)$_2$OC$_3$H$_7$, —(CH$_2$)$_3$OCH$_3$, —(CH$_2$)$_4$OCH$_3$ and —(CH$_2$)$_5$OCH$_3$.

Examples of the alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$ and —(CH$_2$)$_3$CH=CH$_2$. Examples of the alkenyloxy include —OCH$_2$CH=CH$_2$, —OCH$_2$CH=CHCH$_3$ and —OCH$_2$CH=CHC$_2$H$_5$. Examples of the alkynyl include —C≡CCH$_3$ and —C≡CC$_3$H$_7$.

Examples of the alkyl, in which at least one hydrogen is replaced by halogen, include —CH$_2$F, —CHF$_2$, —CF$_3$, —(CH$_2$)$_2$F, —CF$_2$CH$_2$F, —CF$_2$CHF$_2$, —CH$_2$CF$_3$, —CF$_2$CF$_3$, —(CH$_2$)$_3$F, —(CF$_2$)$_2$CF$_3$, —CF$_2$CHFCF$_3$ and —CHFCF$_2$CF$_3$. Examples of the alkoxy, in which at least one hydrogen is replaced by halogen, include —OCF$_3$, —OCHF$_2$, —OCH$_2$F, —OCF$_2$CF$_3$, —OCF$_2$CHF$_2$, —OCF$_2$CH$_2$F, —OCF$_2$CF$_2$CF$_3$, —OCF$_2$CHFCF$_3$ and —OCHFCF$_2$CF$_3$. Examples of the alkenyl, in which at least one hydrogen is replaced by halogen, include —CH=CHF, —CH=CF$_2$, —CF=CHF, —CH=CHCH$_2$F, —CH=CHCF$_3$ and —(CH$_2$)$_2$CH=CF$_2$.

Preferred examples of Ra and Rb include —CH$_3$, —C$_2$H$_5$, —C$_3$H$_7$, —C$_4$H$_9$, C$_5$H$_{11}$, —OCH$_3$, —OC$_2$H$_5$, —OC$_3$H$_7$, —OC$_4$H$_9$, —OC$_5$H$_{11}$, —CH$_2$OCH$_3$, —(CH$_2$)$_2$OCH$_3$, —(CH$_2$)$_3$OCH$_3$, —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$, —(CH$_2$)$_3$CH=CH$_2$, —OCH$_2$CH=CH$_2$, —OCH$_2$CH=CHCH$_3$, —OCH$_2$CH=CHC$_2$H$_5$, —CF$_3$, —CHF$_2$, —CH$_2$F, —OCF$_3$, —OCHF$_2$, —OCH$_2$F, —OCF$_2$CF$_3$, —OCF$_2$CHF$_2$, —OCF$_2$CH$_2$F, —OCF$_2$CF$_2$CF$_3$, —OCF$_2$CHFCF$_3$ and —OCHFCF$_2$CF$_3$.

More preferred examples of Ra and Rb include —CH$_3$, —C$_2$H$_5$, —C$_3$H$_7$, —C$_4$H$_9$, —C$_5$H$_{11}$, —OCH$_3$, —OC$_2$H$_5$, —OC$_3$H$_7$, —OC$_4$H$_9$, —OC$_5$H$_{11}$, —CH$_2$OCH$_3$, —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$, —(CH$_2$)$_3$CH=CH$_2$, —CH$_2$F and —OCH$_2$F.

Particularly preferred examples of Ra and Rb include —CH$_3$, —C$_2$H$_5$, —C$_3$H$_7$, —C$_4$H$_9$, —C$_5$H$_{11}$, —OCH$_3$, —OC$_2$H$_5$, —OC$_3$H$_7$, —CH$_2$OCH$_3$, —CH=CH$_2$, —CH=CHCH$_3$, —(CH$_2$)$_2$CH=CH$_2$ and —(CH$_2$)$_2$CH=CHCH$_3$.

In Formula (1), ring $A^1$ is 1,4-cyclohexylene, 1,4-phenylene, pyridine-2,5-diyl, pyridazine-3,6-diyl, decahydronaphthalene-2,6-diyl, 1,2,3,4-tetrahydronaphthalene-2,6-diyl, 5,6,7,8-tetrahydronaphthalene-2,6-diyl, or naphthalene-2,6-diyl. In the rings, arbitrary —CH$_2$-constituting the rings may be replaced by —O—, —S—, —CO—, or —SiH$_2$—, and arbitrary —(CH$_2$)$_2$— constituting the rings may be replaced by —CH=CH—. Arbitrary hydrogen directly bonded to the rings may be replaced by halogen, —CF$_3$, —CHF$_2$, —CH$_2$F, —OCF$_3$, —OCHF$_2$, or —OCH$_2$F.

Examples of the rings, in which arbitrary —CH$_2$— is replaced by —O—, —S—, —CO—, or —SiH$_2$—, and examples of the rings, in which arbitrary —(CH$_2$)$_2$— is replaced by —CH=CH—, are shown below. Among (15-1) to (15-48) shown below, preferred examples thereof include (15-1), (15-2), (15-3), (15-4), (15-15), (15-23), (15-31), (15-32), (15-33), (15-40), (15-43) and (15-48).

(15-1)

(15-2)

(15-3)

(15-4)

-continued (15-5) (15-6) (15-7) (15-8) (15-9) (15-10) (15-11) (15-12) (15-13) (15-14) (15-15) (15-16) (15-17)

-continued (15-18) (15-19) (15-20) (15-21) (15-22) (15-23) (15-24) (15-25) (15-26) (15-27)

-continued
(15-28) 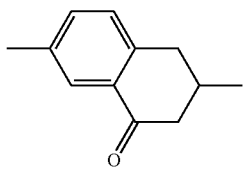
(15-29) 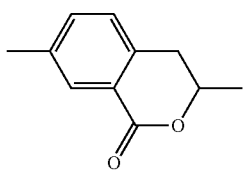
(15-30) 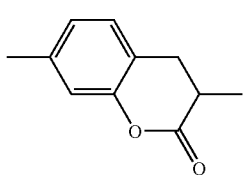
(15-31) 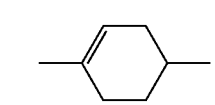
(15-32) 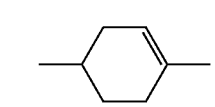
(15-33) 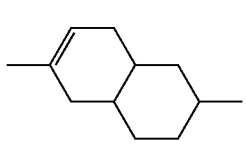
(15-34) 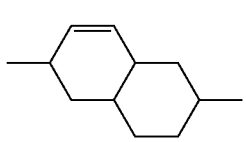
(15-35) 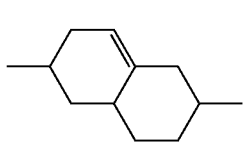
(15-36) 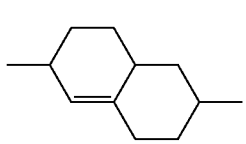
(15-37) 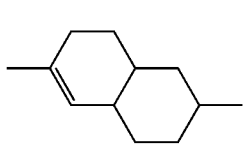
(15-38) 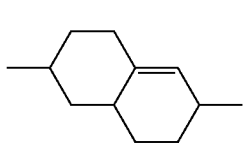
-continued
(15-39) 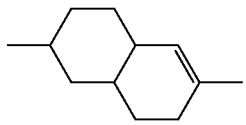
(15-40) 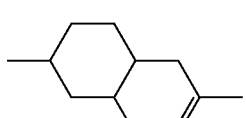
(15-41) 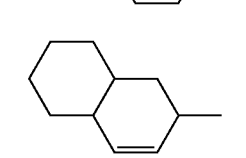
(15-42) 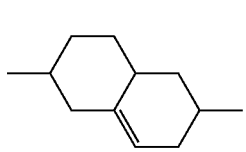
(15-43) 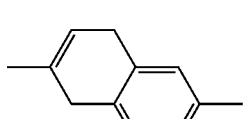
(15-44) 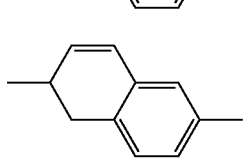
(15-45) 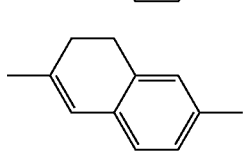
(15-46) 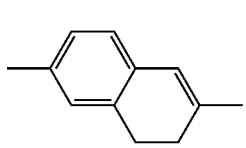
(15-47) 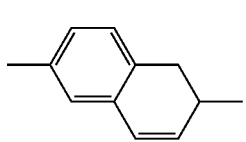
(15-48)
Examples of the rings, in which arbitrary hydrogen may be replaced by halogen, —$CF_3$, —$CHF_2$, —$CH_2F$, —$OCF_3$, —$OCHF_2$, or —$OCH_2F$, are shown below. Among (16-1) to (16-71) shown below, preferred examples thereof include (16-1), (16-2), (16-3), (16-4), (16-6), (16-10), (16-11), (16-12), (16-13), (16-14), (16-15), (16-54), (16-55), (16-56), (16-57), (16-58) and (16-59).

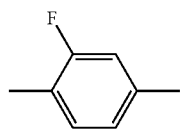 (16-1)
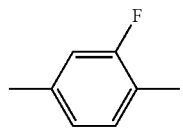 (16-2)
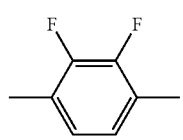 (16-3)
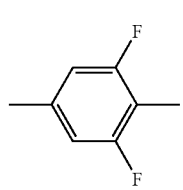 (16-4)
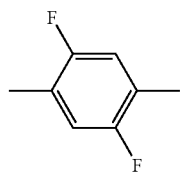 (16-5)
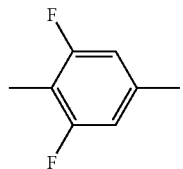 (16-6)
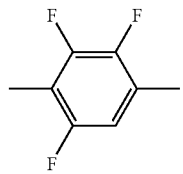 (16-7)
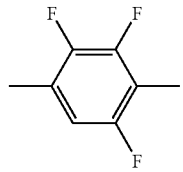 (16-8)
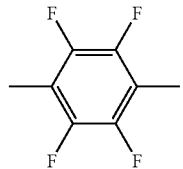 (16-9)
-continued
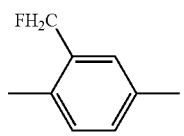 (16-10)
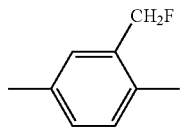 (16-11)
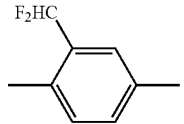 (16-12)
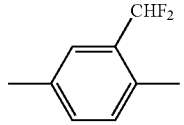 (16-13)
 (16-14)
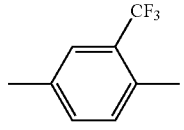 (16-15)
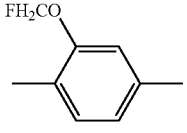 (16-16)
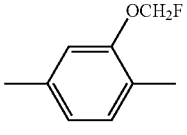 (16-17)
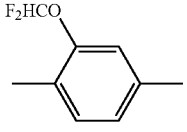 (16-18)
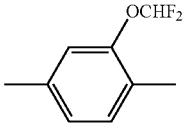 (16-19)
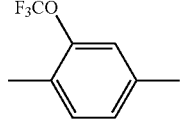 (16-20)

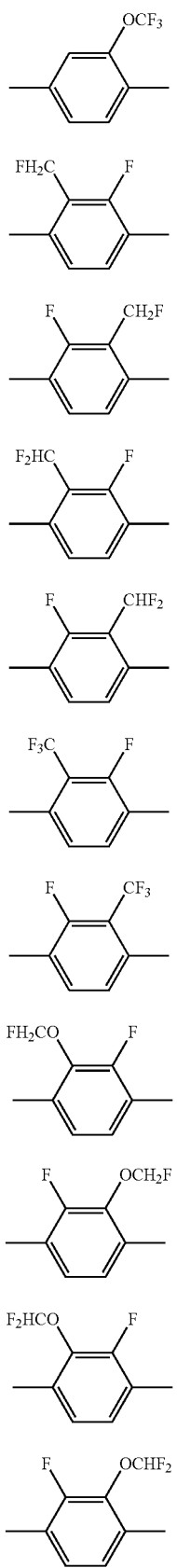 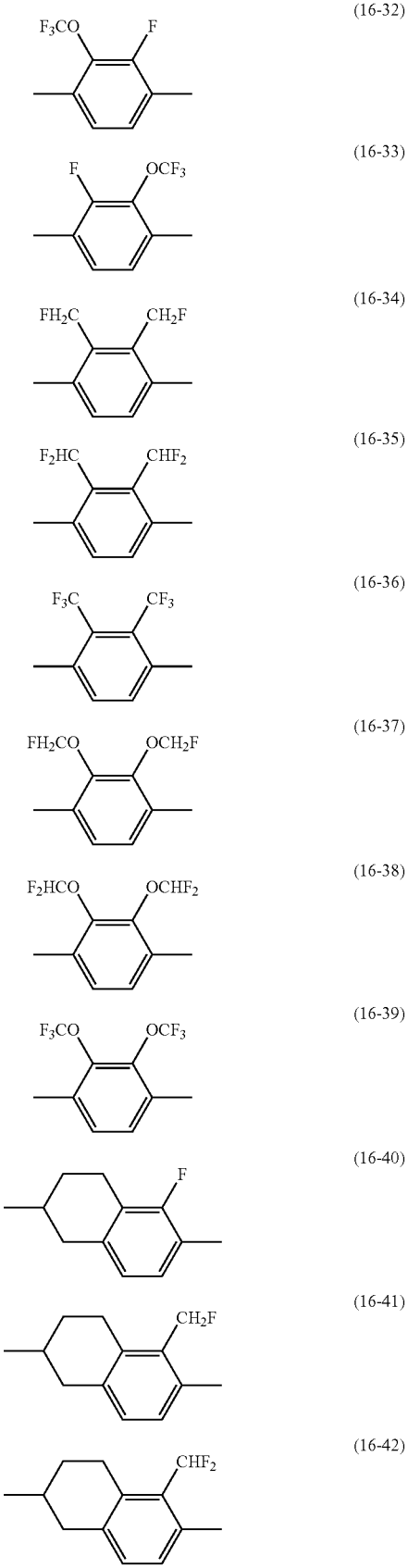

-continued
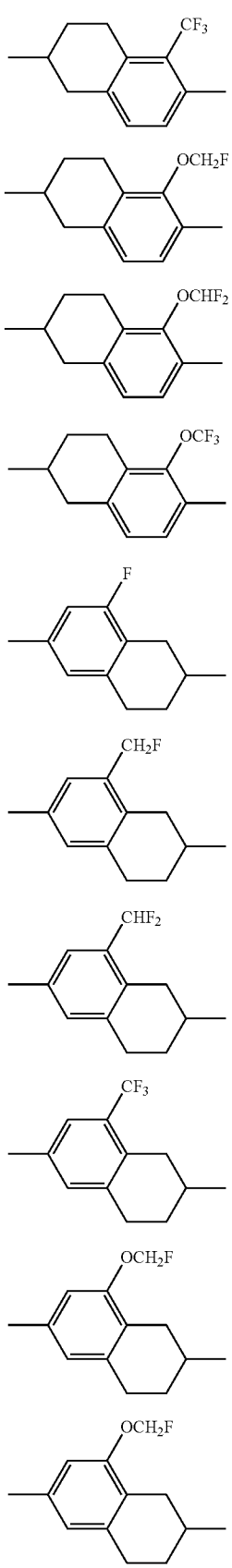
(16-43)
(16-44)
(16-45)
(16-46)
(16-47)
(16-48)
(16-49)
(16-50)
(16-51)
(16-52)
-continued
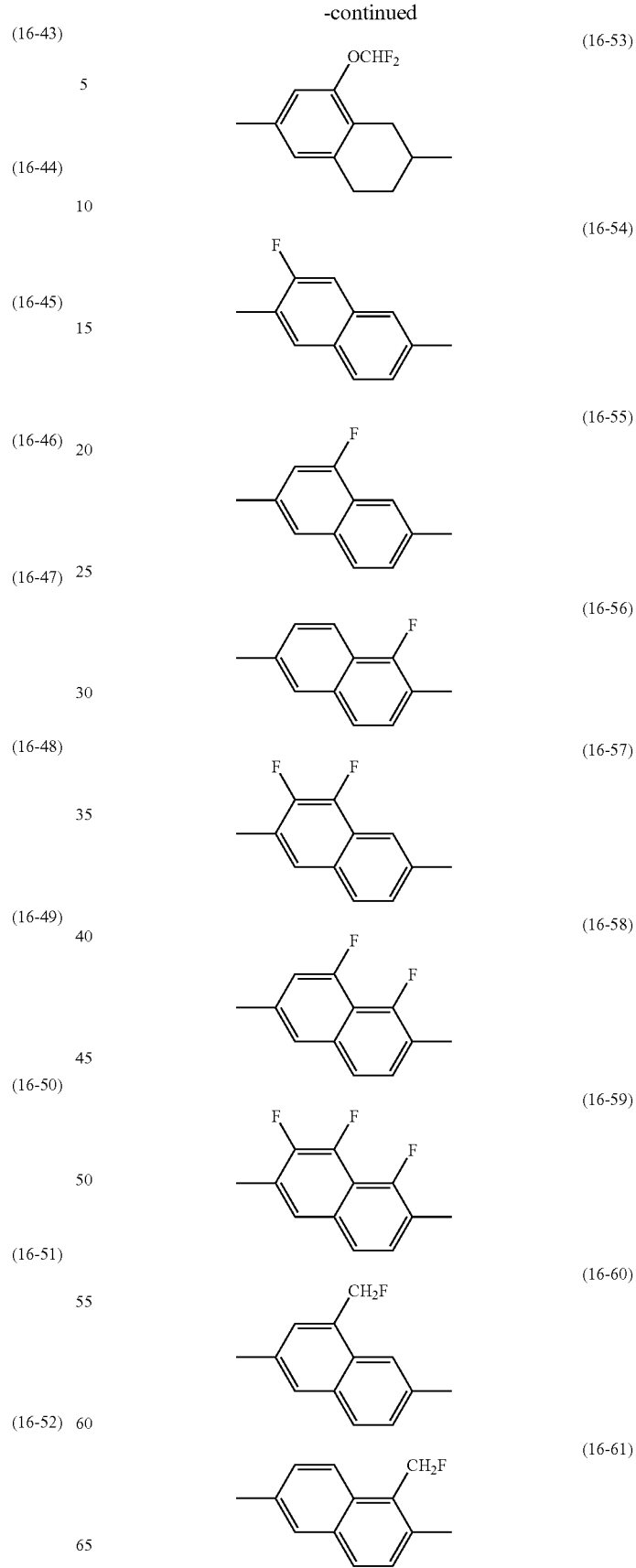
(16-53)
(16-54)
(16-55)
(16-56)
(16-57)
(16-58)
(16-59)
(16-60)
(16-61)

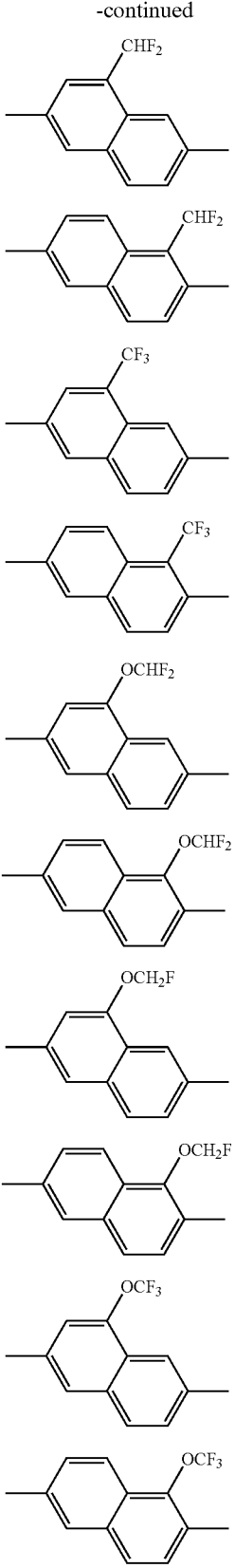

Examples of the ring $A^1$ include 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyridine-2,5-diyl, 6-fluoropyridine-2,5-diyl, pyridazine-2,5-diyl, decahydronaphthalene-2,6-diyl, 1,2,3,4-tetrahydronaphthalene-2,6-diyl and naphthalene-2,6-diyl. A cis configuration is preferred rather than a trans configuration as the steric configuration of 1,4-cyclohexylene and 1,3-dioxane-2,5-diyl.

Preferred examples of the ring $A^1$ include 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl and pyridazine-2,5-diyl.

More preferred examples of the ring $A^1$ include 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene and 2,6-difluoro-1,4-phenylene.

Further preferred examples of the ring $A^1$ include 1,4-cyclohexylene, 1,4-phenylene, 2-fluoro-1,4-phenylene and 2,3-difluoro-1,4-phenylene.

Particularly preferred examples of the ring $A^1$ include 1,4-cyclohexylene and 1,4-phenylene.

In Formula (1), $Z^1$ is a single bond or an alkylene having 1 to 4 carbon atoms. In the alkylene, arbitrary —$CH_2$— may be replaced by —O—, —S—, —CO—, —$SiH_2$—, —CH=CH—, —CH=CF—, —CF=CH—, —CF=CF—, or —C≡C—, and arbitrary hydrogen may be replaced by halogen.

Examples of $Z^1$ include a single bond, —$(CH_2)_2$—, —COO—, —OCO—, —$CH_2O$—, —$OCH_2$—, —$CF_2O$—, —$OCF_2$—, —CH=CH—, —CH=CF—, —CF=CH—, —CF=CF—, —C≡C—, —$CH_2CO$—, —$COCH_2$—, —$CH_2SiH_2$—, —$SiH_2CH_2$—, —$(CH_2)_4$—, —$(CH_2)_2COO$—, —$OCO(CH_2)_2$—, —$(CH_2)_2CF_2O$—, —$(CH_2)_2OCF_2$—, —$CF_2O(CH_2)_2$—, —$OCF_2(CH_2)_2$—, —$(CH_2)_3O$—, —$O(CH_2)_3$—, —CH=CH—$CH_2O$— and —$OCH_2$—CH=CH—. A trans configuration is more preferred than a cis configuration as the double bond of such groups as —CH=CH—, —CF=CF—, —CH=CH—$CH_2O$— and —$OCH_2$—CH=CH—.

Preferred examples of $Z^1$ include a single bond, —$(CH_2)_2$—, —COO—, —OCO—, —$CH_2O$—, —$OCH_2$—, —$CF_2O$—, —$OCF_2$—, —CH=CH—, —CF=CF—, —C≡C—, —$CH_2CO$—, —$COCH_2$—, —$CH_2SiH_2$—, —$SiH_2CH_2$—, —$(CH_2)_2COO$—, —$OCO(CH_2)_2$—, —$(CH_2)_2CF_2O$—, —$OCF_2(CH_2)_2$—, —$(CH_2)_3O$—, —$O(CH_2)_3$— and —$(CH_2)_4$—.

More preferred examples of $Z^1$ include a single bond, —$(CH_2)_2$—, —COO—, —OCO—, —$CH_2O$—, —$OCH_2$—, —$CF_2O$—, —$OCF_2$—, —CH=CH—, —CF=CF—, —C≡C—, —$(CH_2)_2COO$—, —$OCO(CH_2)_2$—, —$(CH_2)_2CF_2O$—, —$OCF_2(CH_2)_2$—, —$(CH_2)_3O$—, —$O(CH_2)_3$— and —$(CH_2)_4$—.

Further preferred examples of $Z^1$ include a single bond, —$(CH_2)_2$—, —COO—, —OCO—, —$CH_2O$—, —$OCH_2$—, —$CF_2O$—, —$OCF_2$—, —CH=CH— and —C≡C—.

Particularly preferred examples of $Z^1$ include a single bond and —$(CH_2)_2$—, and the most preferred example of $Z^1$ is a single bond.

In Formula (1), $Y^1$ is hydrogen, halogen, —CN, —$CF_3$, —$CHF_2$, —$CH_2F$, —$OCF_3$, —$OCHF_2$, or —$OCH_2F$. Preferred examples of the halogen include fluorine and chlorine. The most preferred example of the halogen is fluorine. Preferred examples of $Y^1$ include hydrogen, fluorine, chlorine, —$CF_3$, —$CHF_2$, —$CH_2F$, —$OCF_3$, —$OCHF_2$ and —$OCH_2F$. More preferred examples of $Y^1$ include hydrogen, fluorine, chlorine, —$CF_3$, —$CHF_2$ and —$CH_2F$. Further preferred examples of $Y^1$ include hydrogen, fluorine, $-CF_2H$ and $-CF_3$. Particularly preferred examples of $Y^1$ include hydrogen and fluorine, and the most preferred example of $Y^1$ is hydrogen.

Examples obtained by combining the preferred ranges of Ra, Rb, $A^1$, $Z^1$ and $Y^1$ in Formula (1) are the aforementioned items [2] to [5], and examples obtained by further combining the preferred range of m are the aforementioned items [6] to [9].

In Formula (1), m is 1, 2, or 3, and accordingly, Formula (1) is expanded to Formulae (1-1), (1-2) and (1-3) below.

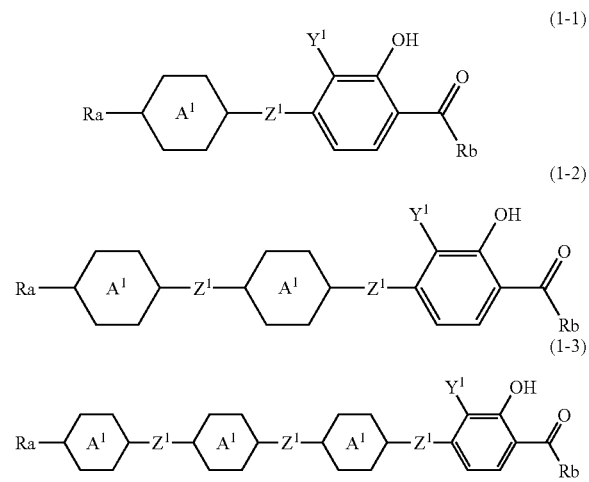

The symbols in the formulae have the same meanings as in Formula (1). In Formulae (1-2) and (1-3), plural rings $A^1$ may be identical groups or different groups, and plural $Z^1$ may be identical groups or different groups.

Compound (1) may contain isotopes, such as 2H (deuterium) and $^{13}C$, in an amount that is larger than the natural abundance. The properties of the compound suffer no large difference in these cases.

The characteristics of Compound (1) will be described in more detail. Compound (1) is a bicyclic, tricyclic or tetracyclic compound having a hydroxyl group when a condensed ring, such as a naphthalene ring, is counted as one ring.

The compound is significantly stable physically and chemically under conditions where the device is generally used, and has favorable compatibility with other liquid crystal compounds. A composition containing the compound is stable under conditions where the device is generally used. The composition causes no deposit of the compound as crystals (or a smectic phase) upon storing the composition at a low temperature. The compound has general properties necessary for the compound, a suitable optical anisotropy and a suitable dielectric anisotropy.

Compound (1) can be arbitrarily controlled in properties, such as optical anisotropy and dielectric anisotropy, by properly selecting the terminal groups, the rings and the bonding groups. The effect of the kinds of the terminal groups Ra and Rb, the rings $A^1$ and the bonding groups $Z^1$ on the property of Compound (1) will be described below.

Compound (1) has a negatively large dielectric anisotropy. The compound having a negatively large dielectric anisotropy is a component for decreasing the threshold voltage of the composition. In the case where Ra and Rb are hydrogen, an alkyl, an alkoxy or the like, and $Y^1$ is halogen, an alkyl halide or the like, the compound has a negatively large dielectric anisotropy.

In the case where Ra or Rb is a linear group, the liquid crystal phase has a wide temperature range and a low viscosity. In the case where Ra or Rb is a branched group, it has a good compatibility with other liquid crystal compounds. The compound, in which Ra or Rb is an optically active group, is useful as a chiral dopant. By the addition of the compound to the composition, a reverse twisted domain generated in the device can be prevented. A compound, in which Ra or Rb is not an optically active group, is useful as a component for the composition. In the case where Ra or Rb is an alkenyl, a preferred steric configuration depends on the position of the double bond. An alkenyl compound having a preferred steric configuration has a high upper limit temperature or a wide temperature range of the liquid crystal phase. Details thereof are disclosed in Mol. Cryst. Liq. Cryst., vol. 131, p. 109 (1985) and Mol. Cryst. Liq. Cryst., vol. 131, p. 327 (1985).

In the case where ring $A^1$ is 1,4-phenylene, in which hydrogens at the 2- and 3-positions are replaced by halogen or the like, the compound has a negatively large dielectric anisotropy. In the case where ring $A^1$ is 1,4-phenylene in which arbitrary hydrogen may be replaced by halogen, pyridine-2,5-diyl, pyrimidine-2,5-diyl, or pyridazine-2,5-diyl, the compound has a large optical anisotropy. In the case where ring $A^1$ is 1,4-cyclohexylene, 1,4-cyclohexenylene, or 1,3-dioxane-2,5-diyl, the compound has a small optical anisotropy.

In the case where at least two rings are 1,4-cyclohexylene, the compound has a high upper limit temperature, a small optical anisotropy and a small viscosity. In the case where at least one ring is 1,4-phenylene, the compound has a relatively large optical anisotropy and a large orientational order parameter. In the case where at least two rings are 1,4-phenylene, the compound has a large optical anisotropy, a wide temperature range of a liquid crystal phase and a high upper limit temperature.

In the case where the bonding group $Z^1$ is a single bond, $-(CH_2)_2-$, $-CH_2O-$, $-OCH_2-$, $-CF_2O-$, $-OCF_2-$, $-CH=CH-$, $-CF=CF-$, or $-(CH_2)_4-$, the compound has a small viscosity. In the case where the bonding group is a single bond, $-(CH_2)_2-$, $-CF_2O-$, $-OCF_2-$, or $-CH=CH-$, the compound has a smaller viscosity. In the case where the bonding group is $-CH=CH-$, the compound has a wide temperature range of a liquid crystal phase and a large elastic constant ratio $K_{33}/K_{11}$ ($K_{33}$: bend elastic constant, $K_{11}$: spray elastic constant). In the case where the bonding group is $-C\equiv C-$, the compound has a large optical anisotropy.

In the case where the substituting group $Y^1$ is halogen, $-CN$, $-CF_3$, $-CF_2H$, $-OCF_3$, or $-OCF_2H$, the compound has a negatively larger dielectric anisotropy. In the case where $Y^1$ is halogen, $-CF_3$, or $-CF_2H$, the compound has a wide temperature range of a liquid crystal phase.

In the case where Compound (1) has two rings or three rings, the compound has a small viscosity. In the case where Compound (1) has three rings or four rings, the compound has a high upper limit temperature. As described above, a compound having aimed physical property can be obtained by properly selecting the kind of the terminal groups, the rings and the bonding groups, and the number of rings. Accordingly, Compound (1) is useful as a component of the composition used for devices of PC, TN, STN, ECB, OCB, IPS, VA and the like.

Compound (1) can be classified into Compounds (1-1) to (1-3) as described above. More specific examples of the compounds include Compound (1-1-1) to (1-3-2) shown below.

The symbols Ra, Rb, A$^1$, and Z$^1$ in the compounds have the same meanings as in Formula (1). Y$^1$ is halogen, —CN, —CF$_3$, —CHF$_2$, —CH$_2$F, —OCF$_3$, —OCHF$_2$, or —OCH$_2$F.

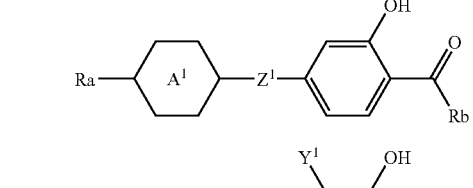
(1-1-1)

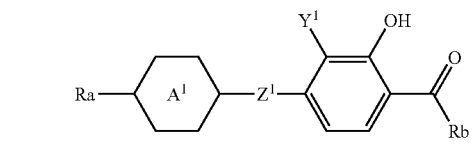
(1-1-2)

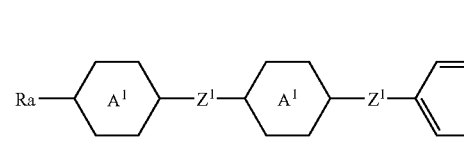
(1-2-1)

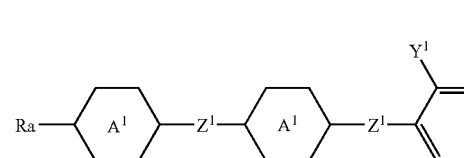
(1-2-2)

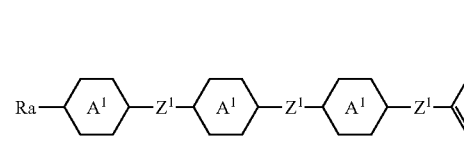
(1-3-1)

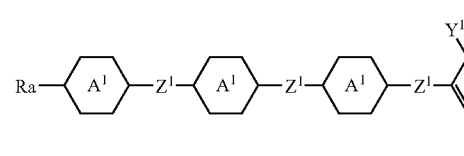
(1-3-2)

Compound (1) can be synthesized by properly combining the methods in the organic synthesis chemistry. The methods of introducing an aimed terminal groups, rings, and bonding groups to the starting material are described, for example, in Organic Synthesis, John Wiley & Sons, Inc.; Organic Reactions, John, Wiley & Sons, Inc.; Comprehensive Organic Synthesis, Pergamon Press; and New Experimental Chemical Course (Maruzen).

As an example of the method of forming the bonding group Z$^1$, a scheme is at first shown and then the scheme is explained in the items (I) to (XI). In the scheme, MSG$^1$ or MSG$^2$ is a monovalent organic group having at least one ring. A plurality of MSG$^1$ (or MSG 2) used in the scheme may be identical to or different from each other. Compounds (1A) to (1K) correspond to Compound (1).

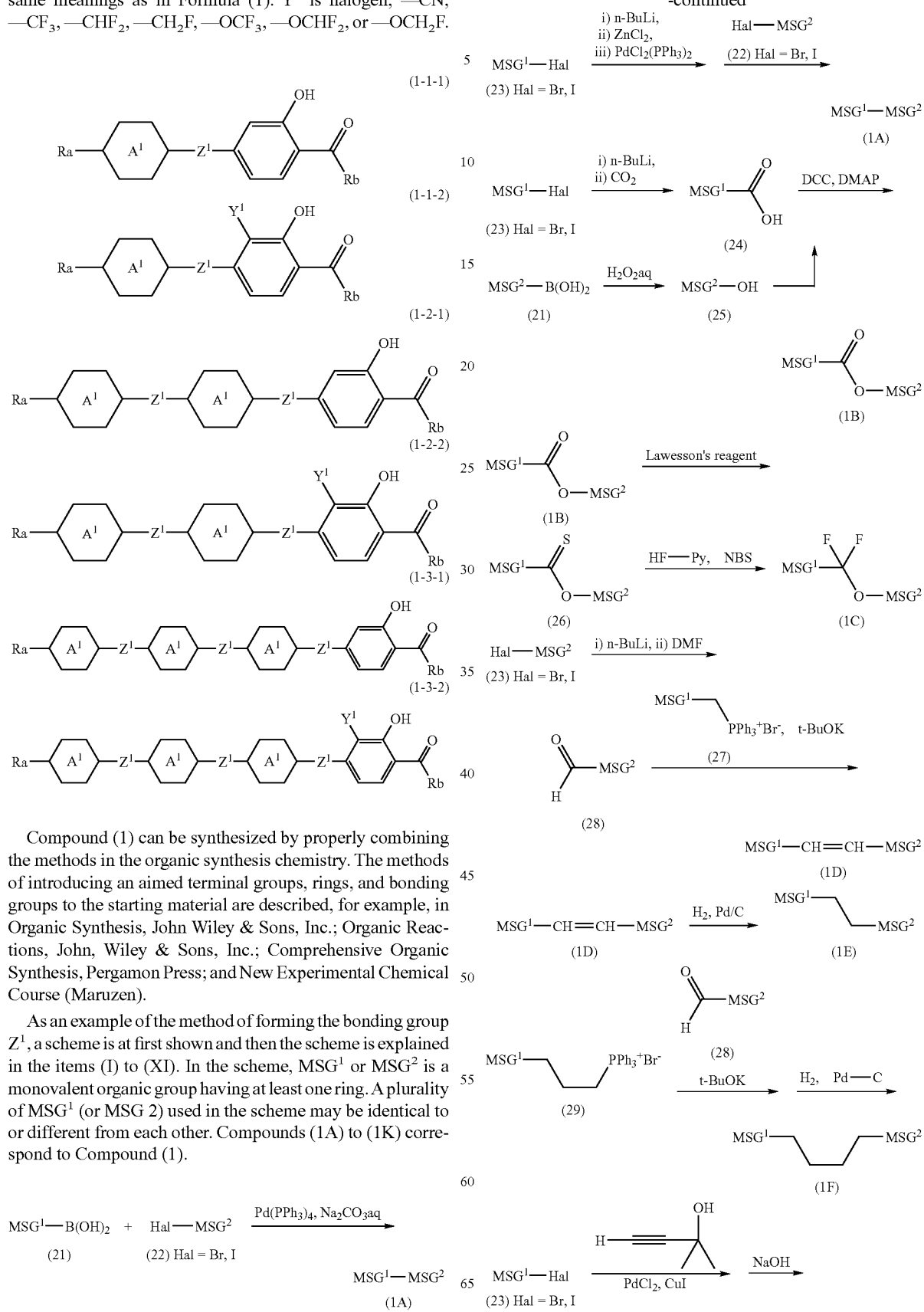

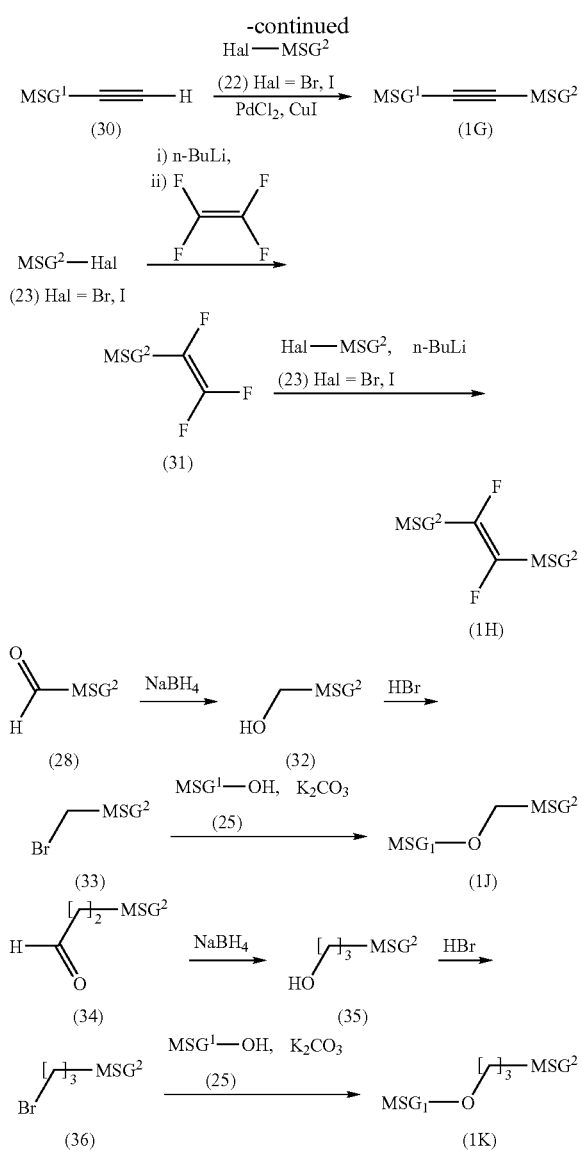

(I) Formation of Single Bond

Aryl boronic acid (21) and a compound (22) synthesized by a known method are reacted in the presence of an aqueous carbonate solution and a catalyst, such as tetrakis(triphenylphosphine) palladium, to synthesize Compound (1A). Compound (1A) is also synthesized by reacting a compound (23) synthesized by a known method with n-butyl lithium, then with zinc chloride, and reacting a compound (22) in the presence of a catalyst, such as dichlorobis(triphenylphosphine)palladium.

(II) Formation of —COO— and —OCO—

The compound (23) is reacted with n-butyl lithium and successively with carbon dioxide to obtain a carboxylic acid (24). The compound (24) and a phenol compound (25) synthesized by a known method are dehydrated in the presence of DCC (1,3-dicyclohexylcarbodiimide) and DMAP (4-dimethylaminopyridine) to synthesize Compound (1B) having —COO—. A compound having —OCO— is also synthesized by the method.

(III) Formation of —CF$_2$O— and —OCF$_2$—

Compound (1B) is treated with a sulfurizing agent such as a Lawesson's reagent to obtain a compound (26). The compound (26) is fluorinated with a pyridine hydrogen fluoride complex and NBS (N-bromosuccinimide) to synthesize Compound (1C) having —CF$_2$O— (refer to M. Kuroboshi, et al., Chem. Lett., 1992, p. 827). Compound (1C) is also synthesized by fluorinating the compound (26) with (diethylamino)sulfur trifluoride (DAST) (refer to W. H. Bunnelle, et al., J. Org. Chem., vol. 55, p. 768 (1990)). A compound having —OCF$_2$— is also synthesized by the method. The bonding groups can also be formed by the method as described in Peer, Kirsch, et al., Anbew. Chem. Int. Ed., vol. 40, p. 1480 (2001).

(IV) Formation of —CH=CH—

After treating the compound (23) with n-butyl lithium, it is reacted with formamide, such as N,N-dimethylformamide (DMF), to obtain an aldehyde (28). Compound (1D) is synthesized by treating a phosphonium salt (27) synthesized by a known method with a base, such as potassium tert-butoxide, to generate phosphonium ylide, which is reacted with the aldehyde (28). Since a cis-form is formed depending on the reaction condition, the cis-form is isomerized into a transform optionally by a known method.

(V) Formation of —(CH$_2$)$_2$—

Compound (1E) is synthesized by hydrogenating Compound (1D) in the presence of a catalyst, such as palladium/carbon.

(VI) Formation of —(CH$_2$)$_4$—

A compound having —(CH$_2$)$_2$—CH=CH— is obtained according to the method of the item (IV) using a phosphonium salt (29) instead of the phosphonium salt (27). The compound is catalytically hydrogenated to synthesize Compound (1F).

(VII) Formation of —C≡C—

A compound (23) is reacted with 2-methyl-3-butyne-2-ol in the presence of a catalyst of dichloro(triphenylphosphine) palladium and copper halide, and then deprotected under a basic condition, to obtain a compound (30). Compound (1G) is synthesized by reacting the compound (30) with a compound (22) in the presence of a catalyst of dichloro(triphenylphosphine)palladium and copper halide.

(VIII) Formation of —CF=CF—

After treating a compound (23) with n-butyl lithium, a tetrafluoroethylene is reacted to obtain a compound (31). After treating a compound (22) with n-butyl lithium, it is reacted with the compound (31) to obtain Compound (1H).

(IX) Formation of —CH$_2$O— or —OCH$_2$—

A compound (28) is reduced with a reducing agent, such as sodium borohydrate, to obtain a compound (32).

The compound is halogenated, for example, with a hydrobromic acid to obtain a compound (33). The compound (33) is reacted with a compound (25) in the presence of potassium carbonate or the like to synthesize Compound (1J).

(X) Formation of —(CH$_2$)$_3$O— or —O(CH$_2$)$_3$—

Compound (1K) is synthesized in according to the method of the item (IX) by using a compound (34) instead of the compound (28).

(XI) Formation of —(CF$_2$)$_2$—

Diketone (—COCO—) is fluorinated with sulfur tetrafluoride in the presence of a hydrogen fluoride catalyst according to the method disclosed in J. Am. Chem. Soc., vol. 123, p. 5414 (2001) to obtain a compound having —(CF$_2$)$_2$—.

The liquid crystal composition of the invention will be described. The liquid crystal composition of the invention is a composition containing at least one of Compound (1). The components of the composition may consist only of plural compounds selected from Compound (1). A preferred composition contains at least one compound selected from Compound (1) at a ratio of from 1 to 99%. The composition may contain a component selected from the group consisting of Compounds (2) to (14). Upon preparing the composition, the components are selected in consideration of the dielectric anisotropy of Compound (1).

Preferred combinations that are favorable for preparing a composition containing Compound (1) and having a positively large dielectric anisotropy, are shown below. A first example is a combination of Compound (1) and at least one compound selected from the group consisting of Compound (2), Compound (3) and Compound (4) (Composition a). A second example is a combination of Compound (1) and at least one compound selected from the group consisting of Compound (5) and Compound (6) (Composition b). A third example is a combination of Compound (1), at least one compound selected from the group consisting of Compound (2), Compound (3) and Compound (4), and at least one compound selected from the group consisting of Compound (5) and Compound (6). A fourth example is a combination of Compound (1) and at least one compound selected from the group consisting of Compound (12), Compound (13) and Compound (14). Composition a and Composition b may further contain at least one compound selected from the group consisting of Compound (12), Compound (13) and Compound (14) for the purpose of controlling the temperature range of a liquid crystal phase, the viscosity, the optical anisotropy, the dielectric anisotropy, the threshold voltage and the like. The compositions may further contain at least one compound selected from the group consisting of Compounds (7) to (11) for the purpose of controlling the properties. The compositions may further contain other liquid crystal compounds and compounds, such as additives, for the purpose of conforming to an AM-TN device, an STN device and the like.

An example of a combination that is suitable for preparing a composition containing Compound (1) and having a negatively large dielectric anisotropy, is a combination of Compound (1) and at least one compound selected from the group consisting of Compounds (7) to (11) (Composition c). The composition may further contain at least one compound selected from the group consisting of Compounds (12), (13) and (14). Composition c may further contain at least one compound selected from the group consisting of Compounds (2) to (6) for the purpose of controlling the properties. The compositions may further contain other liquid crystal compounds and compounds, such as additives, for the purpose of conforming to a VA device and the like.

Upon preparing a composition having a small dielectric anisotropy by using Compound (1), compounds selected from the group consisting of Compounds (2) to (14) may be appropriately combined. In this case, the ratios of the compounds may be controlled to make the dielectric anisotropy of the composition small in consideration of the temperature range of a liquid crystal phase, the viscosity, the optical anisotropy, the threshold voltage and the like. In this case, the other liquid crystal compounds and compounds, such as additives, may further be used in combination for the purpose of conforming to an AM-TN device, an STN device and the like.

Compounds (2), (3) and (4) are used mainly for a composition for an AM-TN device owing to the positively large dielectric anisotropy thereof. In Composition a, the amount of the compounds is from 1 to 99%, preferably from 10 to 97%, and more preferably from 40 to 95%. In the case where the composition contains at least one compound of Compounds (12), (13) and (14), the amount of the compounds is preferably 60% or less, and more preferably 40% or less.

Compounds (5) and (6) are used mainly for a composition for an STN device owing to the positively significantly large dielectric anisotropy thereof. In Composition b, the amount of the compounds is from 1 to 99%, preferably from 10 to 97%, and more preferably from 40 to 95%. In the case where the composition contains at least one compound of Compounds (12), (13) and (14), the amount of the compounds is preferably 60% or less, and more preferably 40% or less.

Compounds (7), (8), (9), (10) and (11) are used mainly for a composition for a VA device owing to the negative dielectric anisotropy thereof. In Composition c, the amount of the compounds is preferably 80% or less, and more preferably from 40 to 80%. In the case where the composition contains at least one compound of Compounds (12), (13) and (14), the amount of the compounds is preferably 60% or less, and more preferably 40% or less.

Compounds (12), (13) and (14) have a small dielectric anisotropy. Compound (12) is used mainly for the purpose of controlling the viscosity or the optical anisotropy. Compounds (13) and (14) are used mainly for the purpose of increasing the upper limit temperature for expanding the temperature range of a liquid crystal phase, and of controlling the optical anisotropy. When the amount of Compounds (12), (13) and (14) is increased, the threshold voltage of the composition is increased, and the viscosity of the composition is decreased. Accordingly, the compounds may be used in a large amount as far as the threshold voltage of the composition satisfies the demanded value.

Preferred examples of Compounds (2) to (14) include Compounds (2-1) to (2-9), Compounds (3-1) to (3-97), Compounds (4-1) to (4-33), Compounds (5-1) to (5-56), Compounds (6-1) to (6-3), Compounds (7-1) to (7-4), Compounds (8-1) to (8-6), Compounds (9-1) to (9-4), Compound (10-1), Compound (11-1), Compounds (12-1) to (12-11), Compounds (13-1) to (13-21) and Compounds (14-1) to (14-6) shown below. The symbols, $R^1$, $R^2$, $X^1$ and $X^2$, in the formulae have the same meanings as these symbols in Formulae (2) to (14).

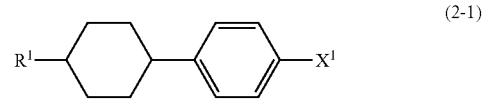

(2-1)

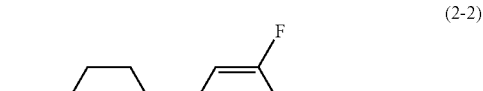

(2-2)

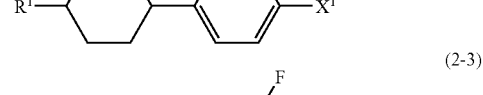

(2-3)

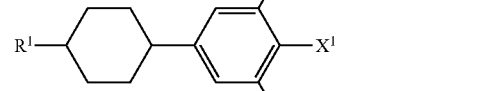

(2-4)

-continued
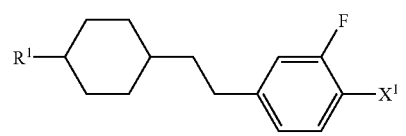 (2-5)
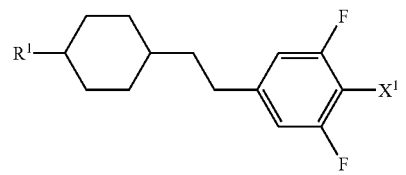 (2-6)
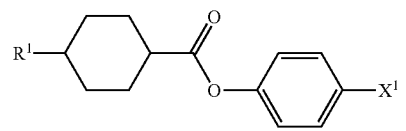 (2-7)
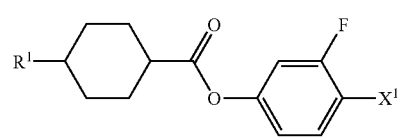 (2-8)
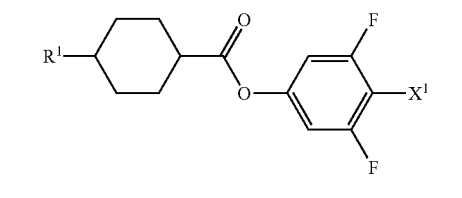 (2-9)
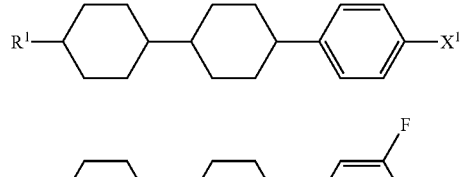 (3-1)
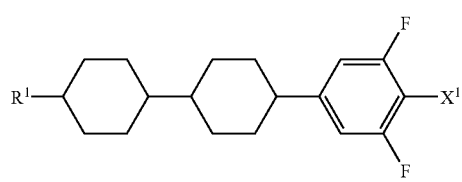 (3-2)
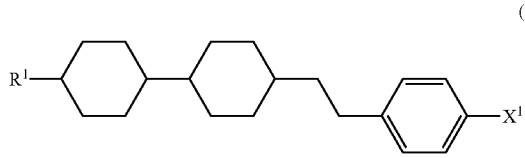 (3-3)
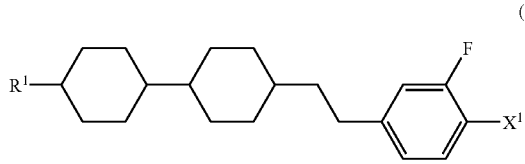 (3-4)
(3-5)
-continued
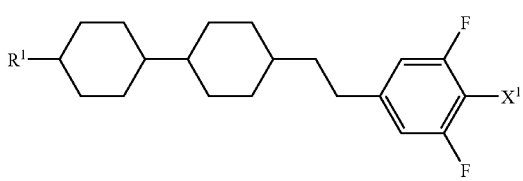 (3-6)
 (3-7)
 (3-8)
 (3-9)
 (3-10)
 (3-11)
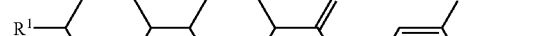 (3-12)
 (3-13)
 (3-14)

-continued
(3-15)
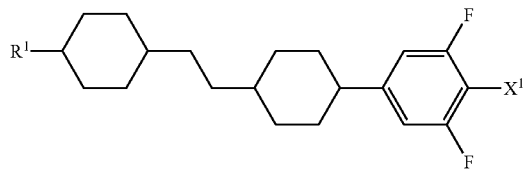
(3-16)
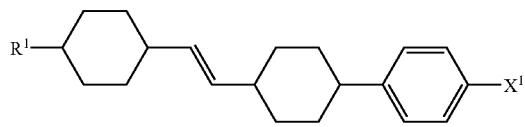
(3-17)
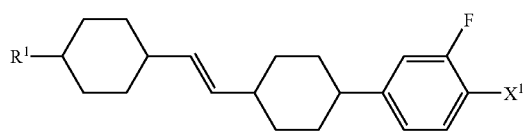
(3-18)
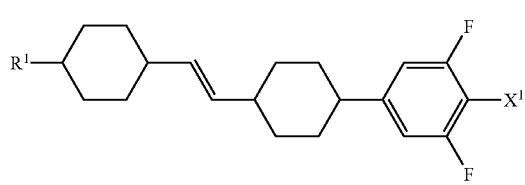
(3-19)
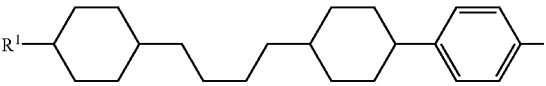
(3-20)
(3-21)
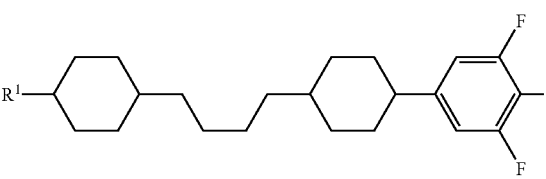
(3-22)
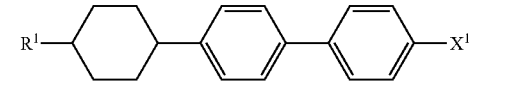
(3-23)
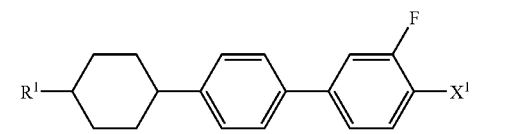
-continued
(3-24)
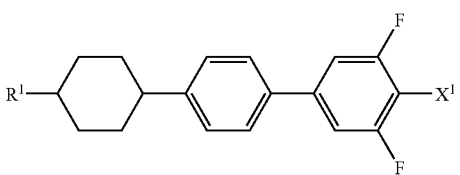
(3-25)
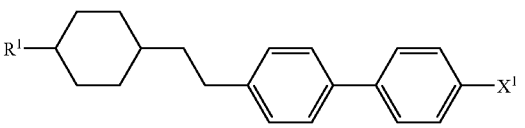
(3-26)
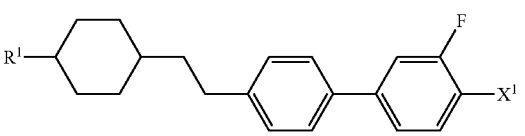
(3-27)
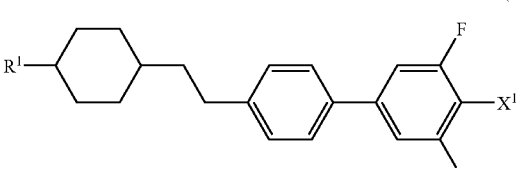
(3-28)
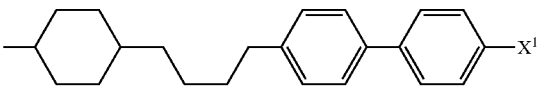
(3-29)
(3-30)
(3-31)
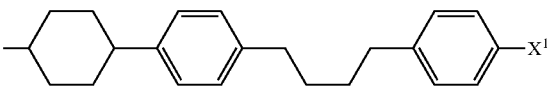
(3-32)
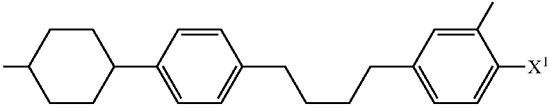

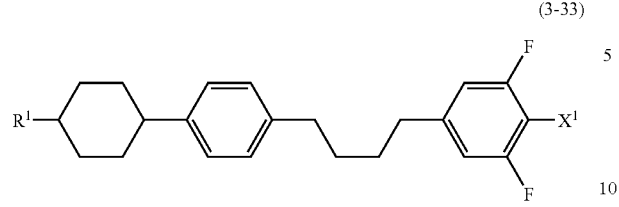 (3-33)
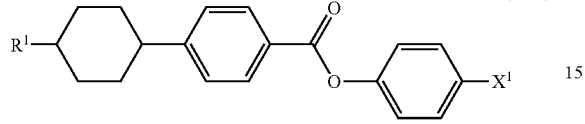 (3-34)
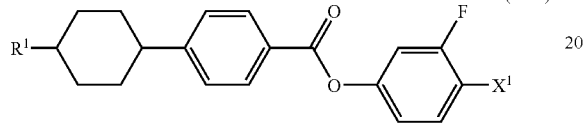 (3-35)
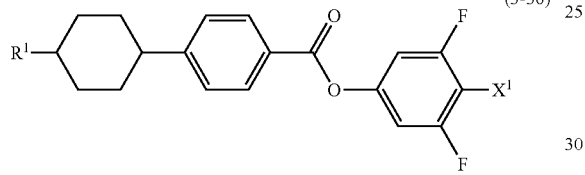 (3-36)
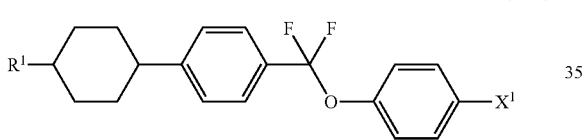 (3-37)
 (3-38)
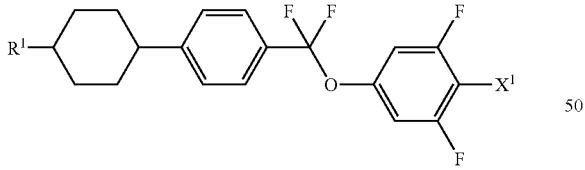 (3-39)
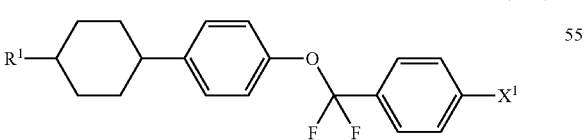 (3-40)
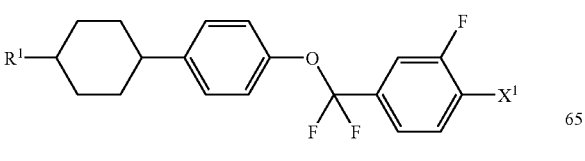 (3-41)
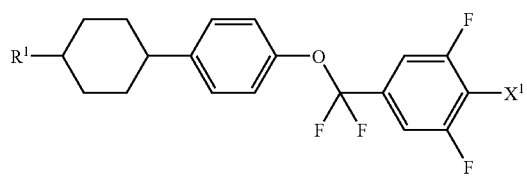 (3-42)
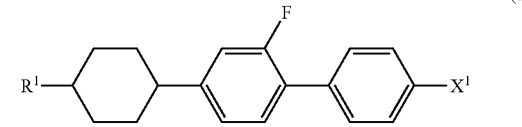 (3-43)
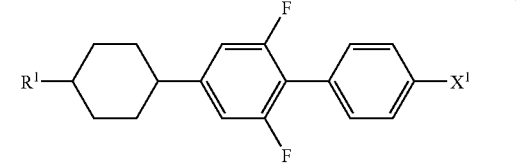 (3-44)
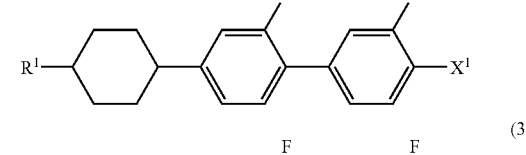 (3-45)
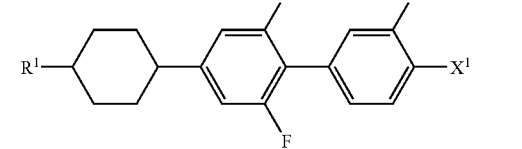 (3-46)
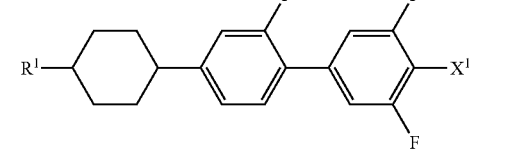 (3-47)
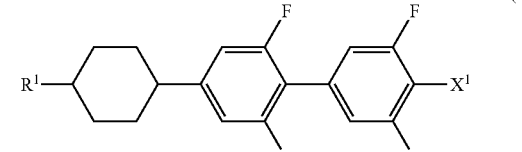 (3-48)
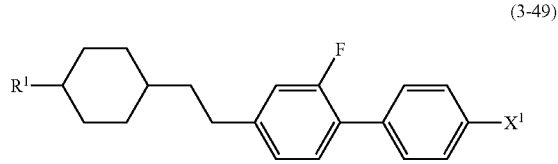 (3-49)
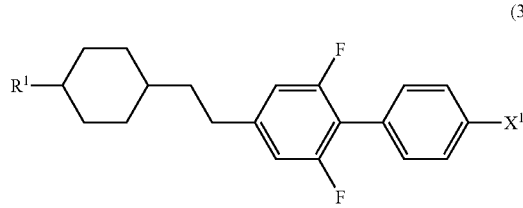 (3-50)

-continued
(3-51)
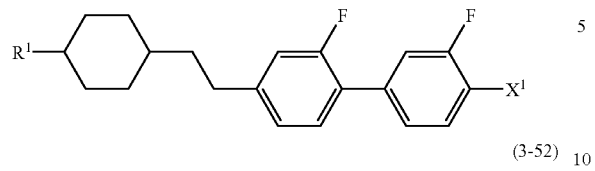
(3-52)
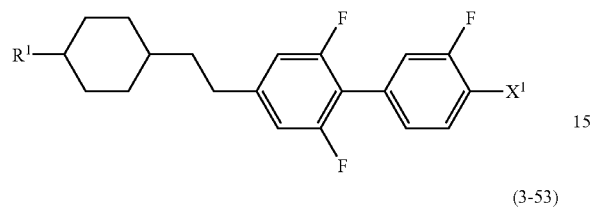
(3-53)
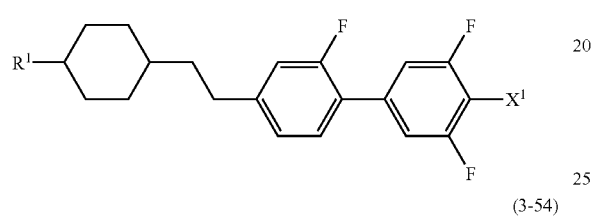
(3-54)
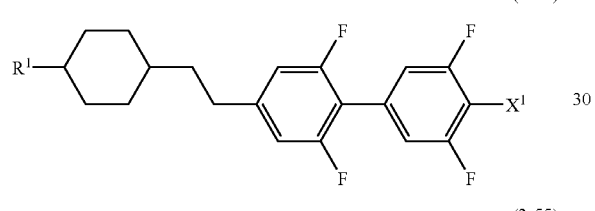
(3-55)
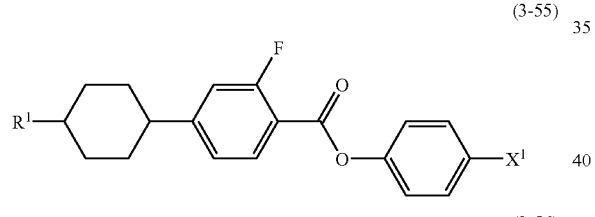
(3-56)
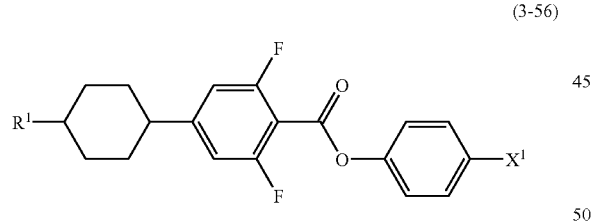
(3-57)
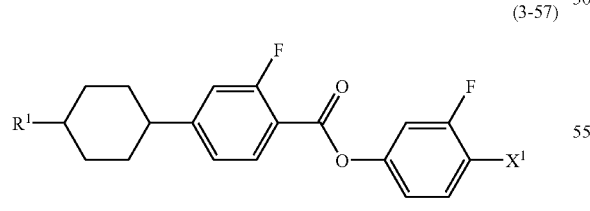
(3-58)
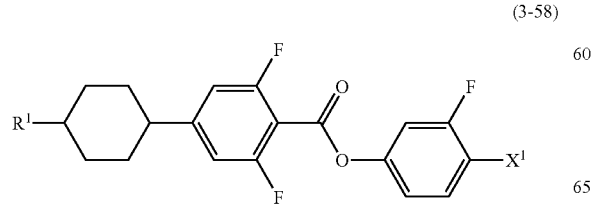
-continued
(3-59)
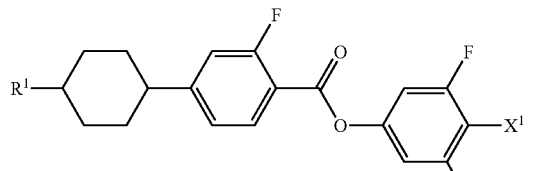
(3-60)
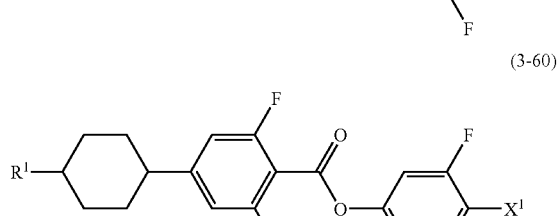
(3-61)
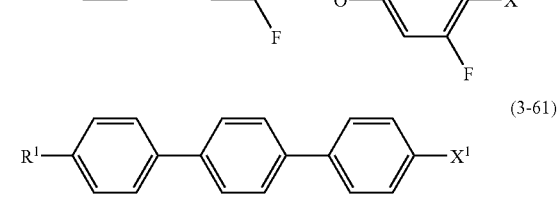
(3-62)
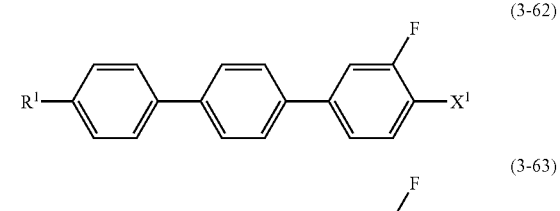
(3-63)
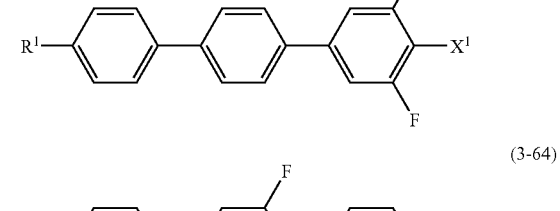
(3-64)
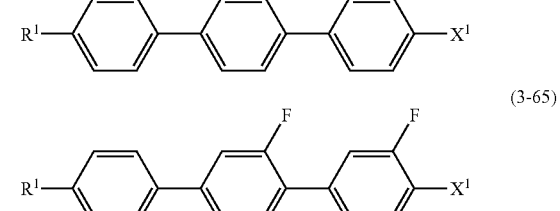
(3-65)
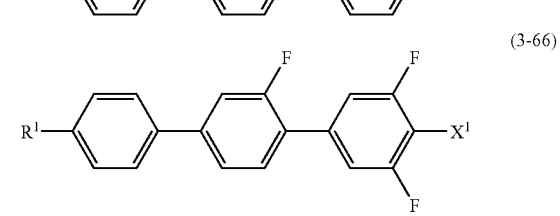
(3-66)
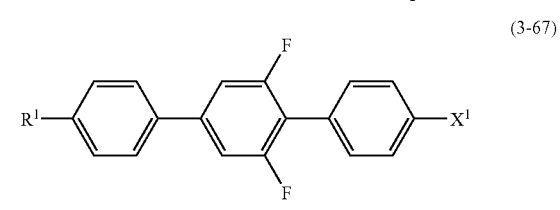
(3-67)

-continued
(3-68)
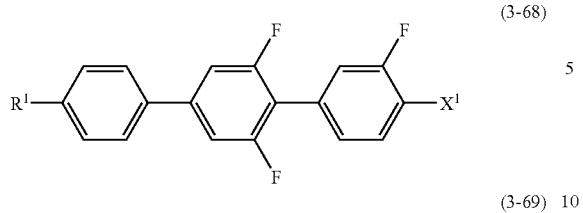
(3-69)
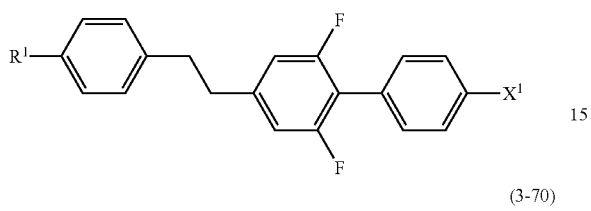
(3-70)
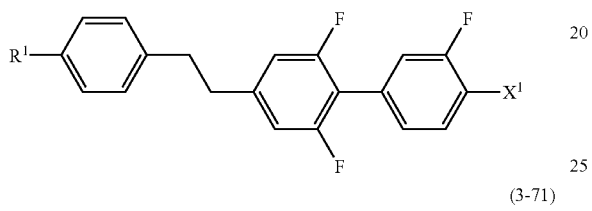
(3-71)
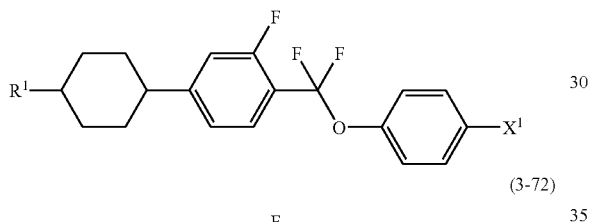
(3-72)
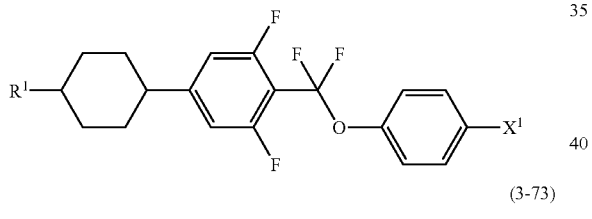
(3-73)
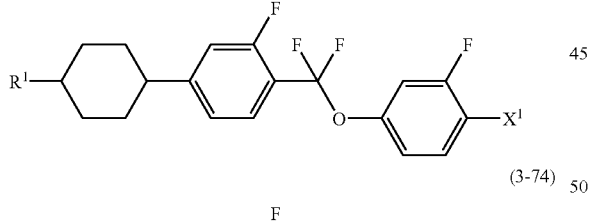
(3-74)
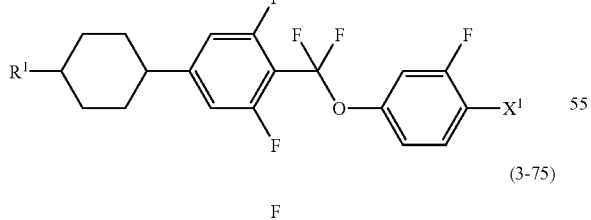
(3-75)
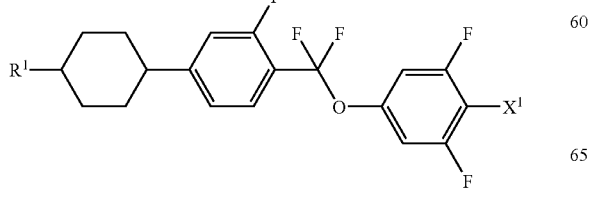
-continued
(3-76)
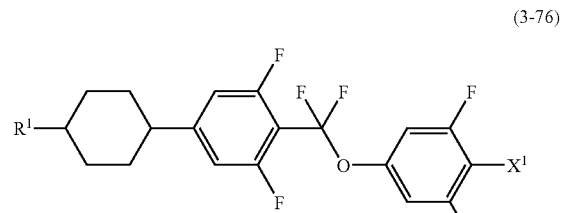
(3-77)
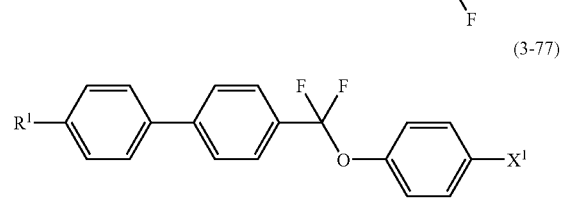
(3-78)
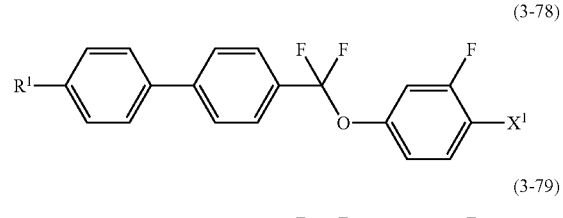
(3-79)
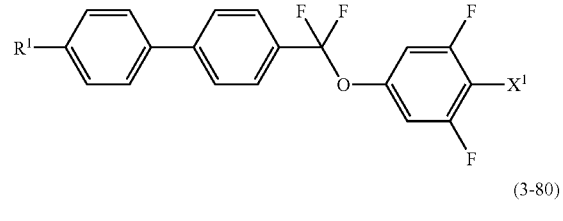
(3-80)
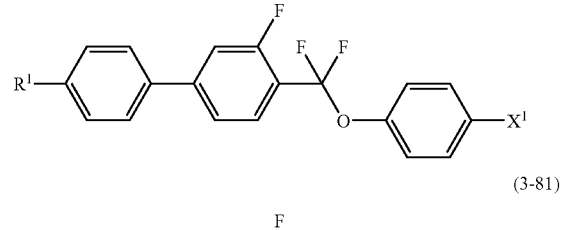
(3-81)
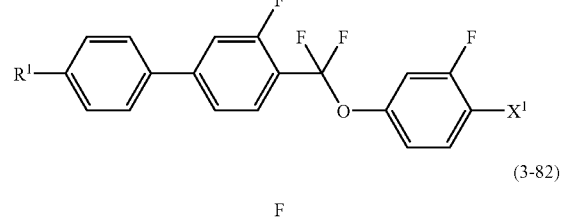
(3-82)
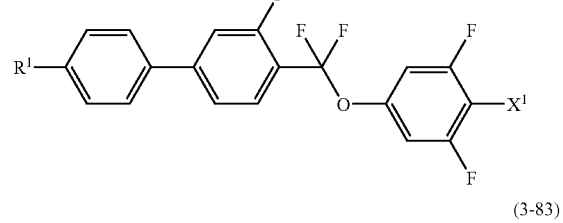
(3-83)
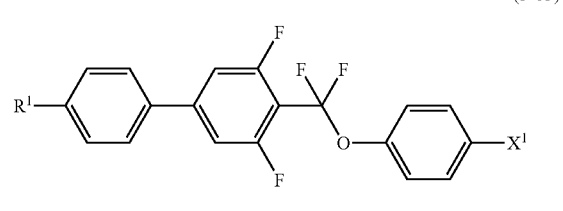

(3-84)
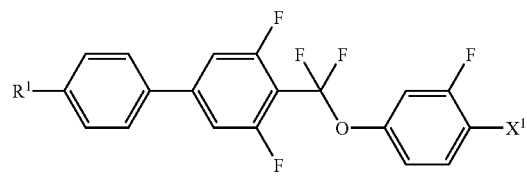
(3-85)
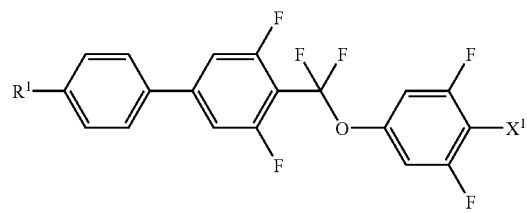
(3-86)
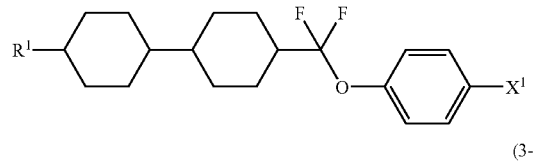
(3-87)
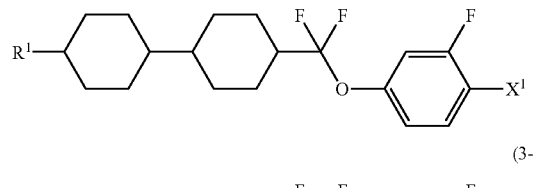
(3-88)
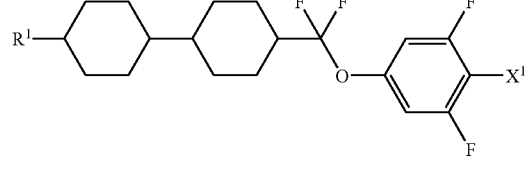
(3-89)
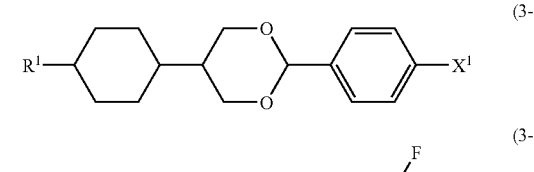
(3-90)
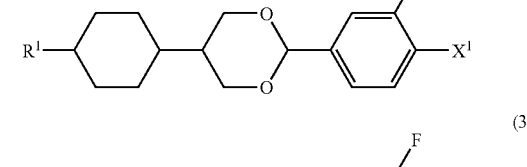
(3-91)
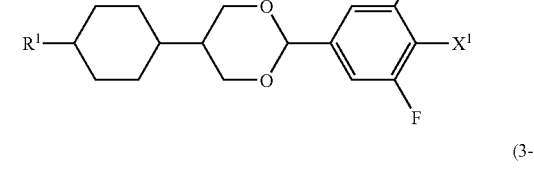
(3-92)
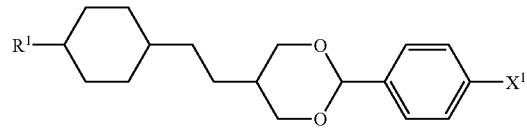
(3-93)
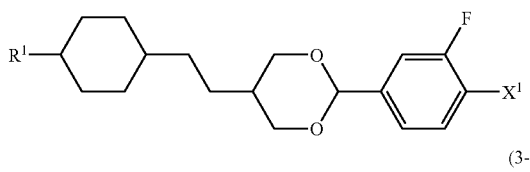
(3-94)
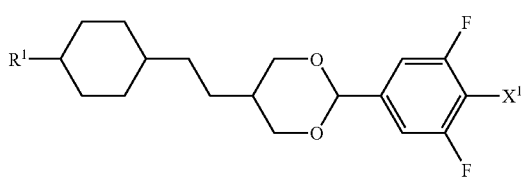
(3-95)
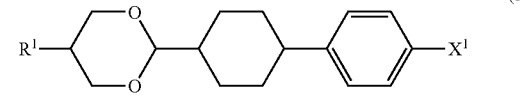
(3-96)
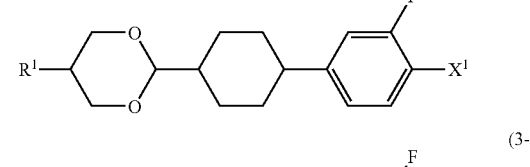
(3-97)
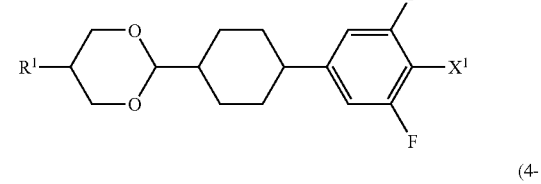
(4-1)
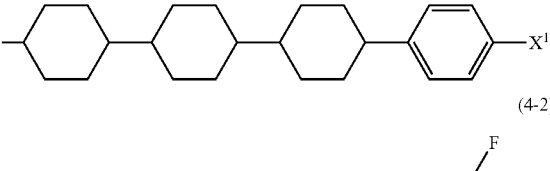
(4-2)
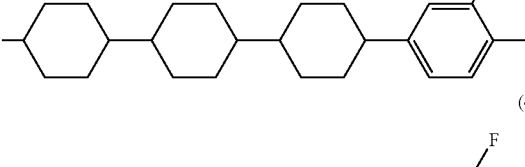
(4-3)
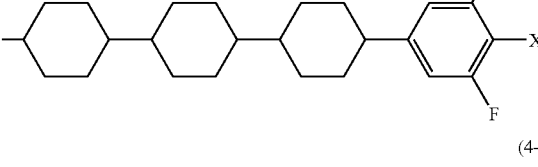
(4-4)
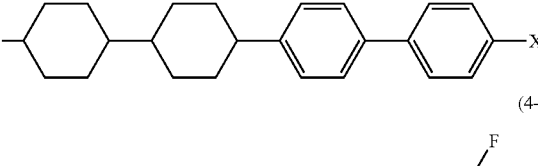
(4-5)
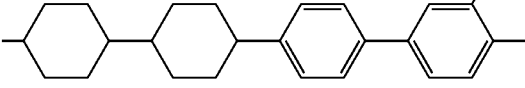

-continued
(4-6)
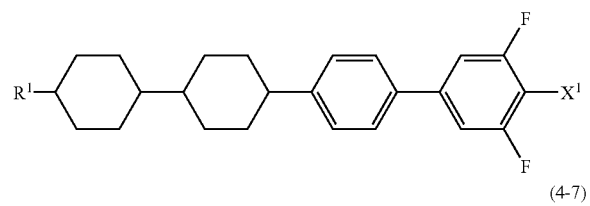
(4-7)
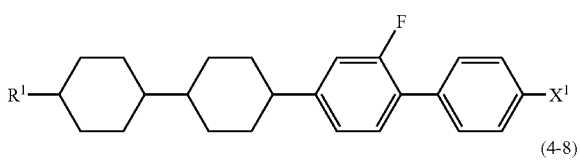
(4-8)
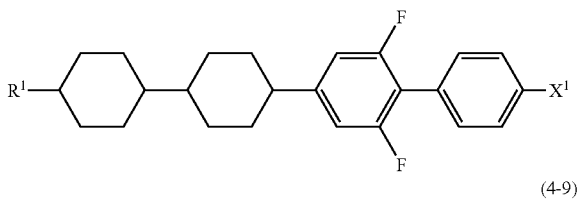
(4-9)
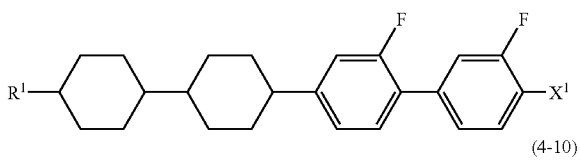
(4-10)
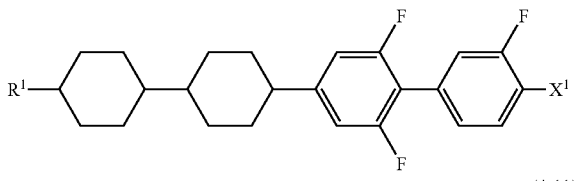
(4-11)
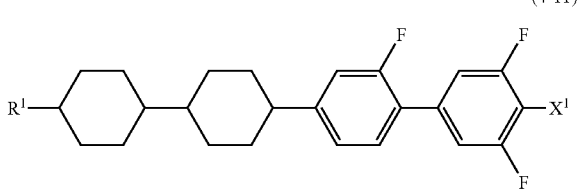
(4-12)
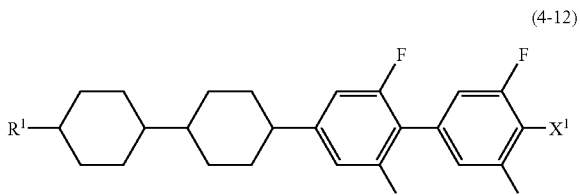
(4-13)
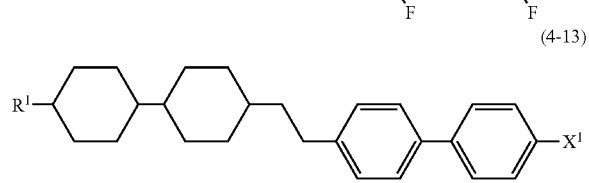
(4-14)
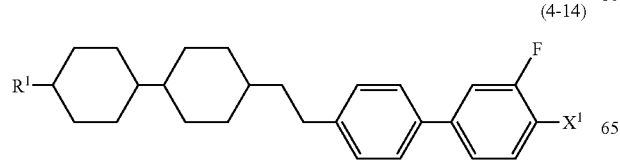
-continued
(4-15)
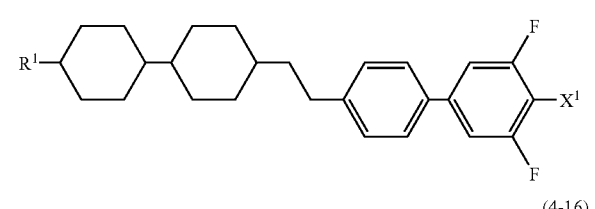
(4-16)
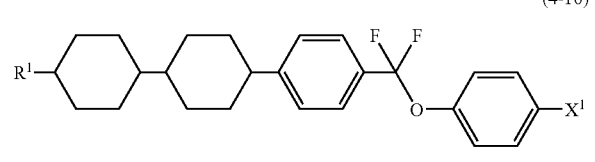
(4-17)
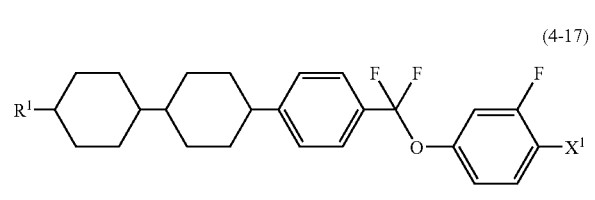
(4-18)
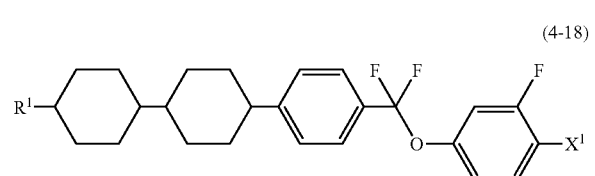
(4-19)
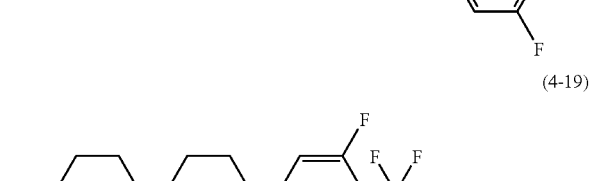
(4-20)
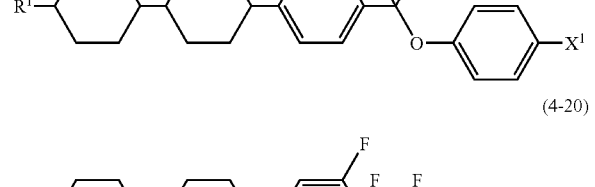
(4-21)
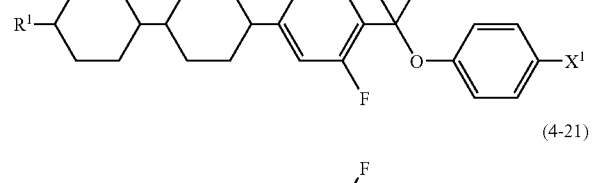
(4-22)
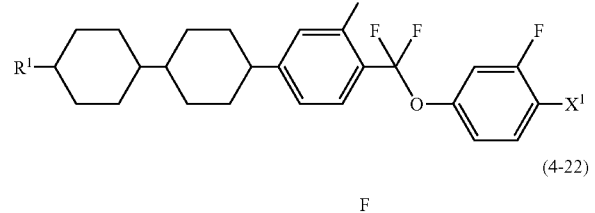

-continued
(4-23)
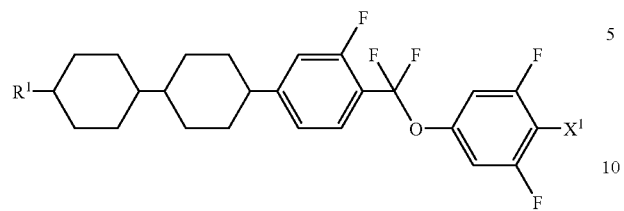
(4-24)
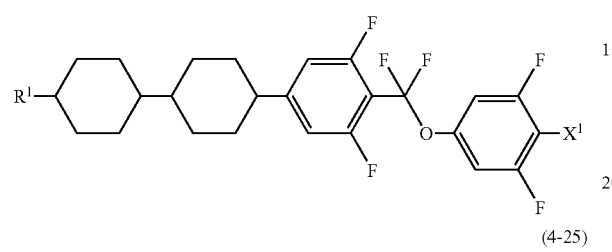
(4-25)
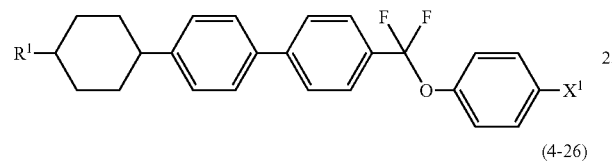
(4-26)
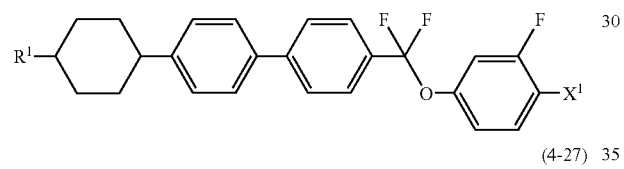
(4-27)
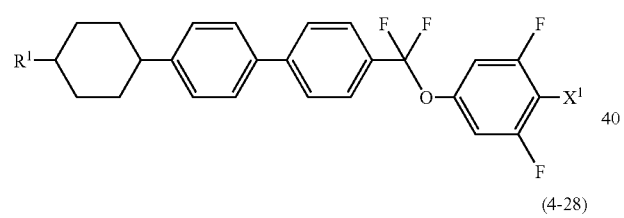
(4-28)
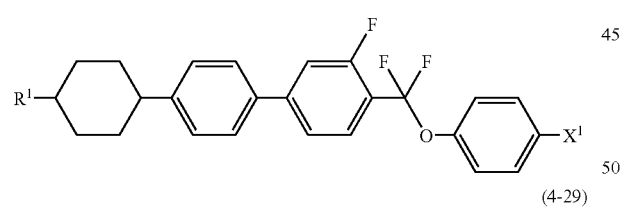
(4-29)
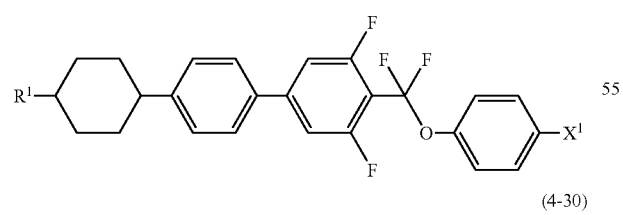
(4-30)
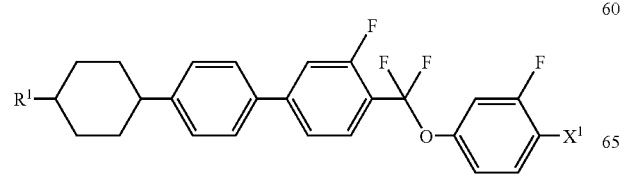
-continued
(4-31)
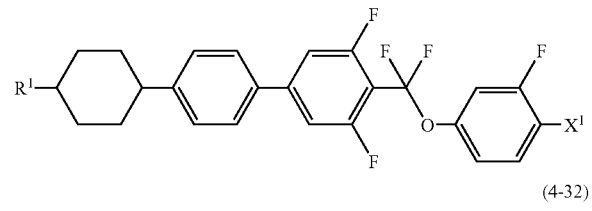
(4-32)
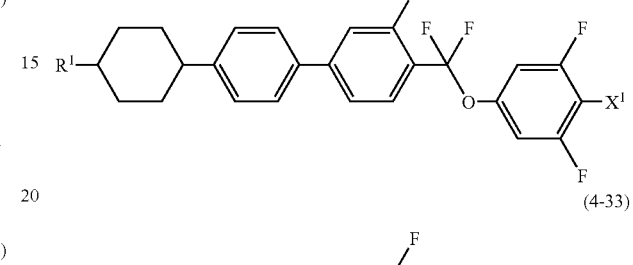
(4-33)
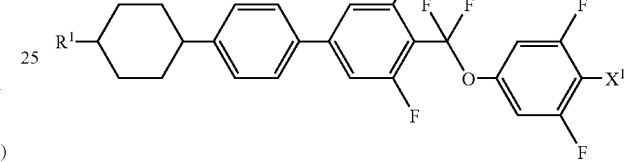
(5-1)
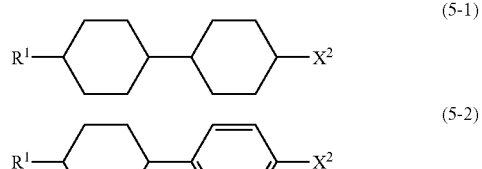
(5-2)
(5-3)
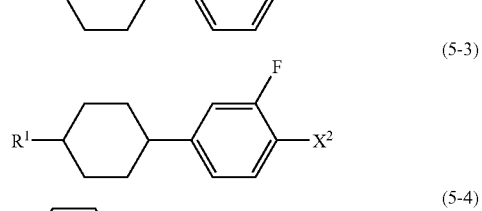
(5-4)
(5-5)
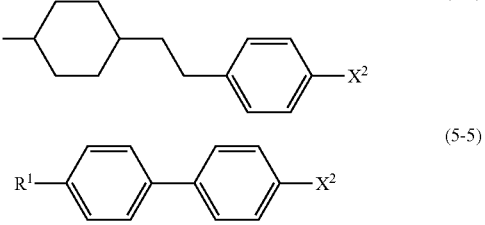
(5-6)
(5-7)
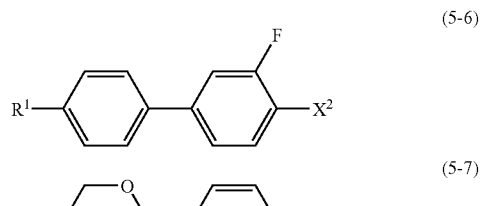
(5-8)
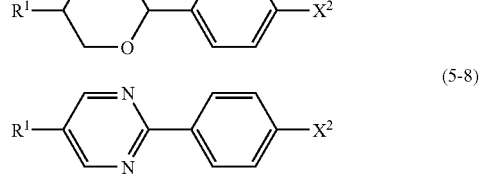

-continued
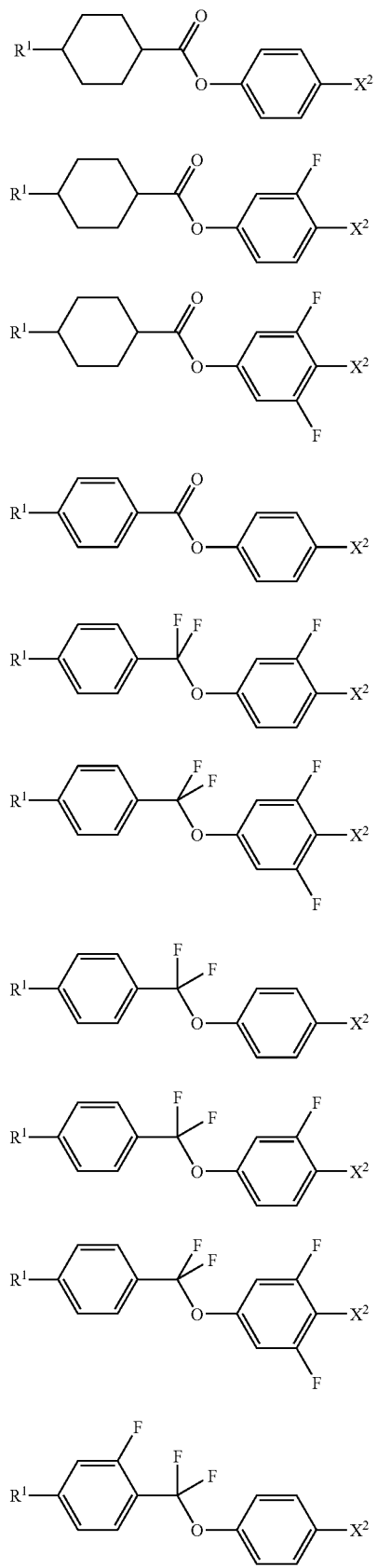
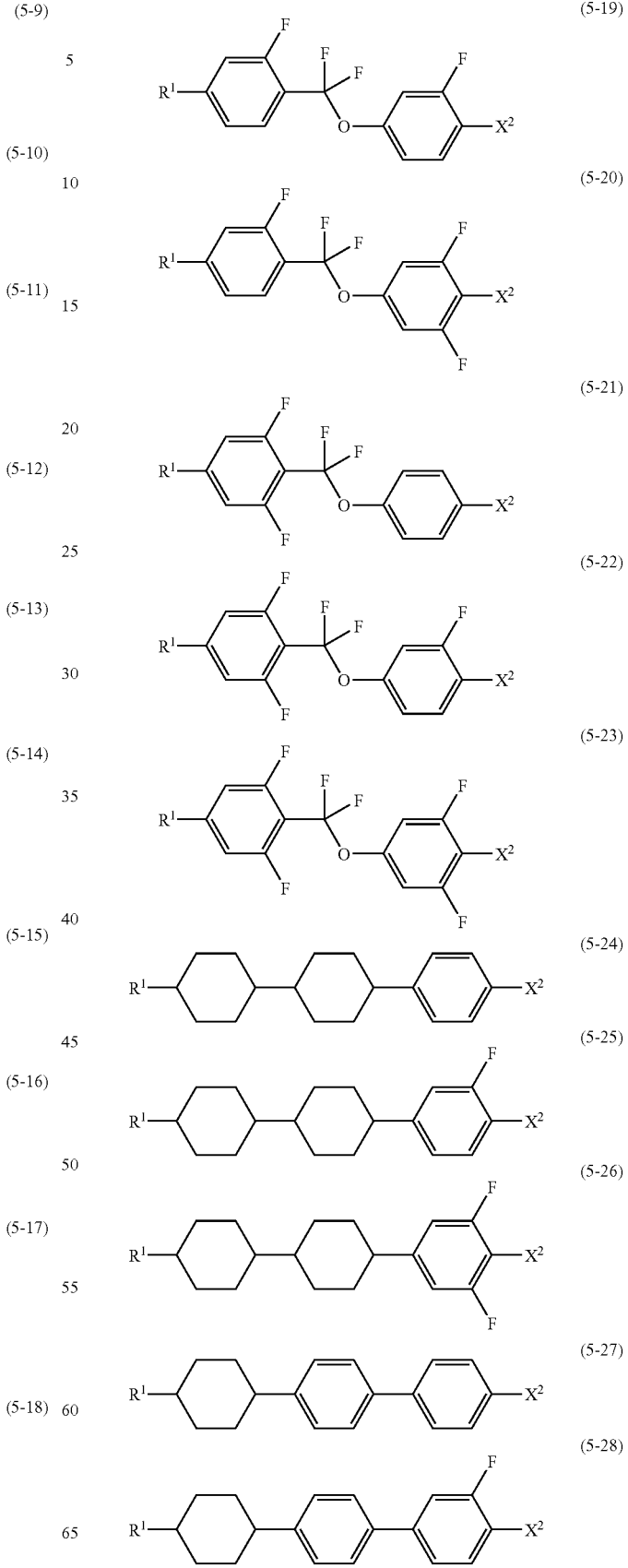

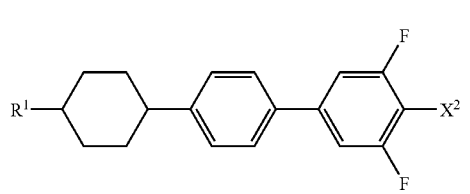 (5-29)
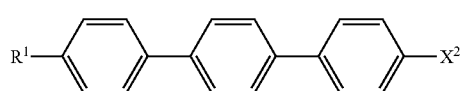 (5-30)
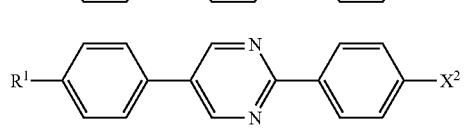 (5-31)
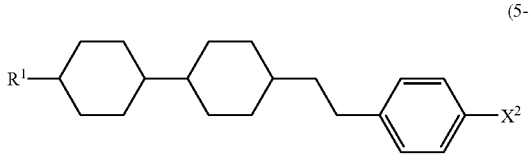 (5-32)
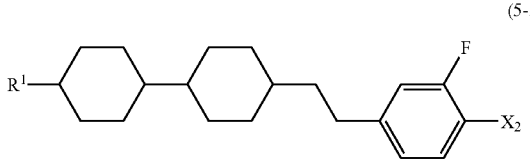 (5-33)
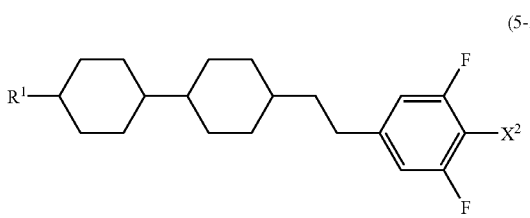 (5-34)
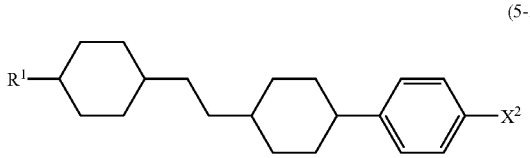 (5-35)
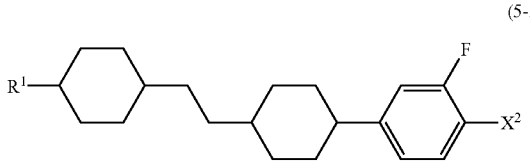 (5-36)
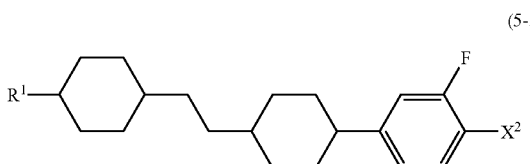 (5-37)
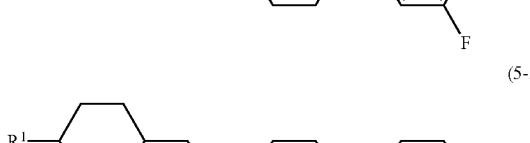 (5-38)
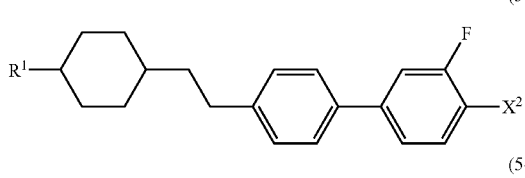 (5-39)
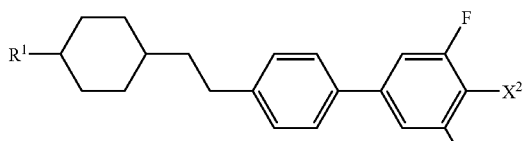 (5-40)
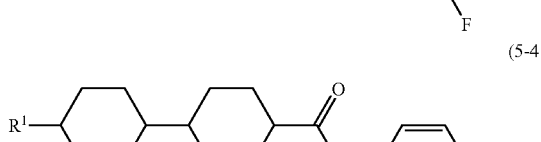 (5-41)
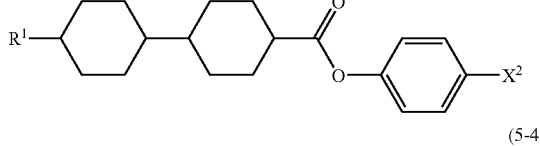 (5-42)
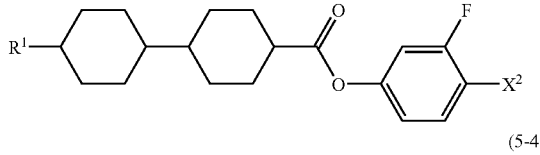 (5-43)
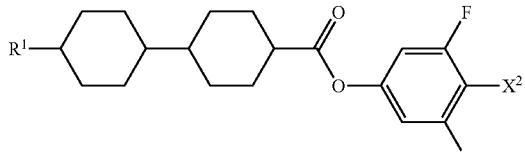 (5-44)
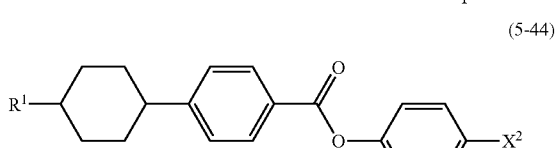 (5-45)
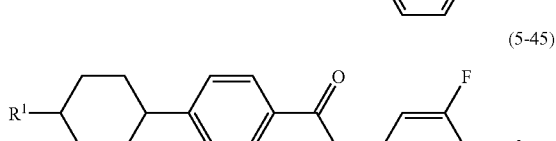 (5-46)
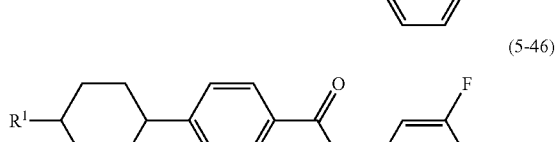 (5-47)
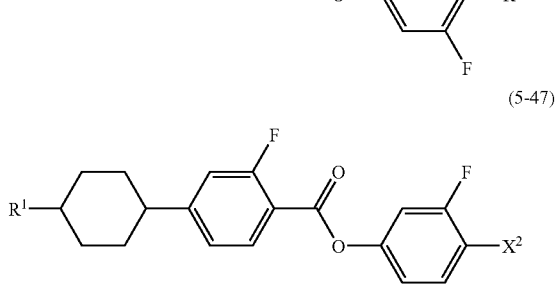

-continued
(5-48) 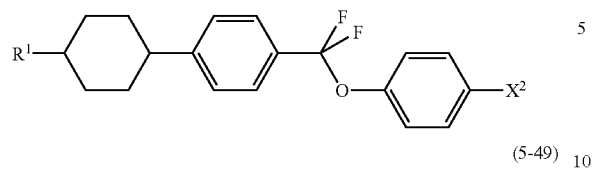
(5-49) 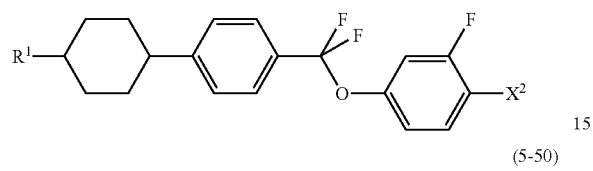
(5-50) 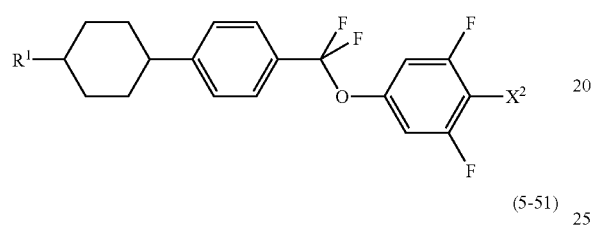
(5-51) 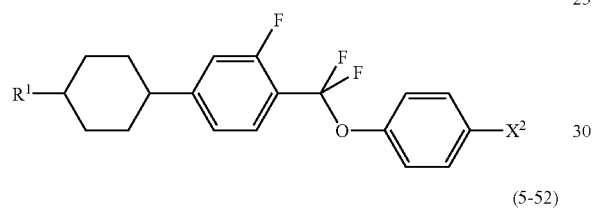
(5-52) 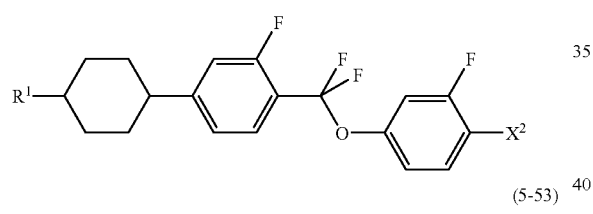
(5-53) 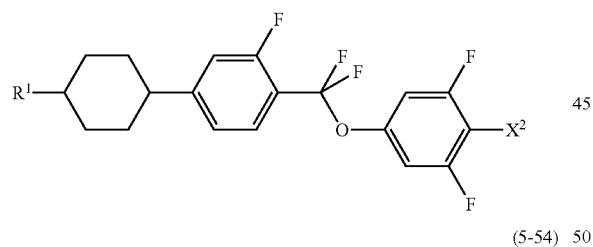
(5-54) 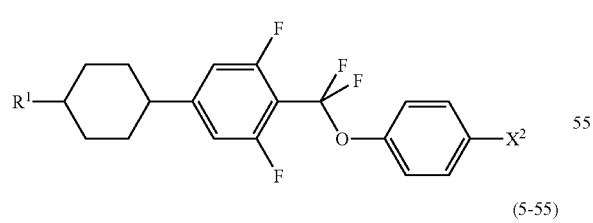
(5-55) 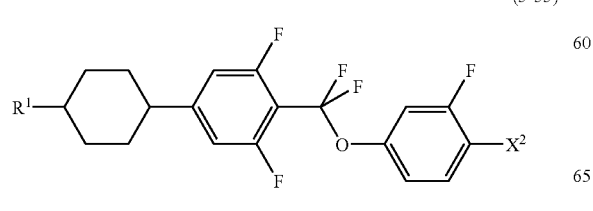
-continued
(5-56) 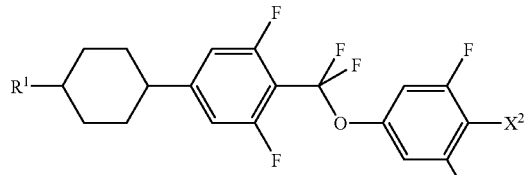
(6-1) 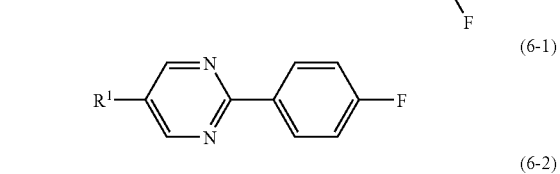
(6-2) 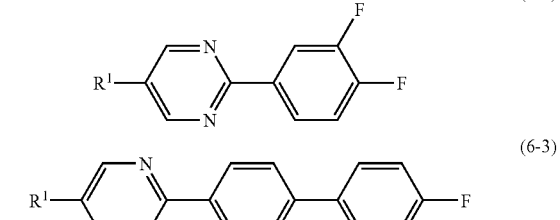
(6-3) 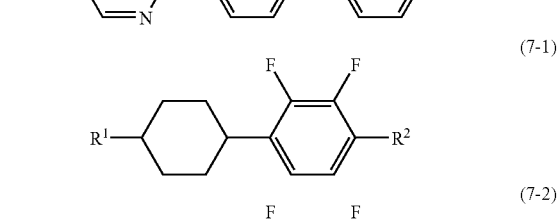
(7-1) 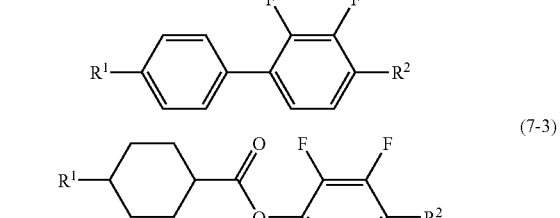
(7-2) 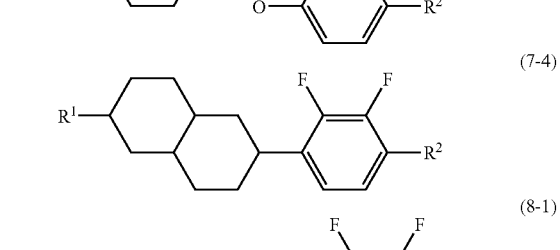
(7-3) 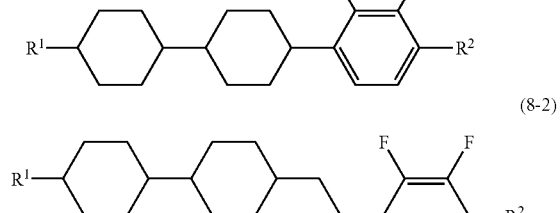
(7-4) 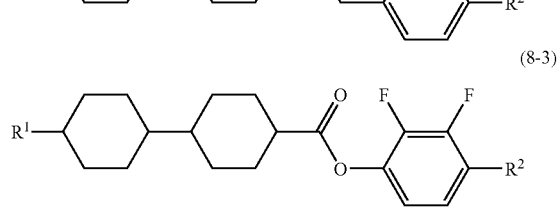
(8-1) 
(8-2) 
(8-3)

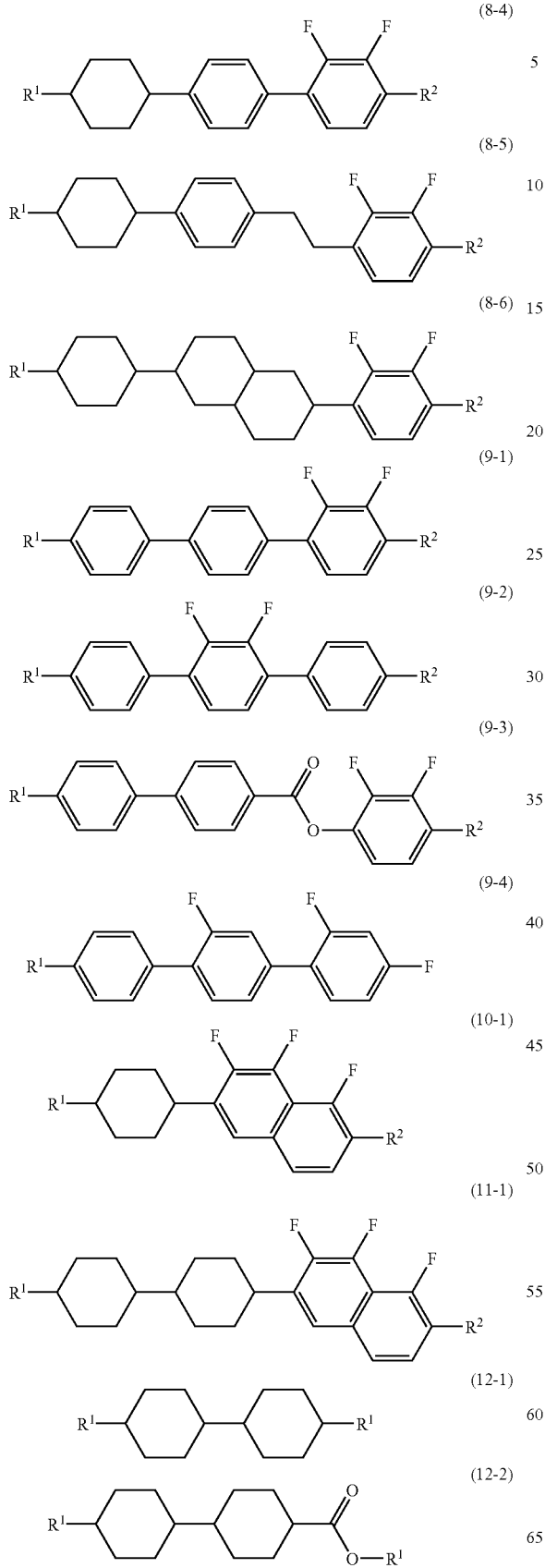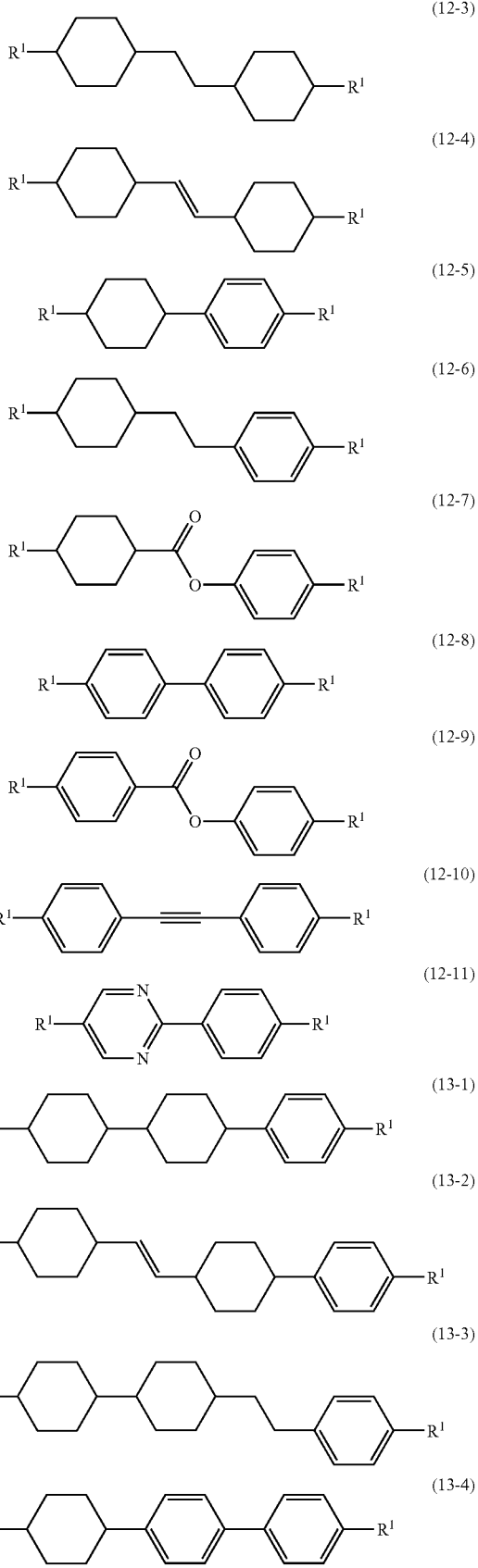

(13-5) 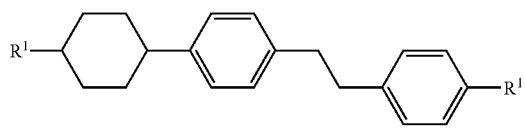
(13-6) 
(13-7) 
(13-8) 
(13-9) 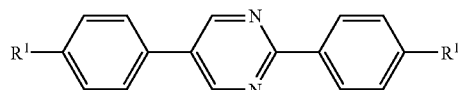
(13-10) 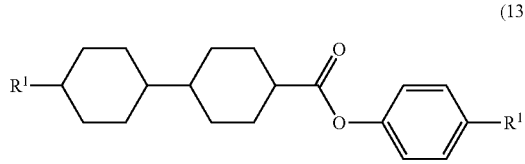
(13-11) 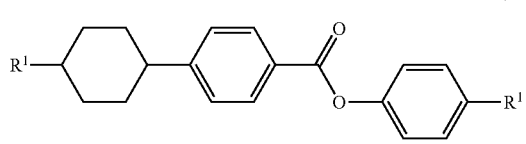
(13-12) 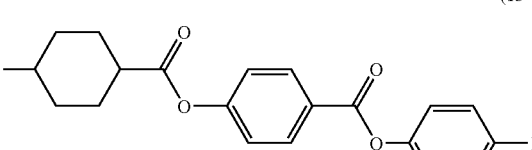
(13-13) 
(13-14) 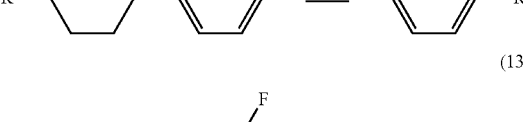
(13-15) 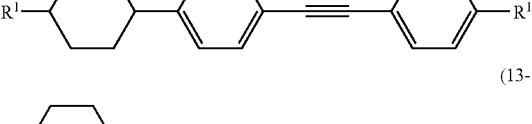
(13-16) 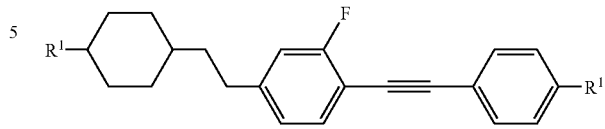
(13-17) 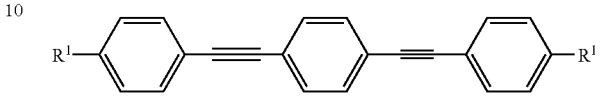
(13-18) 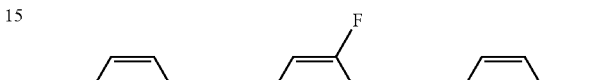
(13-19) 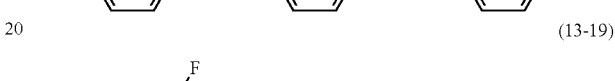
(13-20) 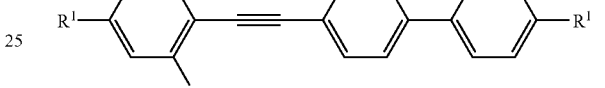
(13-21) 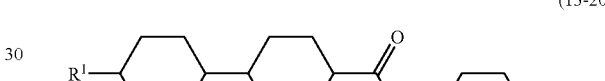
(14-1) 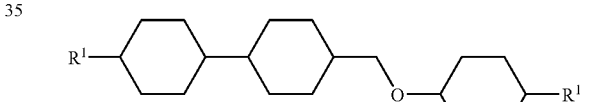
(14-2) 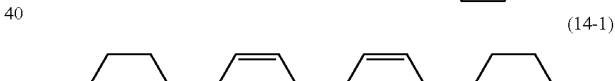
(14-3) 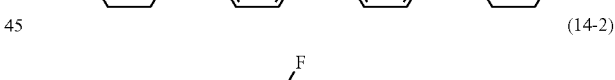
(14-4) 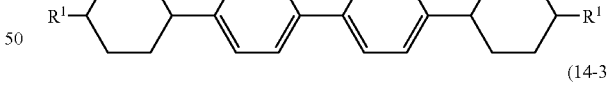
(14-5) 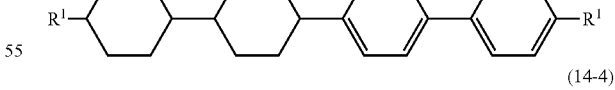

-continued

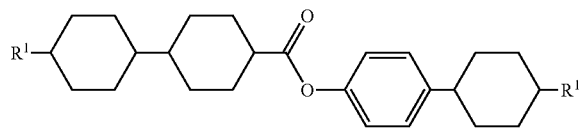
(14-6)

The composition of the invention can be prepared by known methods. For example, compounds as components are mixed and dissolved to each other by heating. An appropriate additive may be added to the composition to control the property of the composition. Such additives are well known to those skilled in the art. A composition for a GH device may be prepared by adding a dichroic dye, which is a compound, such as merocyanine, stylyl, azo, azomethine, azoxy, quinophthalone, anthraquinone, and tetrazine. A chiral dopant is added for the purpose of inducing a helical structure of the liquid crystal to provide a necessary twisting angle. Examples of the chiral dopant include optically active compounds (Op-1) to (Op-13) shown below.

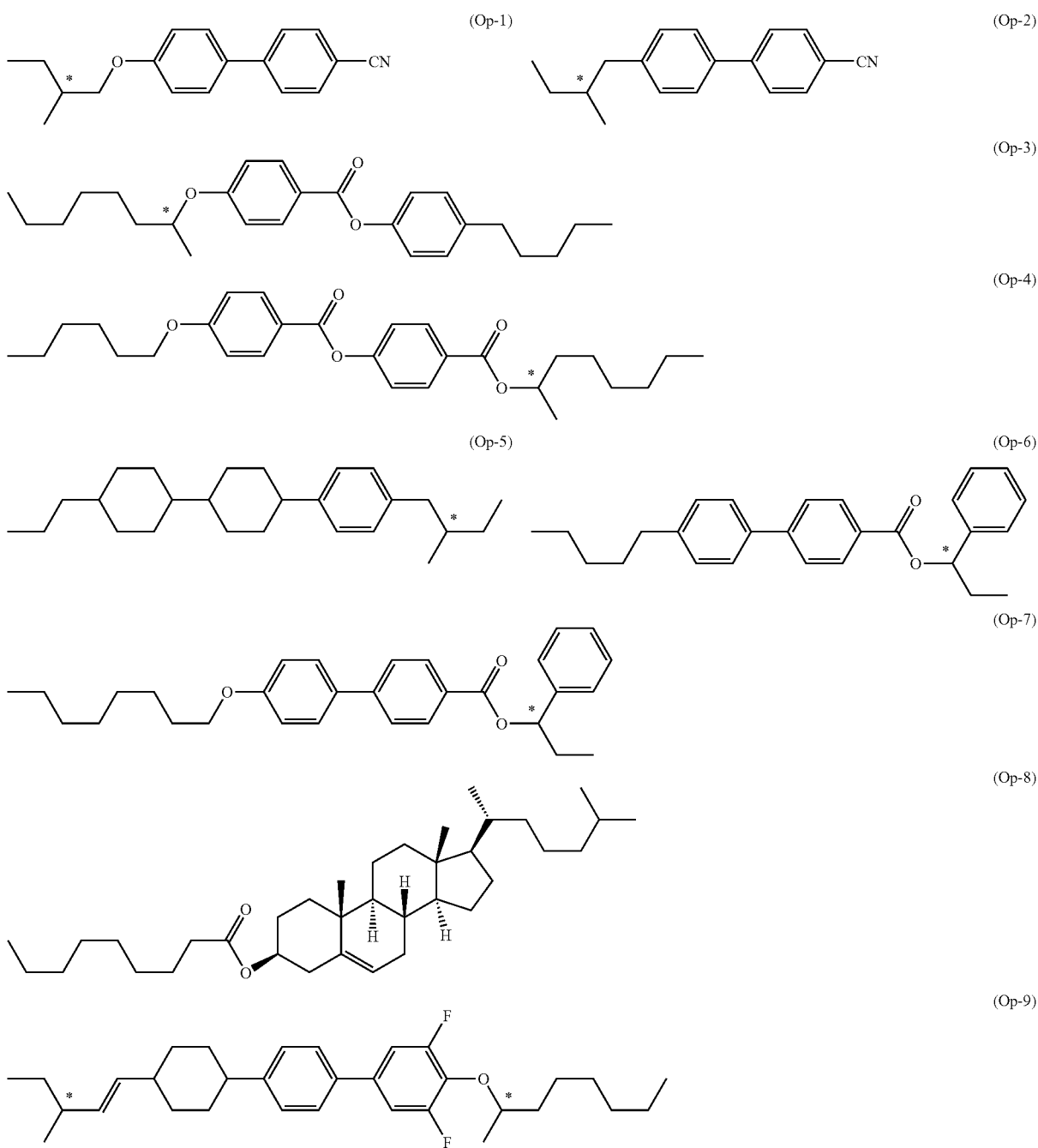

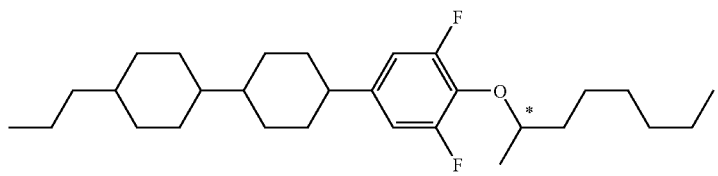
(Op-10)

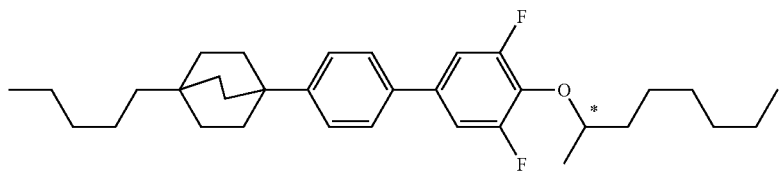
(Op-11)

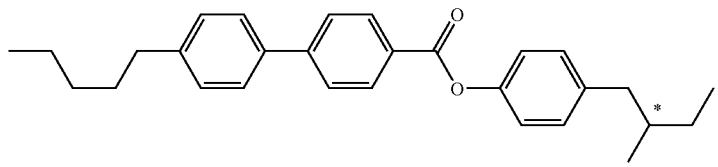
(Op-12)

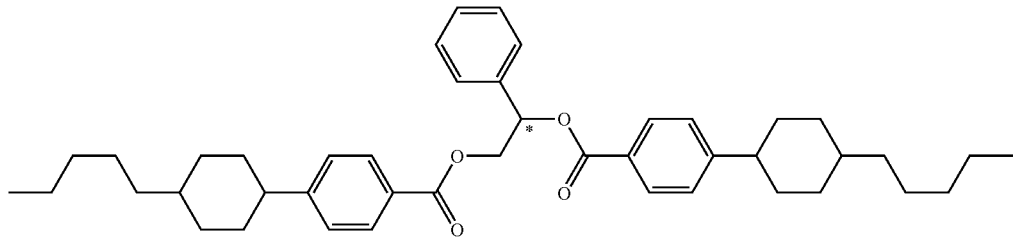
(Op-13)

The pitch of twist is controlled by adding a chiral dopant to the composition. A preferred pitch for use in a TN device and a TN-TFT device is within a range from 40 to 200 μm, a preferred pitch for use in an STN device is within a range from 6 to 20 μm, and a preferred pitch for use in a BTN device is within a range from 1.5 to 4 μm. A chiral dopant is added in a relatively large amount to a composition for use in a PC device. At least two chiral dopants may be added for the purpose of controlling the temperature dependency of the pitch.

A stabilizer may be added for the purpose of preventing the composition from being deteriorated due to an ultraviolet ray and oxidation. Examples of the stabilizer include stabilizers (Sb-1) to (Sb-32) shown below.

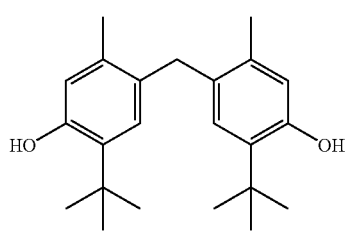
(Sb-1)

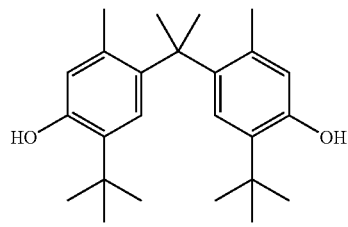
(Sb-2)

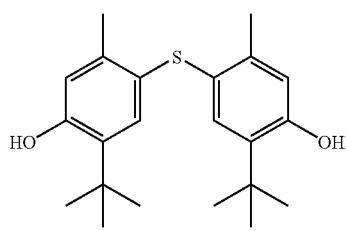
(Sb-3)

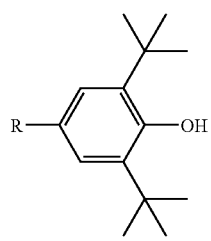
(Sb-4)

-continued
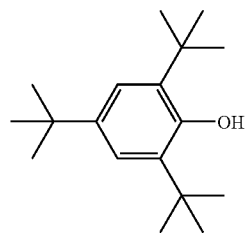
(Sb-5)
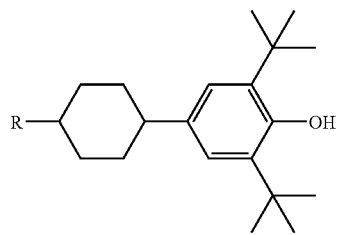
(Sb-6)
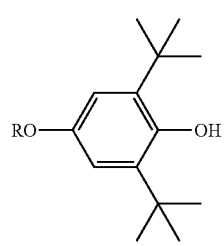
(Sb-7)
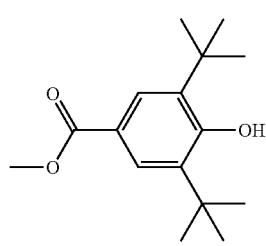
(Sb-8)
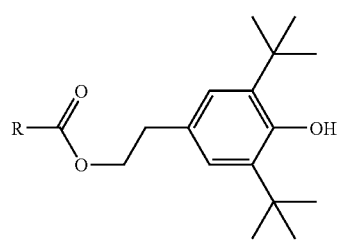
(Sb-9)
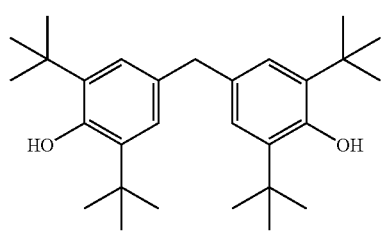
(Sb-10)
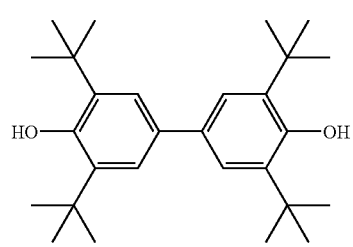
(Sb-11)
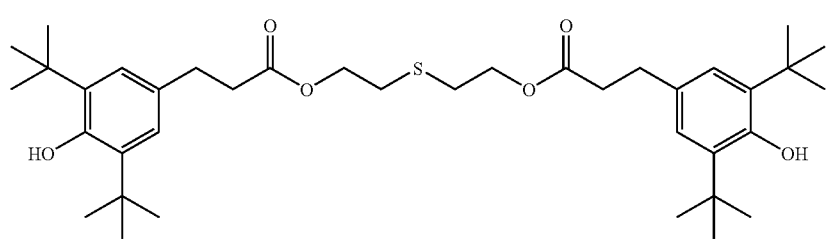
(Sb-12)

(Sb-13)
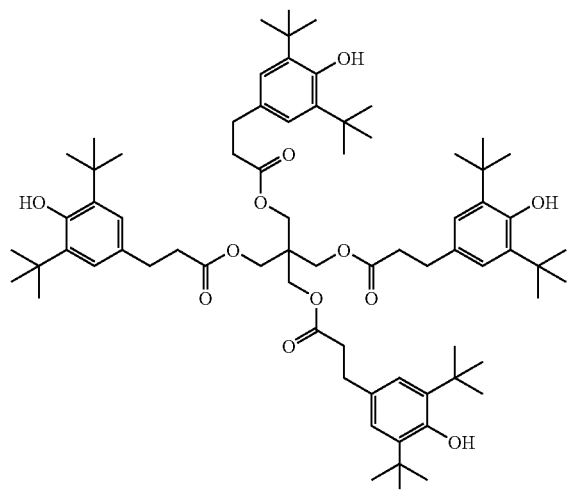
(Sb-14)
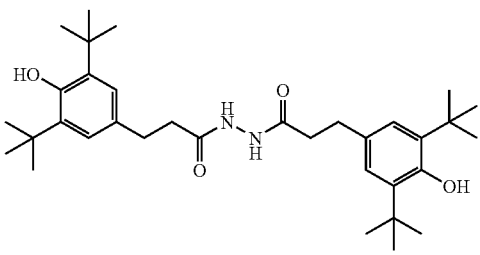
(Sb-15)
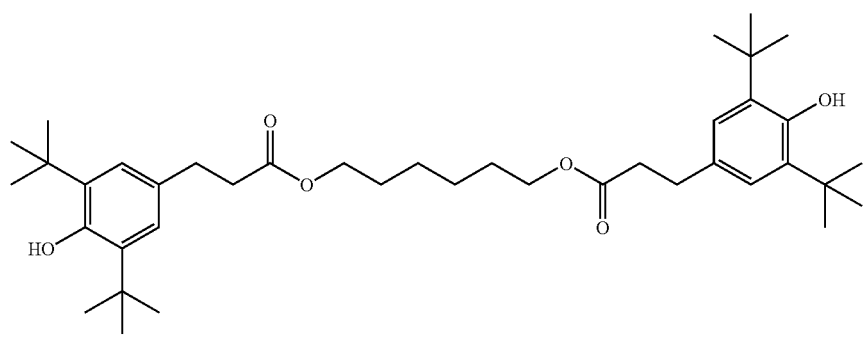
(Sb-16)
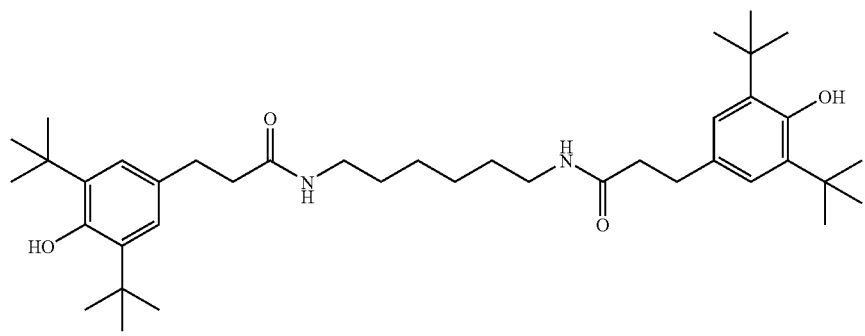

-continued
(Sb-17)
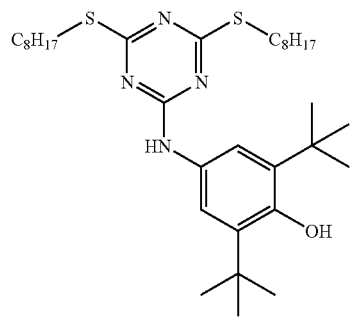
(Sb-18)
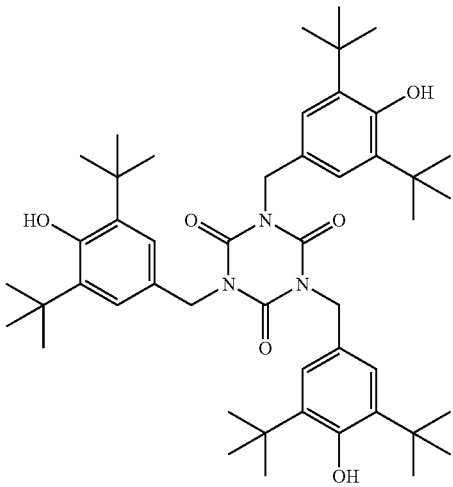
(Sb-19)
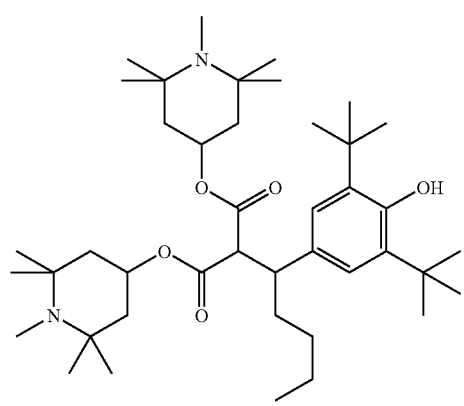
(Sb-20)
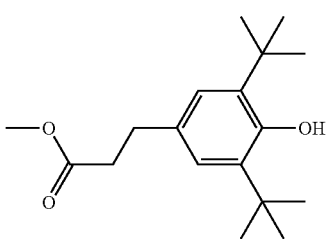
(Sb-21)
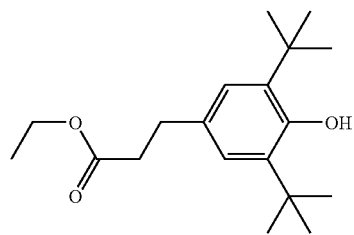
(Sb-22)
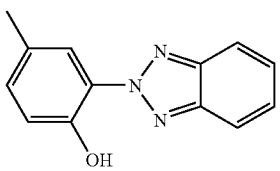
(Sb-23)
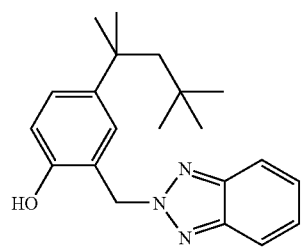
(Sb-24)
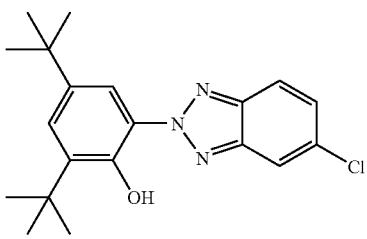

-continued
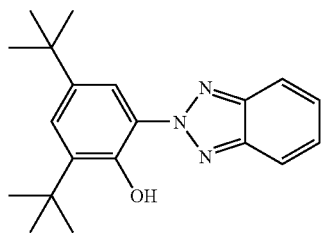
(Sb-25)
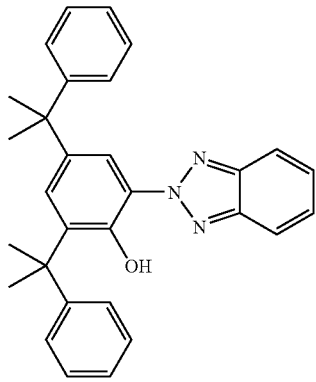
(Sb-26)
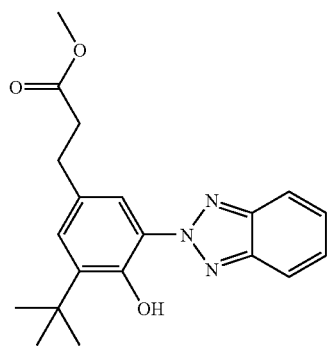
(Sb-27)
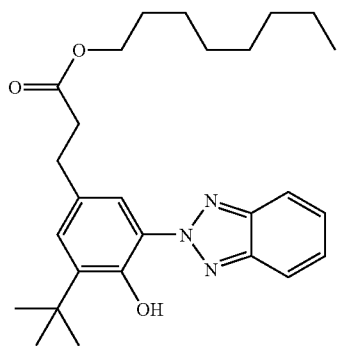
(Sb-28)
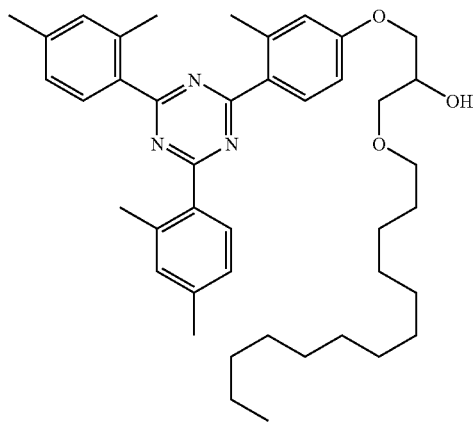
(Sb-29)
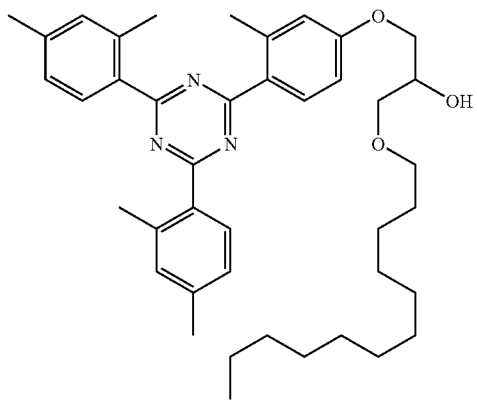
(Sb-30)
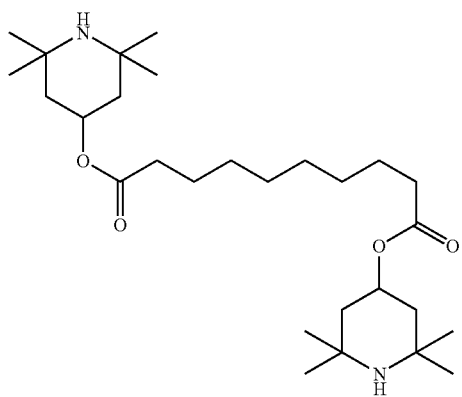
(Sb-31)
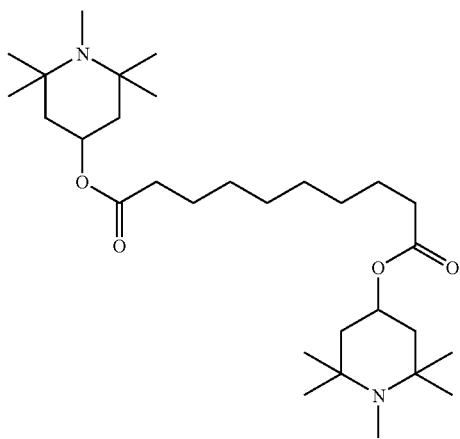
(Sb-32)

The composition of the invention can be used for devices, such as PC, TN, STN, BTN, ECB, OCB, IPS and VA. The driving system for the devices may be PM or AM. The composition can be used also for an NCAP (nematic curvilinear aligned phase) device prepared by microcapsulating the composition, or a PD (polymer dispersed) device, in which a three-dimensional network polymer is formed in the composition, for example, a PN (polymer network) device.

EXAMPLES

The invention will be described more specifically with reference to examples. The invention is not restricted to the examples. The number of the compound corresponds to that of the compound indicated in Example 4. The resulting compounds are identified by nuclear magnetic resonance spectroscopy, mass spectroscopy and the like. In the nuclear magnetic resonance spectroscopy, s denotes a singlet, d denotes a doublet, t denotes a triplet, q denotes a quartet, and m denotes a multiplet.

The ratio (percentage) of the component or the liquid crystal compound is a weight percent (% by weight) based on the total weight of the liquid crystal compound. The composition is prepared by mixing after measuring weight of the component, such as the liquid crystal compound. Accordingly, it is easy to calculate the weight percentages the components. However, it is not easy to calculate accurately the ratio of the components by gas chromatographic analysis of the composition. This is because the correction coefficient depends on the kind of the liquid crystal compounds. Fortunately, the correction coefficient is approximately 1. Further, difference by 1% by weight in the component compound gives less effect on the characteristics of the composition. Accordingly, in the invention, the area ratio of component peak in the gas chromatograph can be regarded as the weight percentage of the component compound. In other words, the result of the gas chromatographic analysis (peak area ratio) can be considered to be equivalent with the weight percentage of the liquid crystal compound without correction.

Measurement of the characteristic values include three methods, that is, a case of using the compound alone as it is for the specimen, a case of mixing the compound with a mother liquid crystal and using the mixture for the specimen, and a case of using a composition alone as it is for the specimen. In the case of mixing the compound with a mother liquid crystal, the following method is adopted. A specimen was prepared by mixing 15% by weight of a compound and 85% by weight of a mother liquid crystal. A characteristic value of the compound was calculated based a value obtained by measurement with an extrapolation method. Extrapolation value=(measured value for specimen−0.85×measured value for mother liquid crystal)/0.15. In a case where the smectic phase (or crystal) was precipitated by the ratio at 25° C., the ratio of the compound and the mother liquid crystal was changed in the order of 10 wt %/90 wt %, 5 wt %/95 wt %, and 1 wt %/99 wt %.

Among the values obtained by the measurement, the values obtained by using the compound alone as it is for the specimen and the values obtained by using the composition alone as it is for the specimen are described as experimental data with the values as they are. For the values obtained by mixing the compound with the mother liquid crystal and using the mixture as the specimen, the obtained values are sometimes described as they are as the experimental data, or the values obtained by the extrapolation method are sometimes described.

In the case of mixing the compound with the mother liquid crystal and using the mixture as the specimen, plural mother liquid crystals are used. In the case where the compound has a positive dielectric anisotropy, an example of the mother liquid crystal is mother liquid crystal A. In the case where the compound has a negative dielectric anisotropy, an example of the mother liquid crystal is mother liquid crystal B. The composition of mother liquid crystals A and B are shown below.

Mother Liquid Crystal A:

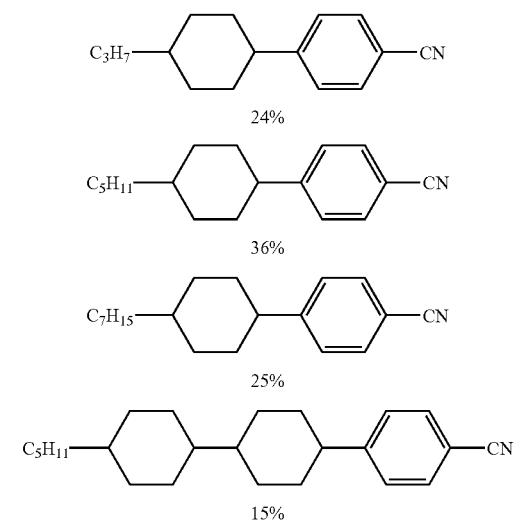

Mother Liquid Crystal B:

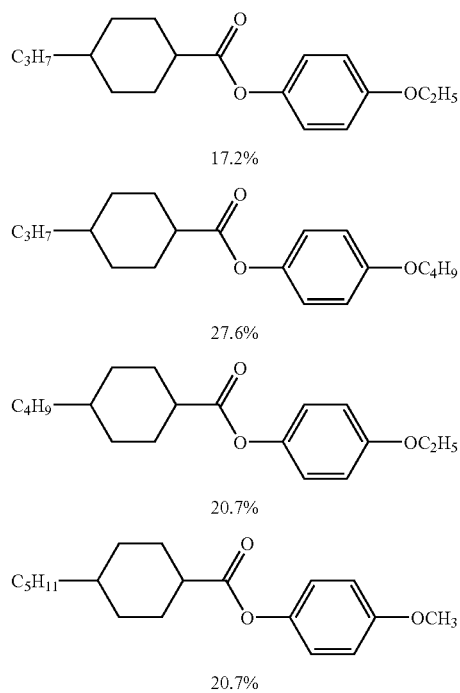

-continued

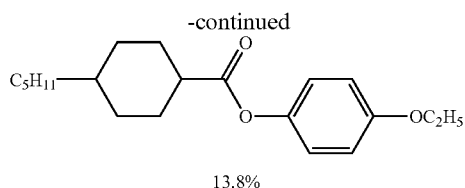

13.8%

Measurements for the characteristic values are in accordance with the following methods. Most of the methods are those described in EIAJ ED-2521A, Standard of Electronic Industries Association of Japan, or modified methods thereof. A TN device or a VA device used for the measurements was not attached with TFT.

<Transition Temperature (° C.)>

The transition temperature measured by any one of the following methods.

(1) A specimen was placed on a hot plate (FP-52 model Hot Stage manufactured by Mettler Co.) of a melting point measuring apparatus equipped with a polarization microscope and heated at a rate of 1° C. per minute. The temperature when the specimen showed phase change was measured.

(2) A specimen was measured by using a differential scanning calorimeter DSC-7 system manufactured by Perkin Elmer Co. at a rate of 3° C. per minute.

A crystal was indicated as C. When the crystals could be distinguished, they were indicated as $C_1$ or $C_2$ respectively. A smectic phase was indicated as S. A liquid (isotropic) was indicated as Iso. A nematic phase was indicated as N. In the case where a smectic B phase, a smectic C phase, and a smectic A phase could be distinguished in the smectic phase, they were indicated as $Sm_B$, $Sm_C$ and $Sm_A$ respectively. "C 92.9 N 196.9 Iso" as the indication of the transfer temperature shows that the transition temperature from crystal to nematic phase (CN) is 92.9° C. and the transition temperature from nematic phase to liquid (NI) is 196.9° C. The rule is applied to the other indications.

<Upper Limit Temperature of Nematic Phase ($T_{NI}$; ° C.)>

A specimen was placed on a hot plate of a melting point measuring apparatus equipped with a polarization microscope and heated at a rate of 1° C. per minute. The temperature when a portion of the specimen changed from a nematic phase to an isotropic liquid was measured. The upper limit temperature of a nematic phase is sometimes referred to simply as "upper limit temperature".

<Compatibility at Low Temperature (TC; % by Weight)>

Specimens obtained by mixing the mother liquid crystal with the compound in amounts of 20% by weight, 15% by weight, 10% by weight, 5% by weight, 3% by weight and 1% by weight were placed in glass bottles and stored in a freezer at −20° C. for 30 days, and then the liquid crystal phases were observed. In the case, for example, where the specimen obtained by mixing 20% by weight of the compound exhibited a crystal or a smectic phase, and the specimen obtained by mixing 15% by weight of the compound exhibited a nematic phase, the compatibility was expressed as TC=15% by weight.

<Viscosity (η: Measured at 20° C.: mPa·s)>

E-viscometer was used for the measurement of viscosity.

<Rotation Viscosity (γ1; Measured at 25° C., mPa·s)>

(1) Specimen Having Positive Dielectric Anisotropy:

The rotation viscosity was measured according to the method disclosed in M. Imai, et al., Molecular Crystals and Liquid Crystals, vol. 259, p. 37 (1995). A specimen was placed in a TN device having a twist angle of 0° and a distance between two glass substrates (cell gap) of 5 μm. The TN device was applied with a voltage in a range of from 16 to 19.5 V stepwise by 0.5 V. After a period of 0.2 second with no application of voltage, voltage application was repeated with only one rectangular wave (rectangular pulse of 0.2 second) and application of no voltage (2 seconds). A peak current and a peak time of a transient current that was generated by the application of voltage were measured. A value of rotation viscosity was obtained from the measured values and the calculating formula (8) on page 40 of the literature by M. Imai, et al. The value of dielectric anisotropy, which was necessary for the calculation, was obtained according to the following measuring method of dielectric anisotropy with the element used for measuring the rotation viscosity.

(2) Specimen Having Negative Dielectric Anisotropy:

The rotation viscosity was measured according to the method disclosed in M. Imai, et al., Molecular Crystals and Liquid Crystals, vol. 259, p. 37 (1995). The specimen was placed in a VA device having a distance between two glass substrates (cell gap) of 20 μm. The VA device was applied with a voltage in a range of from 30 to 50 V stepwise by 1 V. After a period of 0.2 second with no application of voltage, voltage application was repeated with only one rectangular wave (rectangular pulse of 0.2 second) and application of no voltage (2 seconds). A peak current and a peak time of a transient current that was generated by the application of voltage were measured. A value of rotation viscosity was obtained from the measured values and the calculating formula (8) on page 40 of the literature by M. Imai, et al. The value of dielectric anisotropy, which was necessary for the calculation, was obtained according to the following measuring method of dielectric anisotropy with the element used for measuring the rotation viscosity.

<Optical Anisotropy (Refractive Index Anisotropy; Δn; Measured at 25° C.)>

Measurement was conducted by an Abbe's refractometer, in which a polarizing plate was attached to an eyepiece, using a light having a wavelength of 589 nm. After rubbing the surface of the main prism in one direction, the specimen was dripped on the main prism. The refractive index n∥ was measured when the direction of polarization was in parallel to the rubbing direction. The refractive index n⊥ was measured when the polarizing direction was perpendicular to the rubbing direction. The value of the optical anisotropy was calculated according to the equation, Δn=n∥−n⊥.

<Dielectric Anisotropy (Δ∈; Measured at 25° C.)>

(1) Specimen Having Positive Dielectric Anisotropy:

A specimen was placed in a TN device with a distance between two glass substrates (cell gap) of 9 μm and a twist angle of 80°. A sine wave (10 V, 1 kHz) was applied to the device, and after lapsing 2 seconds, the dielectric constant in the direction of the major axis of the liquid crystal molecule (∈∥) was measured. A sine wave (0.5 V, 1 kHz) was applied to the device, and after lapsing 2 seconds, the dielectric constant in the direction of the minor axis of the liquid crystal molecule (∈⊥) was measured. The value of the dielectric anisotropy was calculated according to the equation, Δ∈=∈∥−∈⊥.

(2) Specimen Having Negative Dielectric Anisotropy:

A specimen was placed in a VA device with a distance between two glass substrates (cell gap) of 20 μm. A sine wave (0.5 V, 1 kHz) was applied to the device, and after lapsing 2 seconds, the dielectric constant in the direction of the major axis of the liquid crystal molecule (∈||) was measured. The specimen was placed in a TN device with a distance between two glass substrates (cell gap) of 9 μm and a twist angle of 80°. A sine wave (0.5 V, 1 kHz) was applied to the device, and after lapsing 2 seconds, the dielectric constant in the direction of the minor axis of the liquid crystal molecule (∈⊥) was measured. The value for the dielectric anisotropy was calculated according to the equation, Δ∈=∈||−∈⊥.

<Threshold Voltage (Vth; Measured at 25° C.; V)>

Only specimens having a positive dielectric anisotropy were measured. The threshold voltage was measured by using a brightness meter, Model LCD5100, produced by Otsuka Electronics Co., Ltd. A halogen lamp was used as a light source. A specimen was poured into a TN device of a normally white mode having a cell gap between two glass plates of 0.9 μm and a twist angle of 80°. A voltage (32 Hz, rectangular wave) applied to the device was increased from 0 to 10 V stepwise by 0.02 V. At this time, the device was irradiated with light in the perpendicular direction to measure the light amount transmitted through the device. A voltage-transmittance curve was prepared with the maximum light amount being 100% and the minimum light amount being 0%. The threshold voltage was designated as a voltage at which the transmittance was 90%.

<Voltage Holding Ratio (VHR; Measured at 25° C.; %)>

A TN device used for the measurement had a polyimide alignment film and the TN device has a distance between two glass substrates (cell gap) of 6 μm. A specimen was poured into the device, which was then sealed with an adhesive that is polymerizable with an ultraviolet ray. The TN device was charged by applying a pulse voltage (5 V for 60 microseconds). The voltage thus attenuated was measured with a high-speed voltmeter for 16.7 milliseconds, and an area A between the voltage curve and the abscissa per unit cycle was obtained. An area where the voltage was not attenuated was designated as an area B. The voltage holding ratio was a percentage of the area A with respect to the area B.

<$^1$H-NMR Analysis>

The $^1$H-NMR analysis was carried out by using DRX-500 (produced by Bruker Biospin Co., Ltd.). A solution obtained by dissolving a sample in a deuterated solvent capable of dissolving the sample, such as CDCl$_3$, was measured with a nuclear magnetic resonance apparatus at room temperature. Tetramethylsilane (TMS) was used as a standard substance of the zero point of δ value.

<Gas Chromatography Analysis>

The gas chromatography analysis was carried out by using a gas chromatography apparatus Model GC-14B, produced by Shimadzu Corp. A carrier gas was helium (2 mL/min). The specimen vaporizing chamber was set at 280° C., and the detector (FDI) was set at 300° C. The component compounds were separated by using a capillary column DB-1 (length: 30 m; inner diameter: 0.32 mm; membrane thickness: 0.25 μm; stationary phase: dimethylpolysiloxane; no polarity), produced by Agilent Technologies, Inc. The column was maintained at 200° C. for 2 minutes and then increased in temperature to 280° C. at a rate of 5° C. per minute. A specimen was formed into an acetone solution (0.1% by weight), and 1 μL thereof was injected into the specimen vaporizing chamber. A data recorder was Cromatopac Model C-R5A, produced by Shimadzu Corp. or an equivalent thereof. The resulting gas chromatogram exhibited peak retention times and peak areas corresponding to the component compounds.

The solvent for diluting the sample may be chloroform, hexane and the like. The following capillary columns may be used for separating the component compounds: HP-1 (length: 30 m; inner diameter: 0.32 mm; membrane thickness: 0.25 μm), produced by Agilent Technologies, Inc.; Rtx-1 (length: 30 m; inner diameter: 0.32 mm; membrane thickness: 0.25 μm), produced by Restek Corporation; and BP-1 (length: 30 m; inner diameter: 0.32 mm; membrane thickness: 0.25 μm), produced by SGE International Pty. Ltd. In order to prevent compound peaks from overlapping, a capillary column CBP1-M50-025 (length: 50 m; inner diameter: 0.25 mm; membrane thickness: 0.25 μm), produced by Shimadzu Corporation may be used. The area ratios of the peaks in the gas chromatogram correspond to the ratios of the component compounds. The weight percentages of the component compounds do not completely agree with the area ratios of the peaks. In the invention, however, the weight percentages of the component compounds can be regarded as being the same as the area ratios of the peaks upon using the aforementioned columns. This is because there is no large difference in compensation coefficients among the component compounds.

Example 1

Synthesis of 1-(4-(4-(4-propylcyclohexyl)phenyl)-2-hydroxyphenyl)-1-propanone (Compound (1-2-1-11))

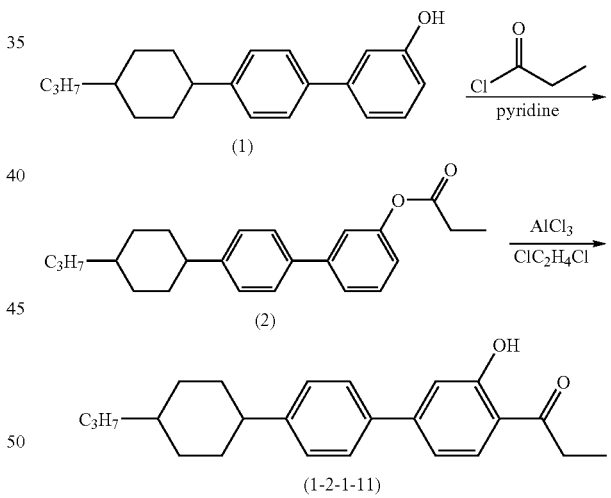

<First Step>

Under a nitrogen atmosphere, 1.6 g of propanoyl chloride was added to 5.0 g of 3-((4-propylcyclohexyl)phenyl)phenol (1) dissolved in 10 mL (mili-litter) of pyridine under cooling with iced water, and after completing dropwise addition, the mixture was stirred at ambient temperature for 2 hours. The resulting solution was added to 20 mL of 3N hydrochloric acid. The aqueous layer was extracted with diethyl ether, which was added to the organic layer, and the organic layer was washed with a saturated salt solution and then dried over anhydrous magnesium sulfate. The solvent was distilled off to obtain 6.42 g of 3-((4-propylcyclohexyl)phenyl)phenyl propanoate (2).

<First Step>

Under a nitrogen atmosphere, 1.7 g of propanoyl chloride was added to 5.0 g of 3-((4-propylcyclohexyl)cyclohexyl) phenol (3) dissolved in 10 mL of pyridine under cooling with iced water, and after completing dropwise addition, the mixture was stirred at ambient temperature for 2 hours. The resulting solution was added to 20 mL of 3N hydrochloric acid. The aqueous layer was extracted with diethyl ether, which was added to the organic layer, and the organic layer was washed with a saturated salt solution and then dried over anhydrous magnesium sulfate. The solvent was distilled off to obtain 6.52 g of 3-((4-propylcyclohexyl)cyclohexyl)phenyl propanoate (4).

<Second Step>

Under heat-refluxing in a nitrogen atmosphere, 6.52 g of Compound (4) dissolved in 5 mL of 1,2-dichloroethane was added dropwise to 2.67 g of aluminum chloride dissolved in 5 mL of 1,2-dichloroethane, followed by refluxing under heat for 6 hours. After cooling the reaction solution to ambient temperature, the solution was added to distilled water. The aqueous layer was extracted with toluene, which was added to the organic layer, and the organic layer was washed with a saturated salt solution and then dried over anhydrous magnesium sulfate. The solvent was distilled off, and the residue was purified by silica gel chromatography and recrystallization to obtain 1.25 g of 1-(4-(4-(4-propylcyclohexyl)cyclohexyl)-2-hydroxyphenyl)-1-propanone (Compound (1-2-1-1)) as colorless crystals.

Phase transition point (° C.):

C 107.2 N 209.8 Iso $^1$H-NMR(CDCl$_3$) (δ (ppm)):

12.3 (s, 1H), 7.59 (d, 1H), 6.74 (d, 1H), 6.67 (dd, 1H), 2.92 (q, 2H), 2.36 (tt, 1H), 1.83-1.64 (m, 8H), 1.36-1.20 (m, 4H), 1.17 (t, 3H), 1.08-0.88 (m, 9H), 0.82-0.75 (m, 5H)

Example 3

Synthesis of 1-(4-(4-(4-propylcyclohexyl)phenyl)-3-fluoro-2-hydroxyphenyl)-1-propanone (Compound (1-2-2-11))

<Second Step>

Under refluxing in a nitrogen atmosphere, 4.55 g of Compound (2) dissolved in 5 mL of 1,2-dichloroethane was added dropwise to 2.73 g of aluminum chloride dissolved in 5 mL of 1,2-dichloroethane, followed by refluxing for 6 hours. After cooling the reaction solution to ambient temperature, the solution was added to distilled water. The aqueous layer was extracted with toluene, which was added to the organic layer, and the organic layer was washed with a saturated salt solution and then dried over anhydrous magnesium sulfate. The solvent was distilled off, and the residue was purified by silica gel chromatography and recrystallization to obtain 1.25 g of 1-(4-(4-(4-propylcyclohexyl)phenyl)-2-hydroxyphenyl)-1-propanone (Compound (1-2-1-11)) as colorless crystals.

Phase transition point (° C.):

C 74.9 SmA 140.3 N 211.4 Iso $^1$H-NMR(CDCl$_3$) (δ (ppm)):

12.5 (s, 1H), 7.80 (d, 2H), 7.56 (d, 2H), 7.30 (d, 1H), 7.21 (d, 1H), 7.13 (dd, 1H), 3.06 (q, 2H), 2.51 (tt, 1H), 1.93-1.87 (m, 4H), 1.52-1.45 (m, 2H), 1.40-1.29 (m, 3H), 1.26 (t, 3H), 1.23-1.20 (m, 2H), 1.10-1.03 (m, 2H), 0.91 (t, 3H)

Example 2

Synthesis of 1-(4-(4-(4-propylcyclohexyl)cyclohexyl)-2-hydroxyphenyl)-1-propanone (Compound (1-2-1-1))

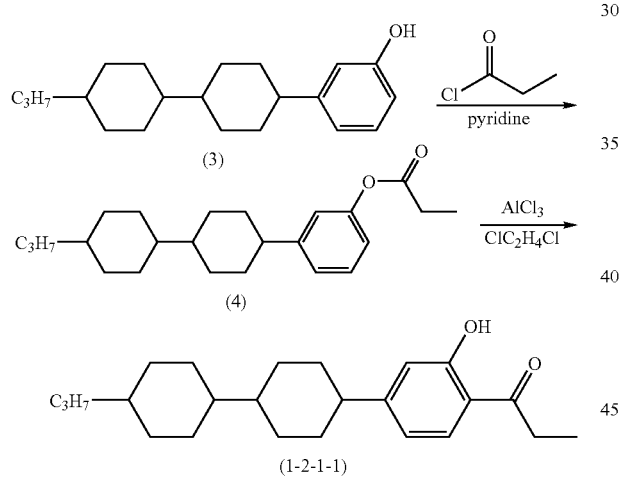

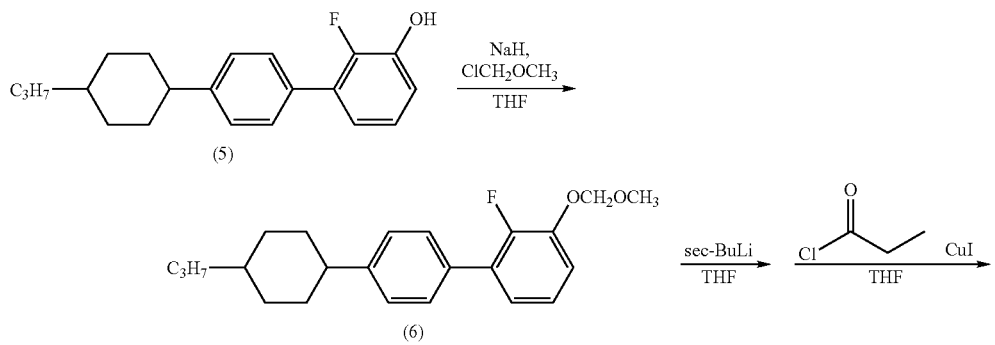

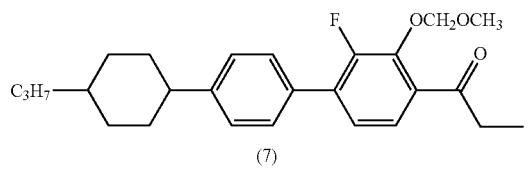
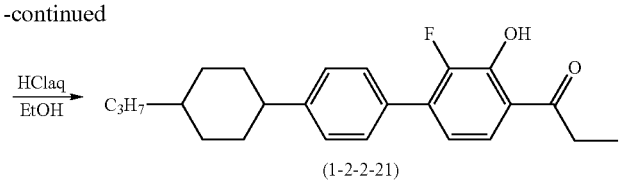

<First Step>

Under a nitrogen atmosphere, 1.52 g of sodium hydride was added to 9.45 g of 2-fluoro-3-((4-propylcyclohexyl)phenyl)phenol (5) dissolved in 60 mL of THF cooling with iced water, and the mixture was stirred at ambient temperature for 30 minutes. 3.07 g of chloromethyl methyl ether was added to the solution under cooling with iced water, followed by stirring at ambient temperature for 4 hours. After terminating the reaction by pouring water into the reaction solution, the aqueous layer was extracted with toluene, which was added to the organic layer, and the organic layer was washed with a saturated salt solution and then dried over anhydrous magnesium sulfate. The solvent was distilled off to obtain 11.6 g of 2-fluoro-3-((4-propylcyclohexyl)phenyl)-1-methoxymethoxybenzene (6).

<Second Step>

Under a nitrogen atmosphere, Compound (6) dissolved in 30 mL of THF was cooled to −78° C., to which 16.8 mL of sec-butyllithium (1.0 m/L) was added dropwise, followed by stirring at that temperature for 2 hours. The reaction solution was added dropwise to 3.2 g of copper(I) iodide and 1.55 g of propanoyl chloride suspended and dissolved in 10 mL THF at −78° C., followed by stirring at that temperature for 1 hour and at ambient temperature overnight. After terminating the reaction by pouring a saturated ammonium chloride aqueous solution into the reaction solution, the aqueous layer was extracted with toluene, which was added to the organic layer, and the organic layer was washed with a saturated salt solution and then dried over anhydrous magnesium sulfate. The solvent was distilled off to obtain 3.65 g of 1-(4-(4-(4-propylcyclohexyl)phenyl)-3-fluoro-2-methoxymethoxyphenyl)-1-propanone (7).

<Third Step>

17.7 mL of 1N hydrochloric acid was added to Compound (7) dissolved in 17.7 mL of ethanol, followed by refluxing under heating for 2 hours. After cooling the reaction solution to ambient temperature, water was added to the solution. The aqueous layer was extracted with toluene, which was added to the organic layer, and the organic layer was washed with a saturated salt solution and then dried over anhydrous magnesium sulfate. The solvent was distilled off, and the residue was purified by silica gel chromatography and recrystallization to obtain 1.48 g of 1-(4-(4-(4-propylcyclohexyl)phenyl)-3-fluoro-2-hydroxyphenyl)-1-propanone (Compound (1-2-2-21)) as colorless crystals.

Phase transition point (° C.):
C 95.2 N 207.9 Iso $^{1}$H-NMR(CDCl$_3$) (δ (ppm)):
12.5 (s, 1H), 7.57 (dd, 1H), 7.52 (dd, 2H), 7.31 (d, 2H), 6.95 (dd, 1H), 3.06 (q, 2H), 2.52 (tt, 1H), 1.94-1.87 (m, 4H), 1.52-1.45 (m, 2H), 1.39-1.29 (m, 3H), 1.26 (t, 3H), 1.23-1.20 (m, 2H), 1.10-1.03 (m, 2H), 0.91 (t, 3H)

Example 4

Based on Examples 1 to 3 and the aforementioned synthetic methods, compounds (1-1-1-1) to (1-3-2-20) shown below are synthesized. Compounds (1-2-1-11), (1-2-1-1) and (1-2-2-21) obtained in Examples 1 to 3 are also listed below.

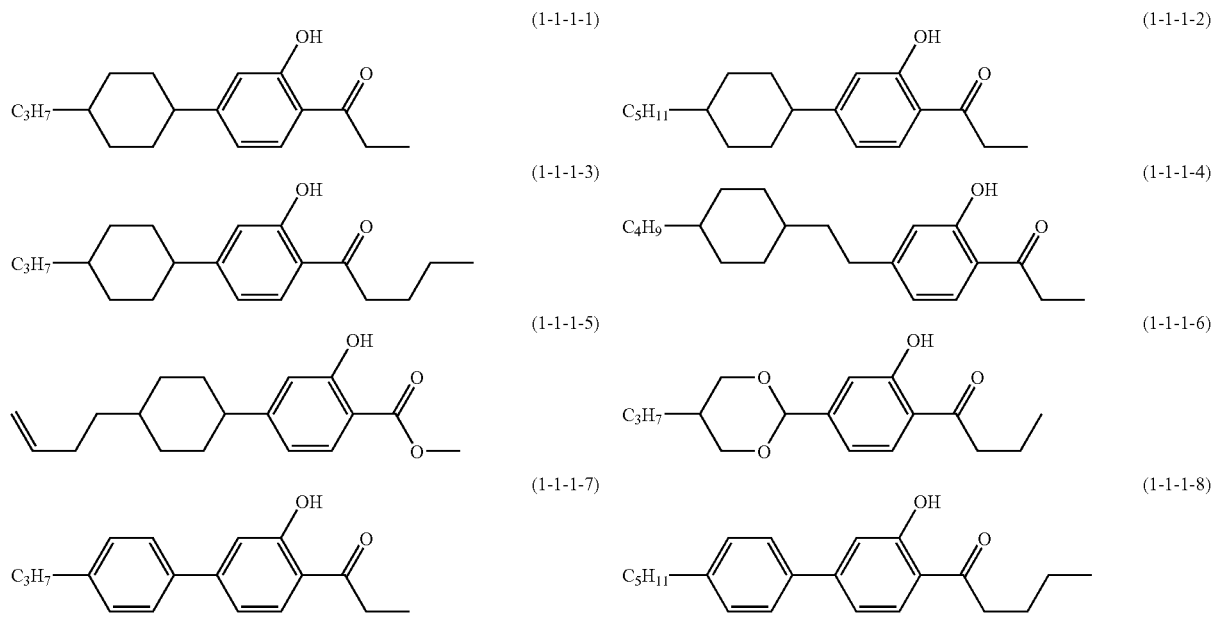

-continued
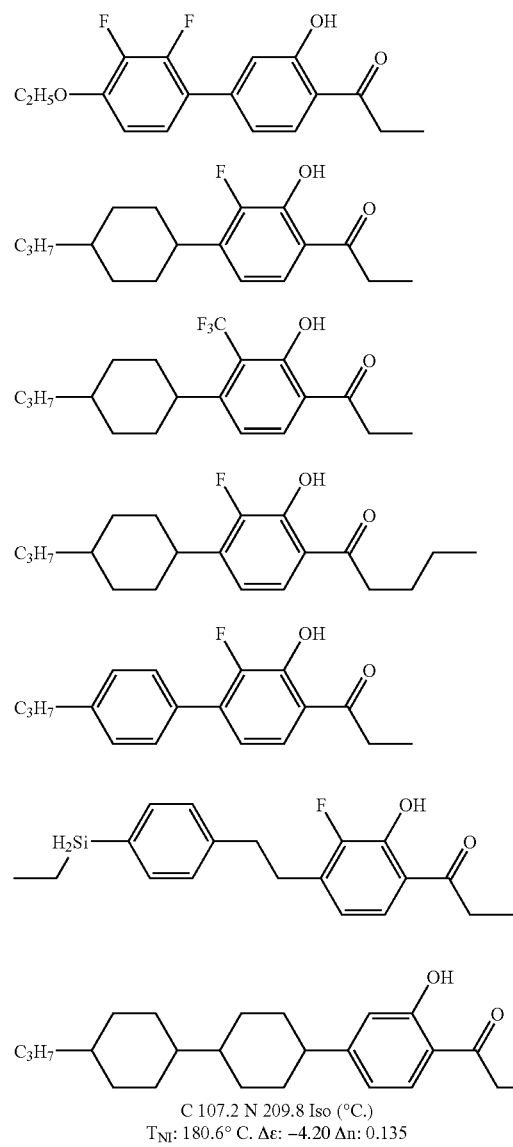
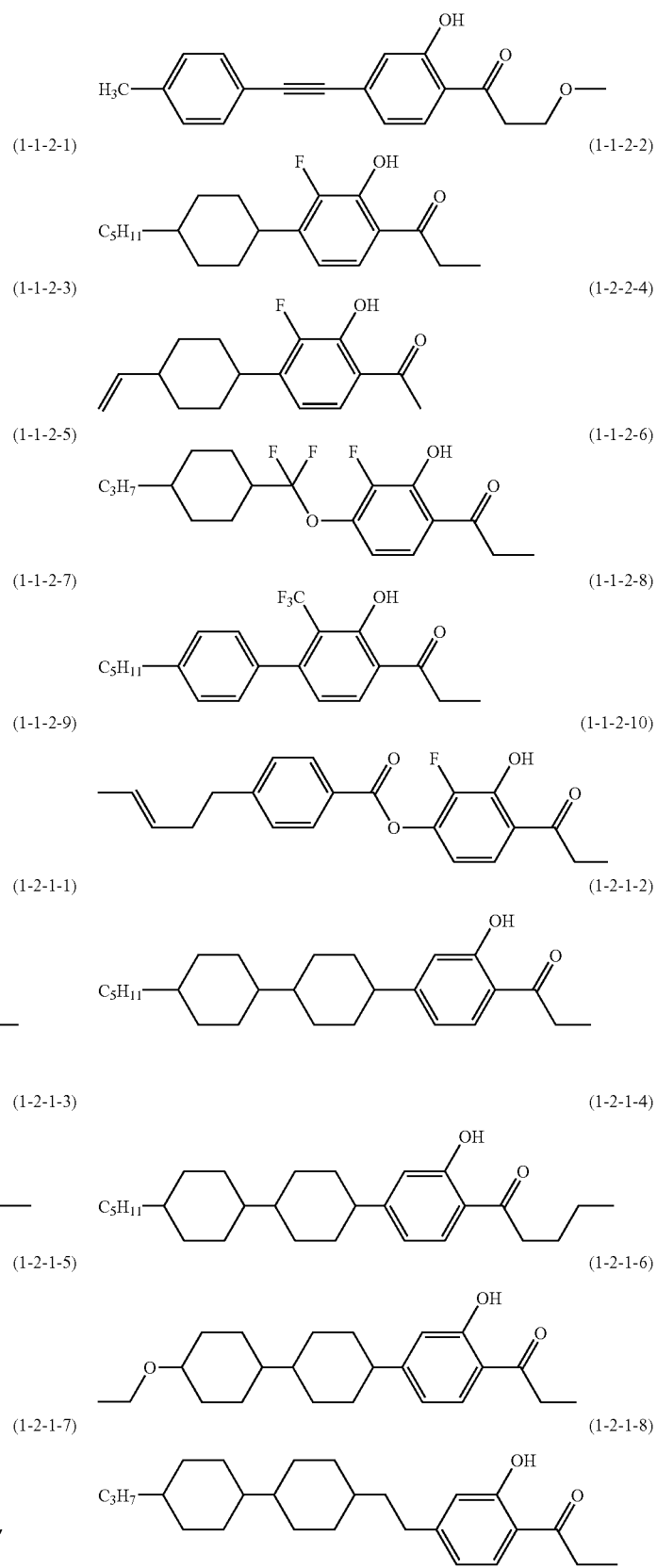

-continued
(1-2-1-9)
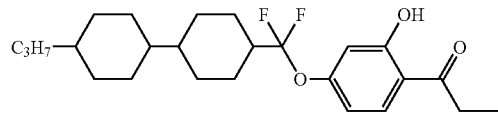
(1-2-1-10)
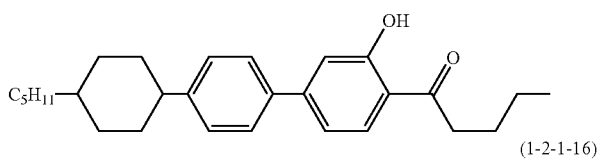
(1-2-1-11)
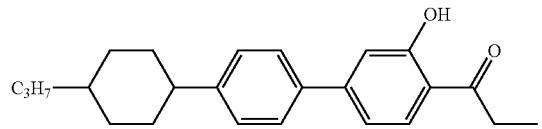
C 74.9 SmA 140.3 N 211.4 Iso (°C.)
T$_{NI}$: 188.6° C. Δε: -3.04 Δn: 0.228
(1-2-1-12)
(1-2-1-13)
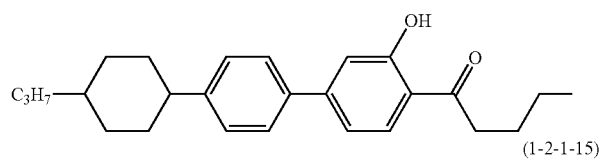
(1-2-1-14)
(1-2-1-15)
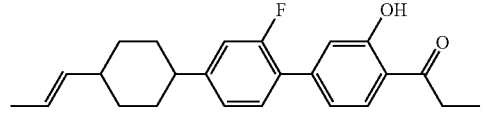
(1-2-1-16)
(1-2-1-17)
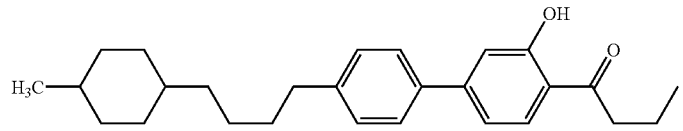
(1-2-1-18)
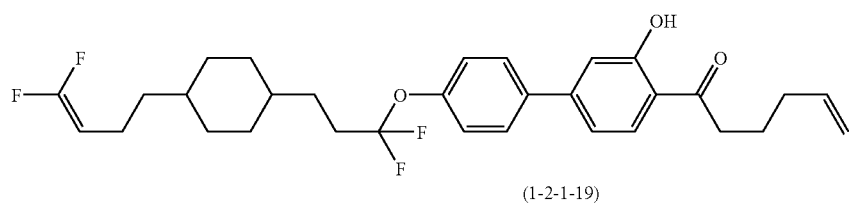
(1-2-1-19)
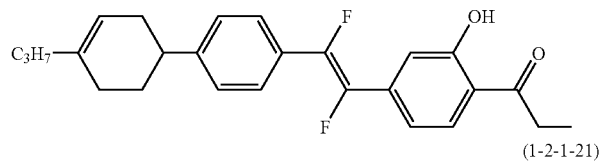
(1-2-1-20)
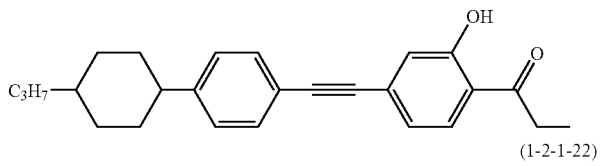
(1-2-1-21)
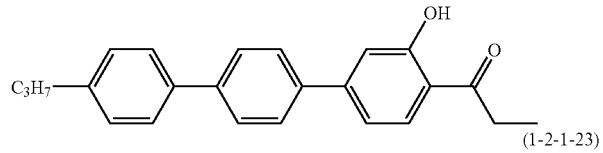
(1-2-1-22)
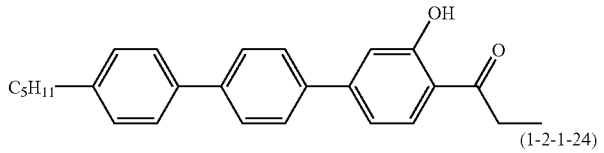
(1-2-1-23)
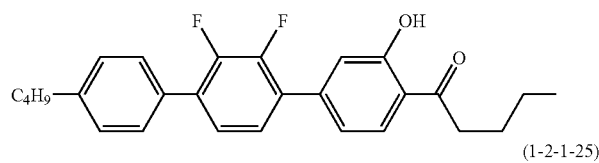
(1-2-1-24)
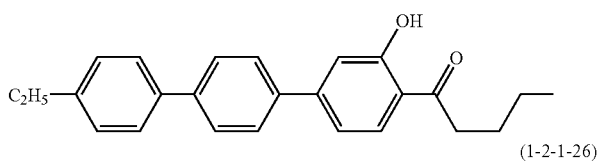
(1-2-1-25)
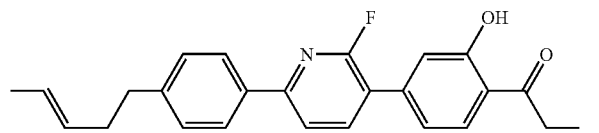
(1-2-1-26)
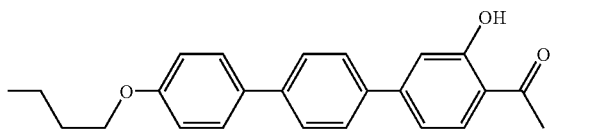

-continued
(1-2-1-27)
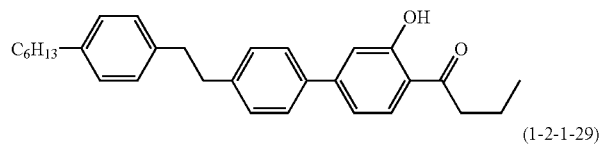
(1-2-1-28)
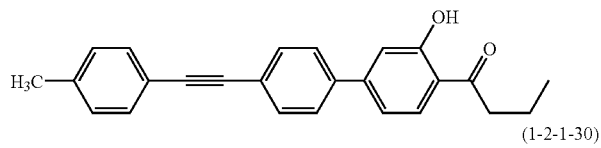
(1-2-1-29)
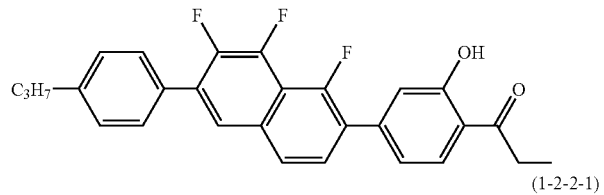
(1-2-1-30)
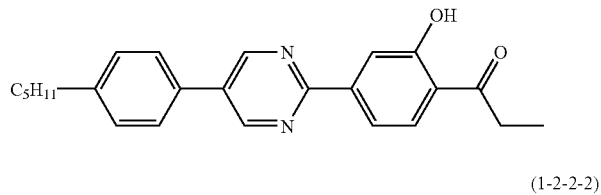
(1-2-2-1)
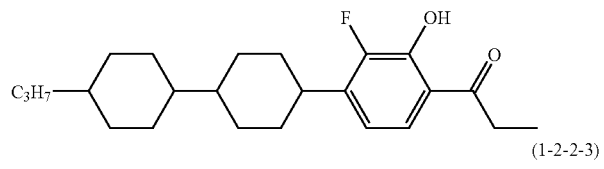
(1-2-2-2)
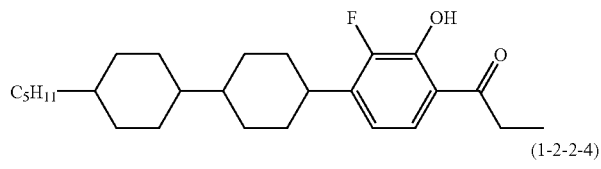
(1-2-2-3)
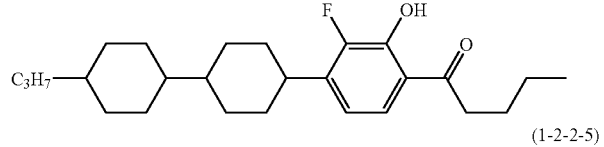
(1-2-2-4)
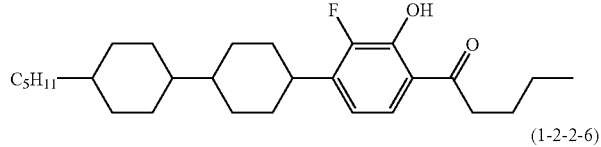
(1-2-2-5)
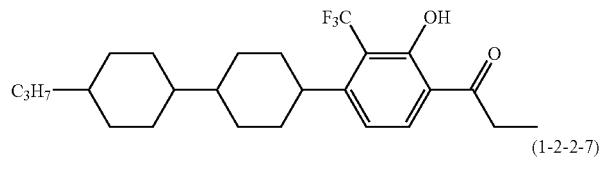
(1-2-2-6)
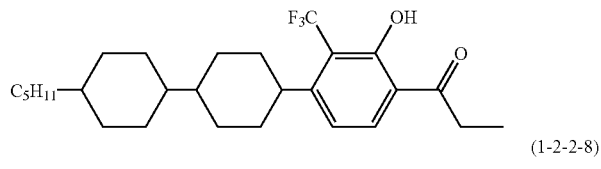
(1-2-2-7)
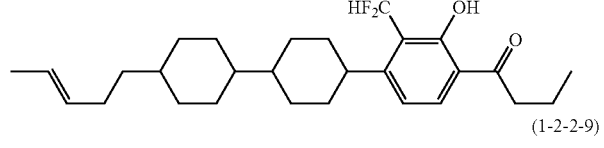
(1-2-2-8)
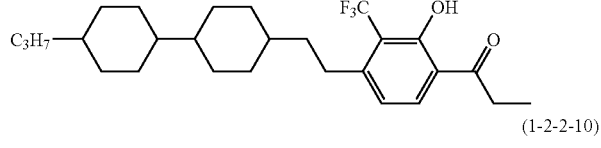
(1-2-2-9)
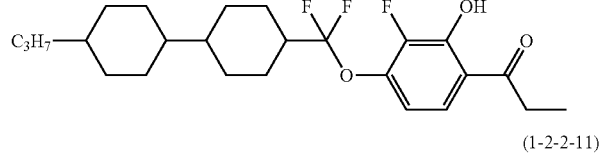
(1-2-2-10)
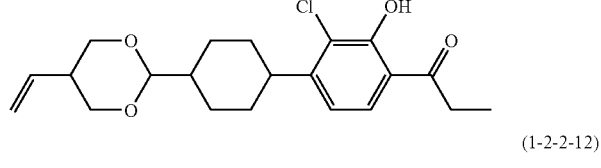
(1-2-2-11)
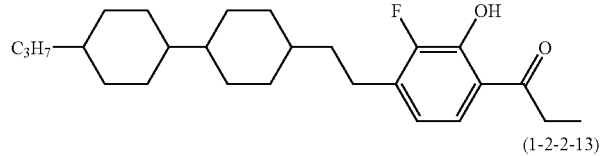
(1-2-2-12)
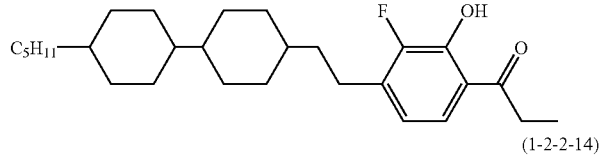
(1-2-2-13)
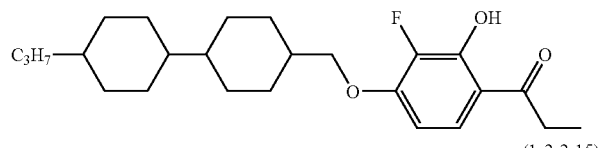
(1-2-2-14)
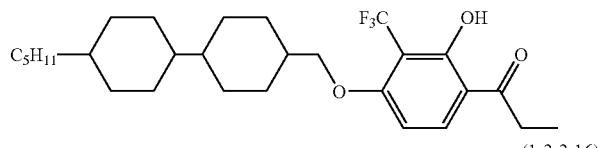
(1-2-2-15)
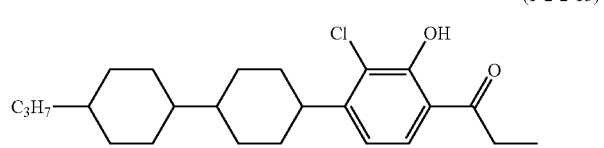
(1-2-2-16)
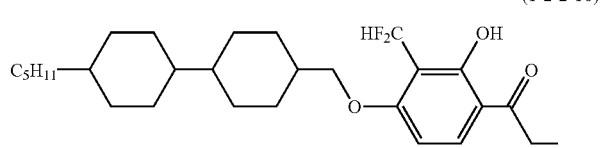

-continued
(1-2-2-17)
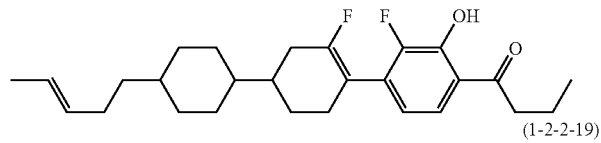
(1-2-2-18)
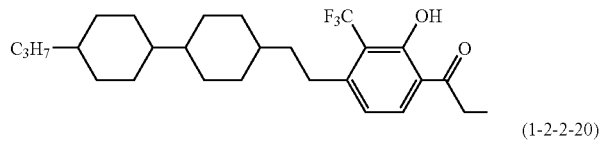
(1-2-2-19)
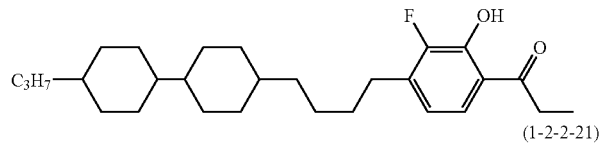
(1-2-2-20)
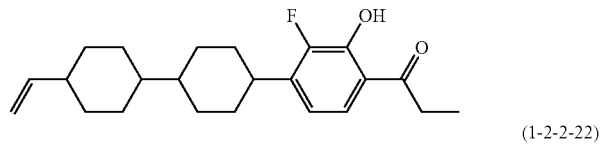
(1-2-2-21)
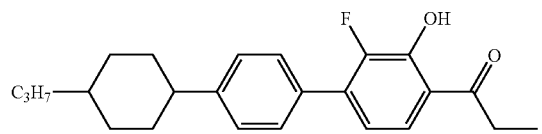
C 95.2 N 207.9 Iso (°C.)
$T_{NI}$: 183.9° C. Δε: −8.83 Δn: 0.105
(1-2-2-22)
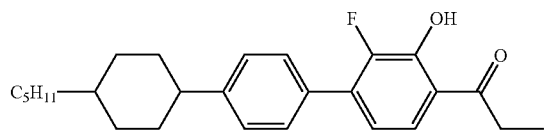
(1-2-2-23)
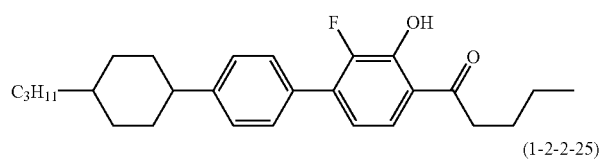
(1-2-2-24)
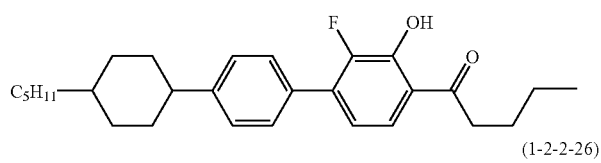
(1-2-2-25)
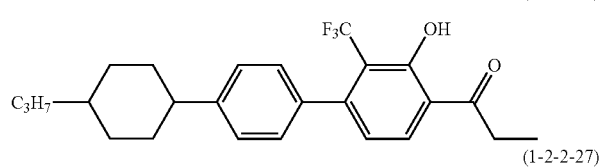
(1-2-2-26)
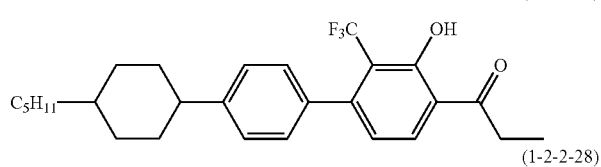
(1-2-2-27)
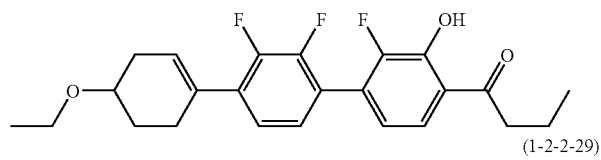
(1-2-2-28)
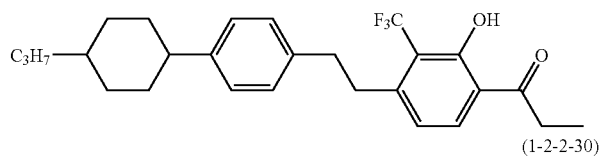
(1-2-2-29)
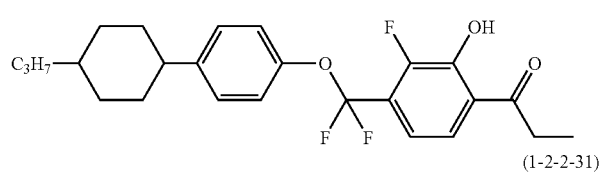
(1-2-2-30)
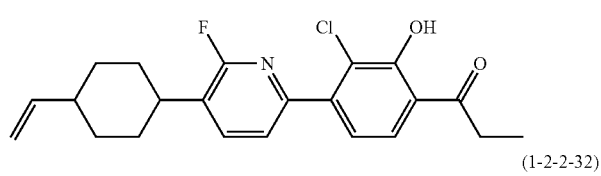
(1-2-2-31)
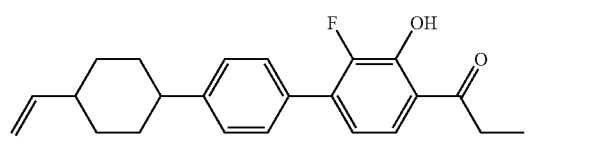
(1-2-2-32)
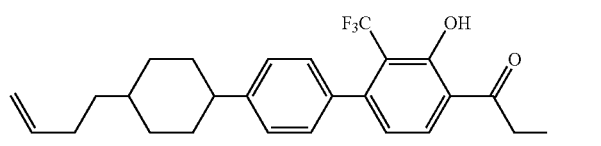
(1-2-2-33)
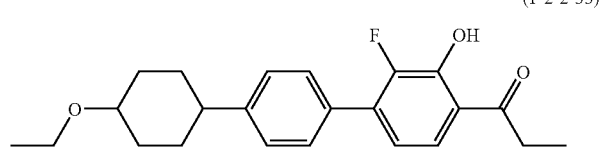
(1-2-2-34)
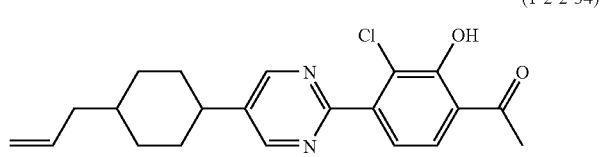
(1-2-2-35)
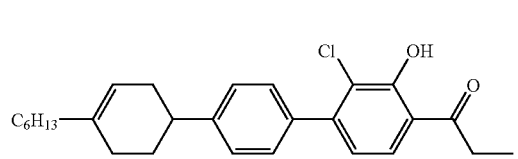
(1-2-2-36)
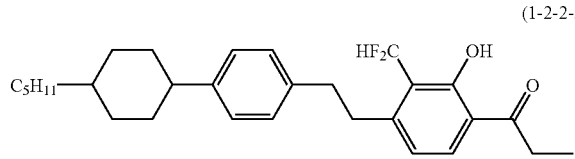

-continued
(1-2-2-37)
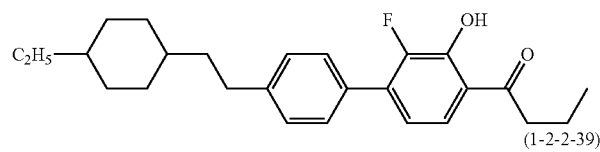
(1-2-2-38)
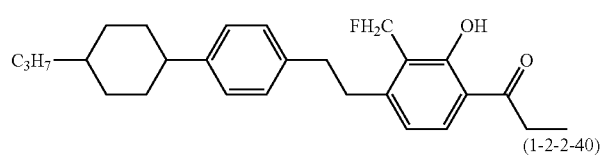
(1-2-2-39)
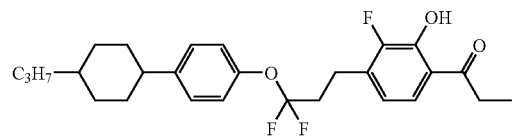
(1-2-2-40)
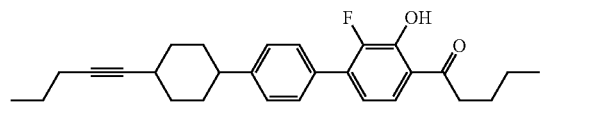
(1-2-2-41)
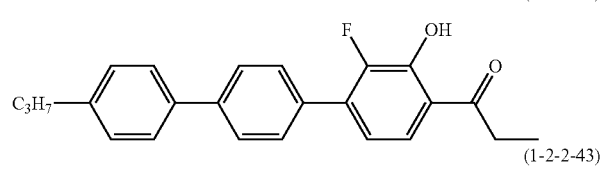
(1-2-2-42)
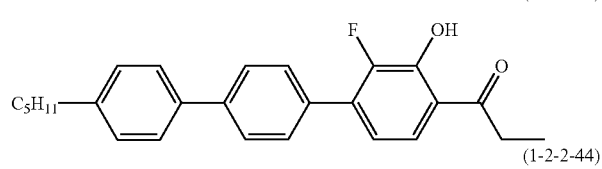
(1-2-2-43)
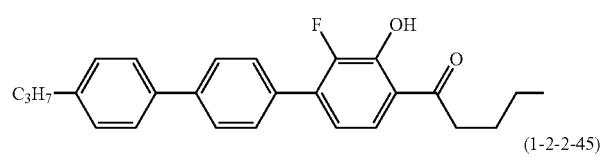
(1-2-2-44)
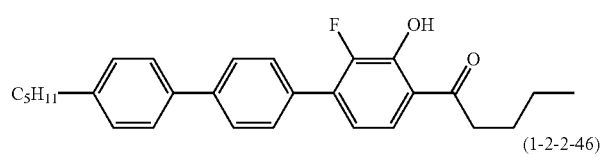
(1-2-2-45)
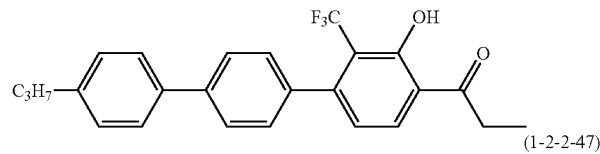
(1-2-2-46)
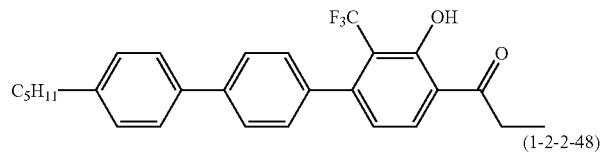
(1-2-2-47)
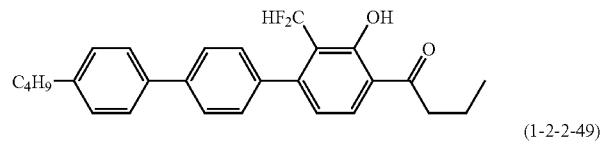
(1-2-2-48)
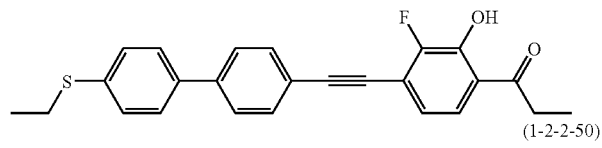
(1-2-2-49)
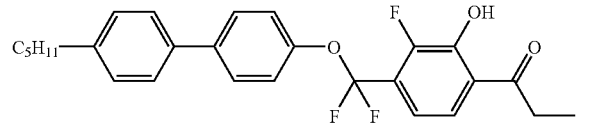
(1-2-2-50)
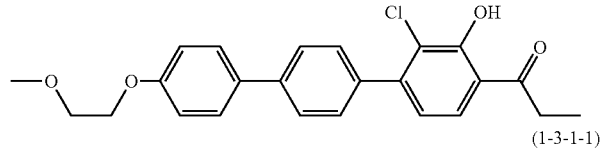
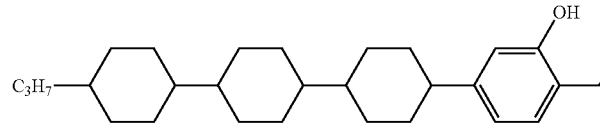
(1-3-1-1)
(1-3-1-2)
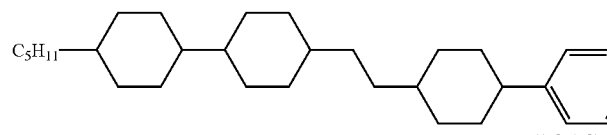
(1-3-1-3)
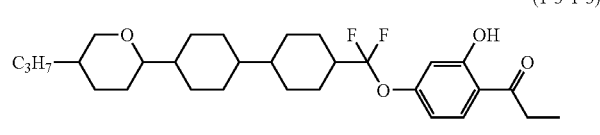
(1-3-1-4)
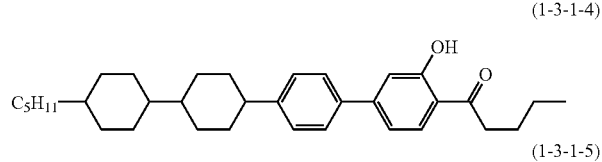
(1-3-1-5)
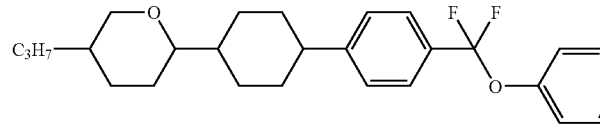

(1-3-1-6)
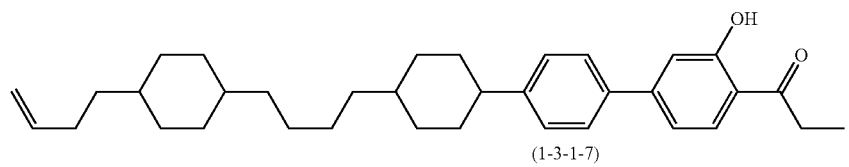
(1-3-1-7)
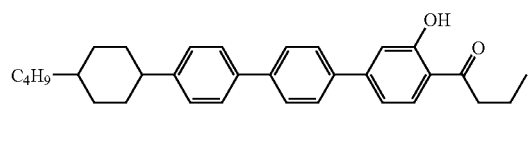
(1-3-1-8)
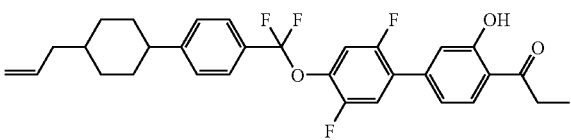
(1-3-1-9)
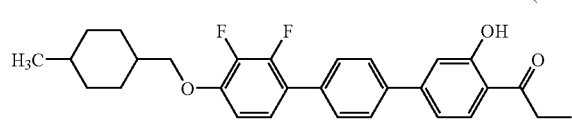
(1-3-1-10)
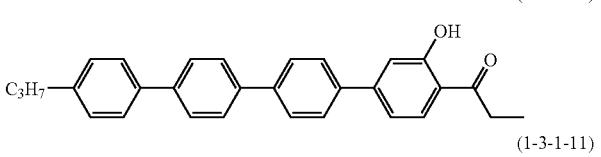
(1-3-1-11)
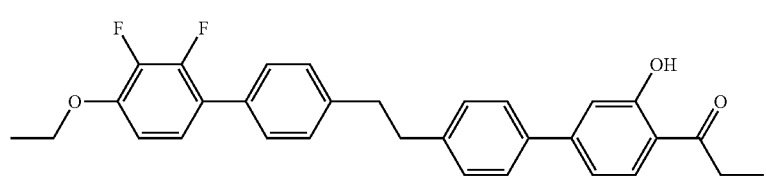
(1-3-1-12)
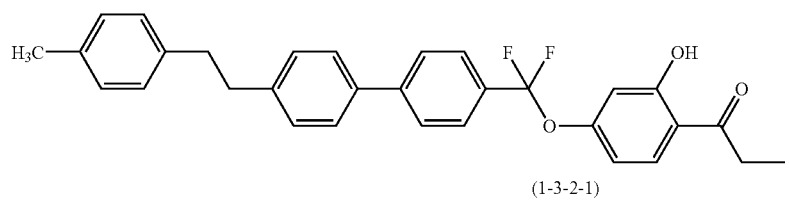
(1-3-2-1)
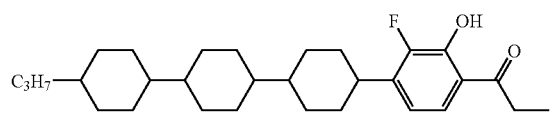
(1-3-2-2)
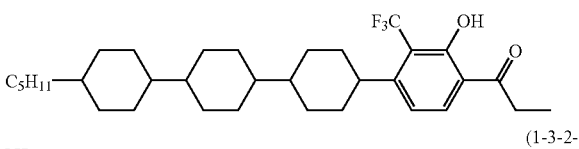
(1-3-2-3)
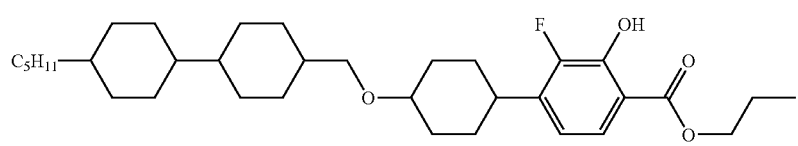
(1-3-2-4)
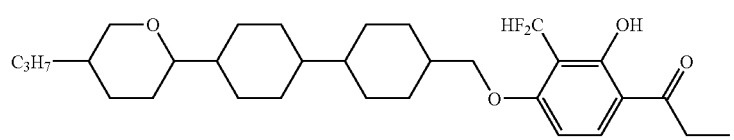
(1-3-2-5)
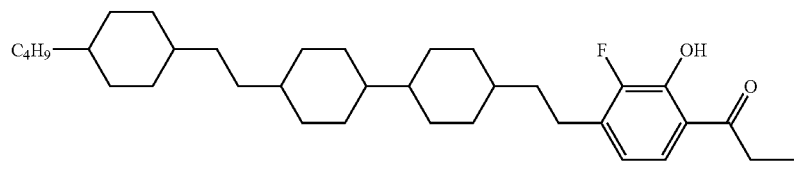
(1-3-2-6)
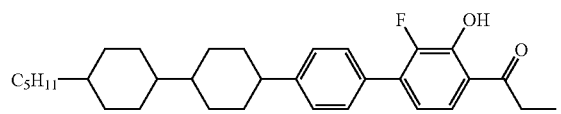
(1-3-2-7)
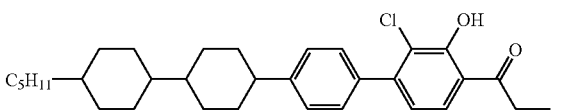

(1-3-2-8)
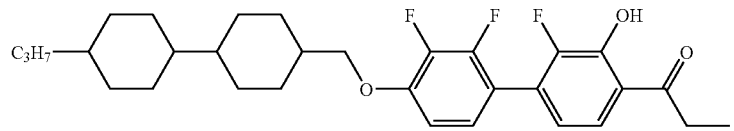
(1-3-2-9)
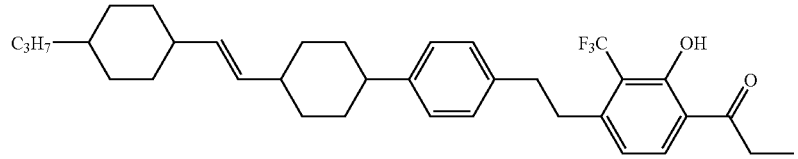
(1-3-2-10)
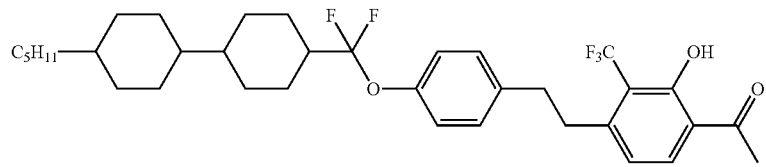
(1-3-2-11)
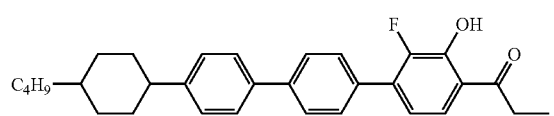
(1-3-2-12)
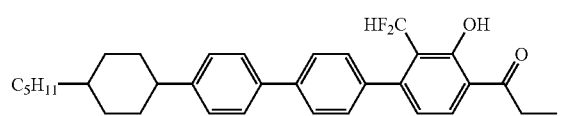
(1-3-2-13)
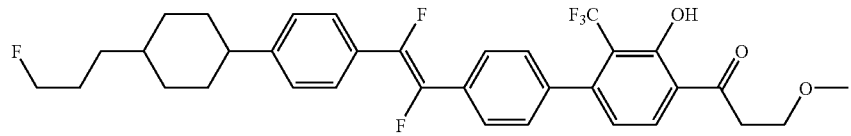
(1-3-2-14)
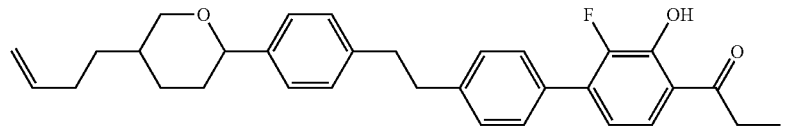
(1-3-2-15)
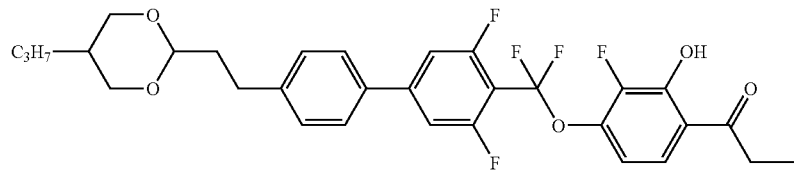
(1-3-2-16)
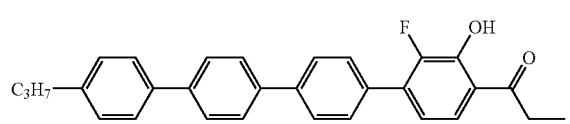
(1-3-2-17)
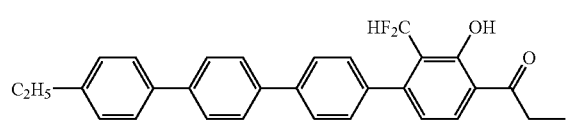
(1-3-2-18)
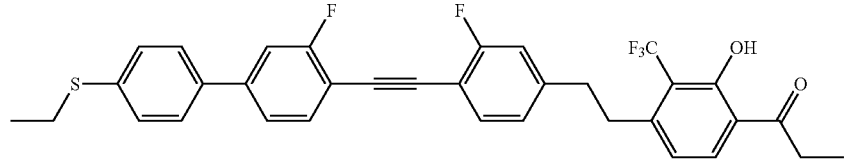
(1-3-2-19)
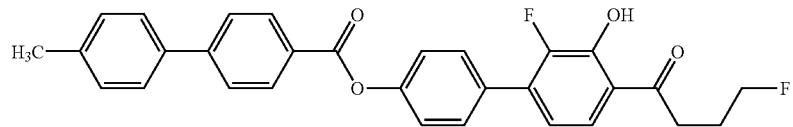

-continued (1-3-2-20)

$C_2H_5$-[biphenyl]-CH$_2$CH$_2$C(=O)O-[phenyl]-[2-Cl,3-OH-phenyl]-C(=O)CH$_2$CH$_3$

Example 5

The following five compounds were mixed to prepare composition A having a nematic phase (mother liquid crystal B).

4-ethoxyphenyl 4-propylcyclohexanecaboxylate: 17.2%

4-butoxyphenyl 4-propylcyclohexanecaboxylate: 27.6%

4-ethoxyphenyl 4-butylcyclohexanecaboxylate: 20.7%

4-methoxyphenyl 4-pentylcyclohexanecaboxylate: 20.7%

4-ethoxyphenyl 4-pentylcyclohexanecaboxylate: 13.8%

Composition A had the properties shown below.

Upper limit temperature ($T_{NI}$)=74.0° C.

Viscosity ($\eta_{20}$)=18.9 mPa·s

Optical anisotropy (Δn)=0.087

Dielectric anisotropy (Δ∈)=−1.3

Composition B was prepared by mixing 85% of composition A and 15% of 1-(4-(4-(4-propylcyclohexyl)phenyl)-2-hydroxyphenyl)-1-propanone (Compound (1-2-1-11)) obtained in Example 1, and had the properties shown below.

Optical anisotropy (Δn)=0.108

Dielectric anisotropy (Δ∈)=−1.68

It was found that the addition of compound (1-2-1-11) negatively increased the dielectric anisotropy to provide a low driving voltage upon using the composition in a liquid crystal display device.

Example 6

Composition C was prepared by mixing 85% of composition A in Example 5 and 15% of 1-(4-(4-(4-propylcyclohexyl)cyclohexyl)-2-hydroxyphenyl)-1-propanone (Compound (1-2-1-1)) obtained in Example 2, and had the properties shown below.

Optical anisotropy (Δn)=0.094

Dielectric anisotropy (Δ∈)=−1.82

It was found that the addition of Compound (1-2-1-1) negatively increased the dielectric anisotropy to provide a low driving voltage upon using the composition in a liquid crystal display device.

INDUSTRIAL APPLICABILITY

The compound of the invention has plural characteristics among general characteristics demanded for a liquid crystal compound, stability to heat, light and the like, a small viscosity, a suitable optical anisotropy, a negatively large dielectric anisotropy, a wide temperature range of a nematic phase, and favorable compatibility with other liquid crystal compounds. In particular, the compound has a negatively large dielectric anisotropy and a wide temperature range of a nematic phase.

The liquid crystal composition containing at least one of the compound of the invention has plural characteristics among a high upper limit temperature of a nematic phase, a low lower limit temperature of a nematic phase, a small viscosity, a suitable optical anisotropy, and a low threshold voltage. In particular, the composition has a high upper limit temperature of a nematic phase and a low lower limit temperature of a nematic phase. The liquid crystal display device containing the liquid crystal composition has plural characteristics among a wide usable temperature range, a short response time, a small power consumption, a large contrast ratio and a low driving voltage.

What is claimed is:

1. A compound represented by Formula (1):

(1)

$Ra-\left(\!\!\left[A^1\right]\!\!-Z^1\right)_m-$[phenyl with $Y^1$, OH]$-C(=O)-Rb$ wherein Ra and Rb each independently is hydrogen or linear alkyl having 1 to 20 carbon atoms; in the alkyl, arbitrary —CH$_2$— may be replaced by —O—, or —CH=CH and arbitrary hydrogen may be replaced by fluorine;

ring A$^1$ is 1,4-cyclohexylene, 1,4-phenylene, pyridine-2,5-diyl, pyridazine-3,6-diyl, decahydronaphthalene-2,6-diyl, 1,2,3,4-tetrahydronaphthalene-2,6-diyl, 5,6,7,8-tetrahydronaphthalene-2,6-diyl, or naphthalene-2,6-diyl; arbitrary —CH$_2$— constituting the rings may be replaced by —O—, and arbitrary hydrogen directly bonded to the rings may be replaced by fluorine, —CF$_3$, —CHF$_2$, —CH$_2$F, —OCF$_3$, —OCHF$_2$, or —OCH$_2$F;

Z$^1$ is a single bond or alkylene having 1 to 4 carbon atoms; in the alkylene, arbitrary —CH$_2$— may be replaced by —O—, —CO—, —CH=CH—, —CF=CF—, or —C≡C—, and arbitrary hydrogen may be replaced by fluorine;

Y$^1$ is hydrogen, fluorine, chlorine, —CF$_3$, —CHF$_2$, —CH$_2$F, —OCF$_3$, —OCHF$_2$, or —OCH$_2$F; and m is 1, 2, or 3; and when m is 2 or 3, plural rings A$^1$ may be identical groups or different groups, and plural Z$^1$ may be identical groups or different groups.

2. The compound according to claim 1, wherein Ra and Rb each independently is linear alkyl having 1 to 20 carbon atoms, linear alkoxy having 1 to 19 carbon atoms, linear alkoxyalkyl having 2 to 19 carbon atoms, linear alkenyl having 2 to 21 carbon atoms, linear fluorinated alkyl having 1 to 20 carbon atoms, or linear fluorinated alkoxy having 1 to 19 carbon atoms;

ring A$^1$ is 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1, 4-phenylene, pyridine-2,5-diyl, 6-fluoropyridine-2,5-diyl, or pyridazine-3,6-diyl;

$Z^1$ is a single bond, —(CH$_2$)$_2$—, —COO—, —OCO—, —CH$_2$O—, —OCH$_2$—, —CF$_2$O—, —OCF$_2$—, —CH=CH—, —CF=CF—, —C≡C—, —CH$_2$CO—, —COCH$_2$—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O—, —O(CH$_2$)$_3$—, or —(CH$_2$)$_4$—; and $Y^1$ is hydrogen, fluorine, chlorine, —CF$_3$, —CHF$_2$, —CH$_2$F, —OCF$_3$, —OCHF$_2$, or —OCH$_2$F.

3. The compound according to claim 1, wherein Ra and Rb each independently is linear alkyl having 1 to 10 carbon atoms, linear alkoxy having 1 to 10 carbon atoms, linear alkoxyalkyl having 2 to 10 carbon atoms, linear alkenyl having 2 to 10 carbon atoms, linear fluorinated alkyl having 1 to 10 carbon atoms, or linear fluorinated alkoxy having 1 to 10 carbon atoms;

ring $A^1$ independently is 1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, or 2,6-difluoro-1,4-phenylene;

$Z^1$ independently is a single bond, —(CH$_2$)$_2$—, —COO—, —OCO—, —CH$_2$O—, —OCH$_2$—, —CF$_2$O—, —OCF$_2$—, —CH=CH—, —CF=CF—, —C≡C—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O—, —O(CH$_2$)$_3$—, or —(CH$_2$)$_4$—; and $Y^1$ is hydrogen, fluorine, chlorine, —CF$_3$, —CHF$_2$, or —CH$_2$F.

4. The compound according to claim 1, wherein Ra and Rb each independently is linear alkyl having 1 to 10 carbon atoms, linear alkoxy having 1 to 10 carbon atoms, linear alkoxyalkyl having 2 to 10 carbon atoms, linear alkenyl having 2 to 10 carbon atoms, —CH$_2$F, or —OCH$_2$F;

ring $A^1$ is 1,4-cyclohexylene, 1,4-phenylene, 2-fluoro-1,4-phenylene, or 2,3-difluoro-1,4-phenylene;

$Z^1$ is a single bond, —(CH$_2$)$_2$—, —COO—, —OCO—, —CH$_2$O—, —OCH$_2$—, —CF$_2$O—, —OCF$_2$—, —CH=CH—, or —C≡C—; and $Y^1$ is hydrogen, fluorine, —CF$_2$H, or —CF$_3$.

5. The compound according to claim 1, wherein Ra is linear alkoxy having 1 to 6 carbon atoms, linear alkoxyalkyl having 2 to 6 carbon atoms, or an linear alkenyl having 2 to 6 carbon atoms;

Rb is linear alkyl having 1 to 6 carbon atoms or linear alkoxy having 1 to 6 carbon atoms;

ring $A^1$ is 1,4-cyclohexylene, 1,4-phenylene, 2-fluoro-1,4-phenylene, or 2,3-difluoro-1,4-phenylene;

$Z^1$ is a single bond or —(CH$_2$)$_2$—; and $Y^1$ is hydrogen or fluorine.

6. A compound represented by one of formulae (I) to (V):

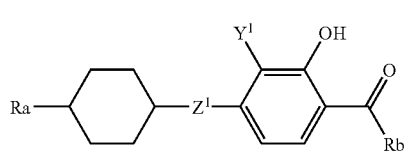

(I)

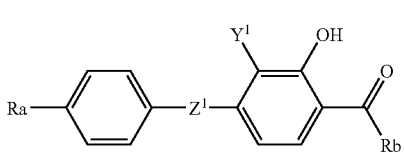

(II)

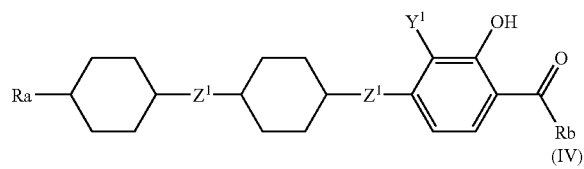

(III)

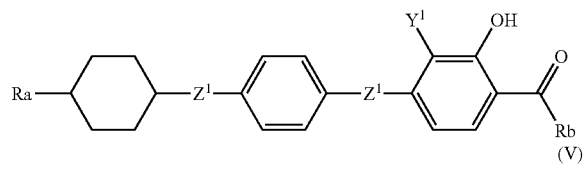

(IV)

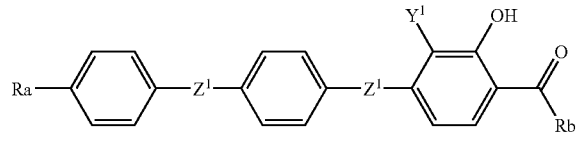

(V)

wherein Ra and Rb each independently is linear alkyl having 1 to 10 carbon atoms, linear alkoxy having 1 to 10 carbon atoms, linear alkoxyalkyl having 2 to 10 carbon atoms, or an linear alkenyl having 2 to 10 carbon atoms;

$Z^1$ independently is a single bond, —(CH$_2$)$_2$—, —COO—, —OCO—, —CH$_2$O—, —OCH$_2$—, —CF$_2$O—, —OCF$_2$—, —CH=CH—, —CF=CF—, —C≡C—, —(CH$_2$)$_2$COO—, —OCO(CH$_2$)$_2$—, —(CH$_2$)$_2$CF$_2$O—, —(CH$_2$)$_3$O—, —O(CH$_2$)$_3$—, or —(CH$_2$)$_4$—; and $Y^1$ is hydrogen, fluorine, chlorine, —CF$_3$, or —CF$_2$H.

7. The compound according to claim 6, wherein Ra and Rb each independently is linear alkyl having 1 to 10 carbon atoms, linear alkoxy having 1 to 10 carbon atoms, or linear alkenyl having 2 to 10 carbon atoms;

$Z^1$ independently is a single bond, —(CH$_2$)$_2$—, —CH=CH—, or —(CH$_2$)$_4$—; and $Y^1$ is hydrogen, fluorine, chlorine, —CF$_3$, or —CF$_2$H.

8. The compound according to claim 6, wherein Ra and Rb each independently is linear alkyl having 1 to 10 carbon atoms, linear alkoxy having 1 to 10 carbon atoms, or linear alkenyl having 2 to 10 carbon atoms;

$Z^1$ independently is a single bond or —(CH$_2$)$_2$—; and $Y^1$ is hydrogen, fluorine, or —CF$_3$.

9. The compound according to claim 6, wherein Ra and Rb each independently is linear alkyl having 1 to 6 carbon atoms;

$Z^1$ is a single bond; and $Y^1$ is fluorine.

10. A compound represented by the formula below:

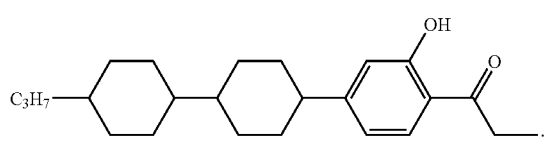

11. A compound represented by the formula below:

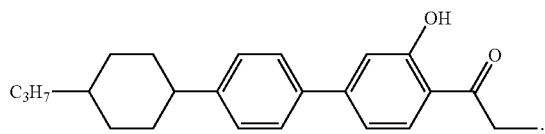

12. A compound represented by the formula below:

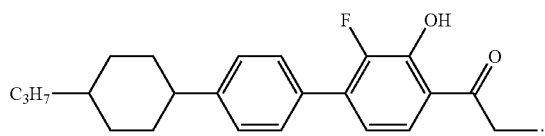

13. A liquid crystal composition comprising at least one compound selected from the group consisting of the compounds according to claim 1.

14. The liquid crystal composition according to claim 13, wherein the composition further comprises at least one compound selected from the group consisting of compounds represented by Formulae (2), (3) and (4):

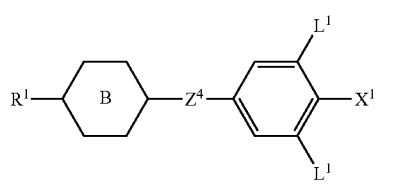

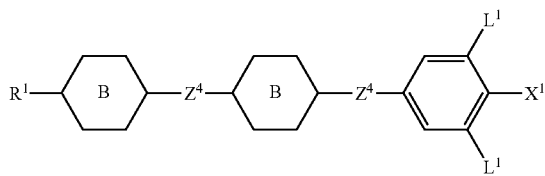

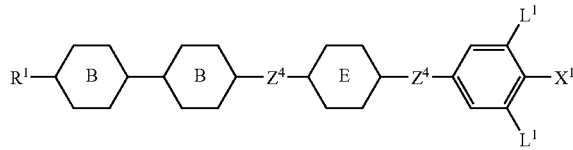

wherein $R^1$ is an alkyl having 1 to 10 carbon atoms; in the alkyl, arbitrary —CH$_2$— may be replaced by —O— or —CH=CH—, and arbitrary hydrogen may be replaced by fluorine;

$X^1$ is fluorine, chlorine, —OCF$_3$, —OCHF$_2$, —CF$_3$, —CHF$_2$, —CH$_2$F, —OCF$_2$CHF$_2$, or —OCF$_2$CHFCF$_3$;

ring B independently is 1,4-cyclohexylene, 1,3-dioxane-2,5-diyl, or 1,4-phenylene, in which arbitrary hydrogen may be replaced by fluorine;

$Z^4$ independently is —(CH$_2$)$_2$—, —(CH$_2$)$_4$—, —COO—, —CF$_2$O—, —OCF$_2$—, —CH$_2$=CH$_2$—, or a single bond; and $L^1$ independently is hydrogen or fluorine.

15. The liquid crystal composition according to claim 13, wherein the composition further comprises at least one compound selected from the group consisting of compounds represented by Formulae (5) and (6):

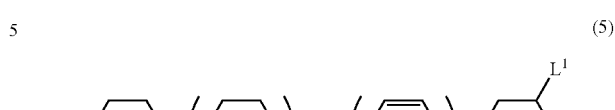

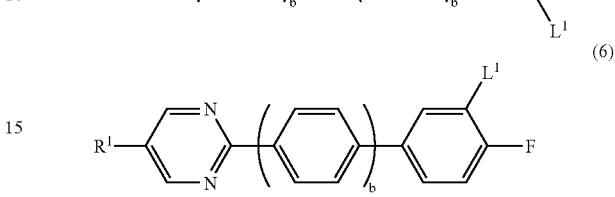

wherein $R^1$ is an alkyl having 1 to 10 carbon atoms; in the alkyl, arbitrary —CH$_2$— may be replaced by —O— or —CH=CH—, and arbitrary hydrogen may be replaced by fluorine;

$X^2$ is —CN or —C≡C—CN;

ring G is 1,4-cyclohexylene, 1,4-phenylene, 1,3-dioxane-2,5-diyl, or pyrimidine-2,5-diyl;

ring J is 1,4-cyclohexylene, pyrimidine-2,5-diyl, or 1,4-phenylene in which arbitrary hydrogen may be replaced by fluorine;

ring K is 1,4-cyclohexylene or 1,4-phenylene;

$Z^5$ is —(CH$_2$)$_2$—, —COO—, —CF$_2$O—, —OCF$_2$—, or a single bond;

$L^1$ independently is hydrogen or fluorine; and b independently is 0 or 1.

16. The liquid crystal composition according to claim 13, wherein the composition further comprises at least one compound selected from the group consisting of compounds represented by Formulae (7), (8), (9), (10) and (11):

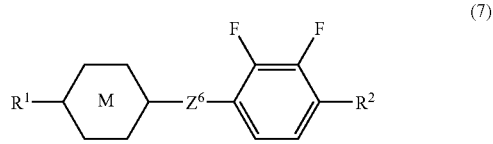

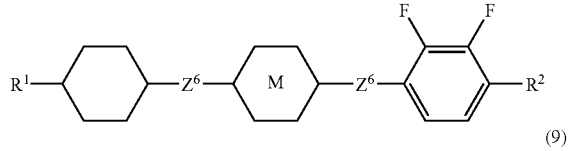

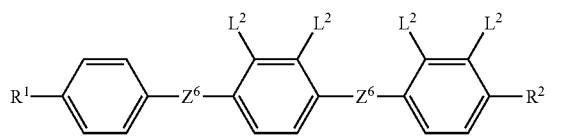

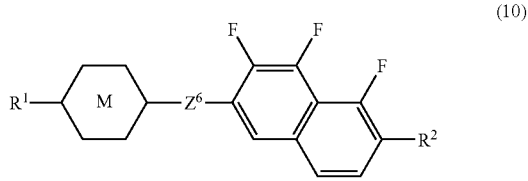

-continued

(11)
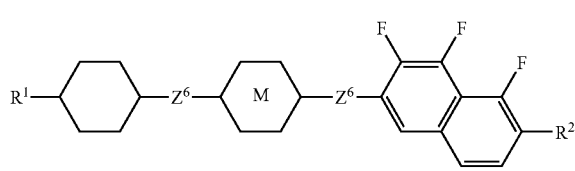

wherein R¹ is an alkyl having 1 to 10 carbon atoms; in the alkyl, arbitrary —CH₂— may be replaced by —O— or —CH═CH—, and arbitrary hydrogen may be replaced by fluorine;

R² is fluorine or an alkyl having 1 to 10 carbon atoms; in the alkyl, arbitrary —CH₂— may be replaced by —O— or —CH═CH—, and arbitrary hydrogen may be replaced by fluorine;

ring M is 1,4-cyclohexylene, 1,4-phenylene, or decahydro-2,6-naphthalene;

Z⁶ independently is —(CH₂)₂—, —COO—, or a single bond; and

L² independently is hydrogen or fluorine, and at least one of L² is fluorine.

17. The liquid crystal composition according to claim 13, wherein the composition further comprises at least one compound selected from the group consisting of compounds represented by Formulae (12), (13) and (14):

(12)
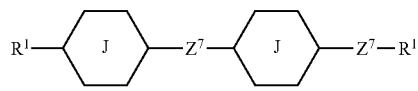

(13)
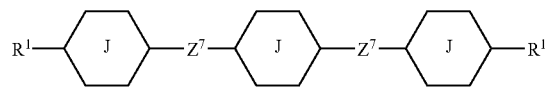

(14)
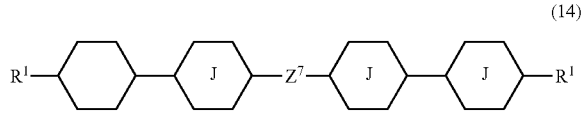

wherein R¹ independently is an alkyl having 1 to 10 carbon atoms; in the alkyl, arbitrary —CH₂— may be replaced by —O— or —CH═CH—, and arbitrary hydrogen may be replaced by fluorine;

ring J independently is 1,4-cyclohexylene, pyrimidine-2,5-diyl, or 1,4-phenylene in which arbitrary hydrogen may be replaced by fluorine; and Z⁷ independently is —C≡C—, —COO—, —(CH₂)₂—, —CH═CH—, or a single bond.

18. The liquid crystal composition according to claim 14, wherein the composition further comprises at least one compound selected from the group consisting of compounds represented by Formulae (5) and (6):

(5)
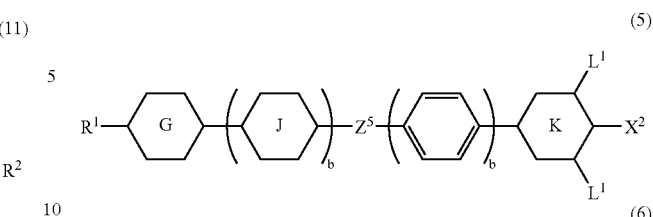

(6)
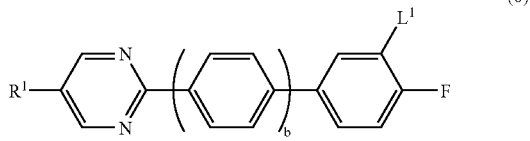

wherein R¹ is an alkyl having 1 to 10 carbon atoms; in the alkyl, arbitrary —CH₂— may be replaced by —O— or —CH═CH—, and arbitrary hydrogen may be replaced by fluorine;

X² is —CN or —C≡C—CN;

ring G is 1,4-cyclohexylene, 1,4-phenylene, 1,3-dioxane-2,5-diyl, or pyrimidine-2,5-diyl;

ring J is 1,4-cyclohexylene, pyrimidine-2,5-diyl, or 1,4-phenylene in which arbitrary hydrogen may be replaced by fluorine;

ring K is 1,4-cyclohexylene or 1,4-phenylene;

Z⁵ is —(CH₂)₂—, —COO—, —CF₂O—, —OCF₂—, or a single bond;

L¹ independently is hydrogen or fluorine; and b independently is 0 or 1.

19. The liquid crystal composition according to claim 14, wherein the composition further comprises at least one compound selected from the group consisting of compounds represented by Formulae (12), (13) and (14):

(12)
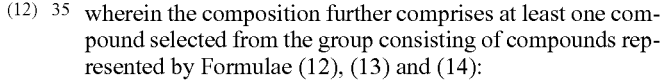

(13)
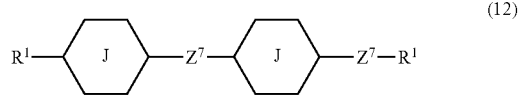

(14)
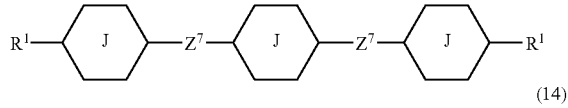

wherein R¹ independently is an alkyl having 1 to 10 carbon atoms; in the alkyl, arbitrary —CH₂— may be replaced by —O— or —CH═CH—, and arbitrary hydrogen may be replaced by fluorine;

ring J independently is 1,4-cyclohexylene, pyrimidine-2,5-diyl, or 1,4-phenylene in which arbitrary hydrogen may be replaced by fluorine; and Z⁷ independently is —C≡C—, —COO—, —(CH₂)₂—, —CH═CH—, or a single bond.

20. The liquid crystal composition according to claim 15, wherein the composition further comprises at least one compound selected from the group consisting of compounds represented by formulae (12), (13) and (14):

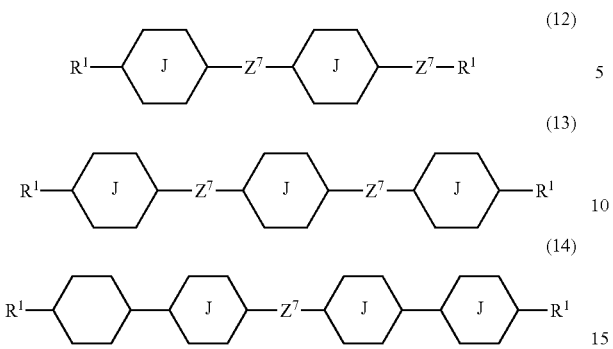

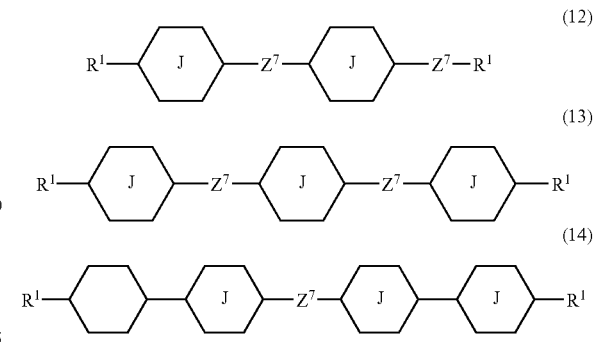

wherein R¹ independently is an alkyl having 1 to 10 carbon atoms; in the alkyl, arbitrary —CH$_2$— may be replaced by —O— or —CH═CH—, and arbitrary hydrogen may be replaced by fluorine;

ring J independently is 1,4-cyclohexylene, pyrimidine-2,5-diyl, or 1,4-phenylene in which arbitrary hydrogen may be replaced by fluorine; and Z⁷ independently is —C≡C—, —COO—, —(CH$_2$)$_2$—, —CH═CH—, or a single bond.

21. The liquid crystal composition according to claim 16, wherein the composition further comprises at least one compound selected from the group consisting of compounds represented by Formulae (12), (13) and (14):

wherein R¹ independently is an alkyl having 1 to 10 carbon atoms; in the alkyl, arbitrary —CH$_2$— may be replaced by —O— or —CH═CH—, and arbitrary hydrogen may be replaced by fluorine;

ring J independently is 1,4-cyclohexylene, pyrimidine-2,5-diyl, or 1,4-phenylene in which arbitrary hydrogen may be replaced by fluorine; and Z⁷ independently is —C≡C—, —COO—, —(CH$_2$)$_2$—, —CH═CH—, or a single bond.

22. The liquid crystal composition according to claim 13, wherein the composition further comprises an optically active compound.

23. A liquid crystal display device comprising the liquid crystal composition according to claim 13.

* * * * *